(12) United States Patent
Kawakami et al.

(10) Patent No.: US 8,541,063 B2
(45) Date of Patent: Sep. 24, 2013

(54) UNDERCOAT SOLUTION, INK-JET RECORDING METHOD AND INK-JET RECORDING DEVICE

(75) Inventors: Hiroshi Kawakami, Ashigarakami-gun (JP); Toshiyuki Makuta, Ashigarakami-gun (JP); Yusuke Nakazawa, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1072 days.

(21) Appl. No.: 12/026,208

(22) Filed: Feb. 5, 2008

(65) Prior Publication Data

US 2008/0187680 A1 Aug. 7, 2008

(30) Foreign Application Priority Data

| Feb. 6, 2007 | (JP) | 2007-026802 |
| Feb. 19, 2007 | (JP) | 2007-038505 |
| Apr. 26, 2007 | (JP) | 2007-116850 |
| Jun. 20, 2007 | (JP) | 2007-162307 |

(51) Int. Cl.
*C08F 2/48* (2006.01)

(52) U.S. Cl.
USPC .............. 427/508; 427/521; 525/329.4

(58) Field of Classification Search
USPC .............. 427/521, 508; 525/329.4
See application file for complete search history.

(56) References Cited

U.S. PATENT DOCUMENTS

| 5,629,354 A * | 5/1997 | West et al. .................. 522/25 |
| 5,871,894 A | 2/1999 | Takahashi et al. |
| 5,988,807 A | 11/1999 | Bernard et al. |
| 6,007,182 A | 12/1999 | Matsubara et al. |
| 6,214,458 B1 * | 4/2001 | Kobayashi et al. .......... 428/32.5 |
| 6,620,469 B2 | 9/2003 | Totani et al. |
| 6,797,768 B2 * | 9/2004 | Lyons .................. 524/561 |
| 6,929,827 B2 | 8/2005 | Yonehara |
| 7,374,280 B2 | 5/2008 | Kusunoki |
| 7,517,399 B2 | 4/2009 | Sato et al. |
| 7,537,652 B2 | 5/2009 | Koganehira et al. |

(Continued)

FOREIGN PATENT DOCUMENTS

| EP | 1 149 881 A2 | 10/2001 |
| EP | 1 426 193 A1 | 6/2004 |

(Continued)

OTHER PUBLICATIONS

Machine translation of JP2000-141873, of which the inventor is Kanewa et al. and was originally published in Japanese on May 2000.*

(Continued)

*Primary Examiner* — Robert S Walters, Jr.
(74) *Attorney, Agent, or Firm* — Sughrue Mion, PLLC

(57) ABSTRACT

The present invention provides an undercoat solution including a radical-polymerizable compound having a phosphoric acid group, an ink-jet recording method including applying an undercoat solution containing a radical-polymerizable compound having a phosphoric acid group; partially curing the applied undercoat solution; and discharging an ink, which is curable by irradiation with an active energy ray, onto the partially cured undercoat solution to record an image, and an ink-jet recording device including an undercoat solution application unit which applies an undercoat solution containing a radical-polymerizable compound having a phosphoric acid group; an undercoat solution curing unit which partially cures the undercoat solution; and an image recording unit which discharges an ink onto the partially cured undercoat solution to record an image.

14 Claims, 9 Drawing Sheets

(56) References Cited

U.S. PATENT DOCUMENTS

| | | |
|---|---|---|
| 7,645,036 B2 | 1/2010 | Umebayashi et al. |
| 7,658,489 B2 | 2/2010 | Yamanobe |
| 2003/0021961 A1 | 1/2003 | Ylitalo et al. |
| 2003/0083396 A1 | 5/2003 | Ylitalo et al. |
| 2003/0130371 A1 | 7/2003 | Tanaka et al. |
| 2004/0045931 A1 | 3/2004 | Hill et al. |
| 2004/0091642 A1 | 5/2004 | Murakami et al. |
| 2005/0065235 A1 | 3/2005 | Bauer |
| 2005/0190248 A1 | 9/2005 | Konno et al. |
| 2005/0195260 A1 | 9/2005 | Figov et al. |
| 2006/0023044 A1 | 2/2006 | Bauer |
| 2006/0033794 A1 | 2/2006 | Yamanobe |
| 2006/0050121 A1 | 3/2006 | Takabayashi et al. |
| 2006/0066704 A1 | 3/2006 | Nishida |
| 2006/0075916 A1 | 4/2006 | Edwards et al. |
| 2006/0075917 A1 | 4/2006 | Edwards |
| 2006/0077243 A1 | 4/2006 | Edwards |
| 2006/0203024 A1 | 9/2006 | Kusunoki |
| 2006/0203056 A1 | 9/2006 | Furukawa et al. |
| 2006/0230969 A1 | 10/2006 | Vosahlo |
| 2006/0258774 A1 | 11/2006 | Kim et al. |
| 2007/0216743 A1 | 9/2007 | Makuta et al. |
| 2008/0079796 A1 | 4/2008 | Makuta et al. |
| 2008/0081116 A1* | 4/2008 | Makuta et al. ............. 427/372.2 |
| 2008/0192102 A1 | 8/2008 | Leenders et al. |
| 2008/0199631 A1 | 8/2008 | Makuta et al. |

FOREIGN PATENT DOCUMENTS

| | | |
|---|---|---|
| EP | 1 652 686 A1 | 5/2006 |
| EP | 1 671 804 A1 | 6/2006 |
| EP | 1 671 805 A2 | 6/2006 |
| EP | 1 728 644 A1 | 12/2006 |
| EP | 1 870 247 A1 | 12/2007 |
| EP | 1 902 849 A1 | 3/2008 |
| EP | 1 905 608 A1 | 4/2008 |
| JP | 61-043592 | 3/1986 |
| JP | 61-043592 A | 3/1986 |
| JP | 6360783 A | 3/1988 |
| JP | 06-313127 | 11/1994 |
| JP | 06-313127 A | 11/1994 |
| JP | 07-040649 | 2/1995 |
| JP | 07-040649 A | 2/1995 |
| JP | 07-040649 * | 10/1995 |
| JP | 8-171010 A | 7/1996 |
| JP | 8174997 A | 7/1996 |
| JP | 08-218018 A | 8/1996 |
| JP | 10-067905 A | 3/1998 |
| JP | 3642152 B2 | 10/1998 |
| JP | 10-323975 A | 12/1998 |
| JP | 2000-135781 A | 5/2000 |
| JP | 2000 141616 A | 5/2000 |
| JP | 2000 141873 A | 5/2000 |
| JP | 3478495 B2 | 6/2001 |
| JP | 2001-181549 A | 7/2001 |
| JP | 2001-348519 A | 12/2001 |
| JP | 2002-370445 A | 12/2002 |
| JP | 2003-012971 A | 1/2003 |
| JP | 2003145745 A | 5/2003 |
| JP | 200442525 A | 2/2004 |
| JP | 200442548 A | 2/2004 |
| JP | 2002 225425 A | 8/2004 |
| JP | 2004-276322 A | 10/2004 |
| JP | 200596254 A | 4/2005 |
| JP | 2005126540 A | 5/2005 |
| JP | 2005-154767 A | 6/2005 |
| JP | 2005 254562 A | 9/2005 |
| JP | 2006-137183 A | 6/2006 |
| JP | 2006-137185 A | 6/2006 |
| WO | 02/085638 A1 | 10/2002 |
| WO | 2004/002746 A1 | 1/2004 |
| WO | 2004/087824 A2 | 10/2004 |
| WO | 2006/046061 A1 | 5/2006 |
| WO | 2006/068677 A1 | 6/2006 |
| WO | 2006/104278 A1 | 10/2006 |
| WO | 2006/128839 A1 | 12/2006 |
| WO | 2006/128849 A2 | 12/2006 |

OTHER PUBLICATIONS

EP Communication dated Jul. 13, 2010 in EP Application No. 07016628.5, 8 pages.

EP Communication dated Dec. 2, 2010 in EP Application No. 07017352.1, 7 pages.

EP Communication dated Oct. 1, 2007 in EP Application No. 07012056.3, 6 pages.

Office Action dated Jul. 26, 2011 on Japanese Application No. JP 2007-104687.

Office Action dated Aug. 9, 2011 on Japanese Application No. JP 2007-116850.

Office Action dated Aug. 9, 2011 on Japanese Application No. JP 2007-162307.

* cited by examiner

UNDERCOAT SOLUTION, INK-JET RECORDING METHOD AND INK-JET RECORDING DEVICE

CROSS-REFERENCE TO RELATED APPLICATION

This application claims priority under 35 USC 119 from Japanese Patent Application Nos. 2007-38505, 2007-162307, 2007-26802 and 2007-116850, the disclosures of which are incorporated by reference herein.

BACKGROUND OF THE INVENTION

1. Field of the Invention

The present invention relates to an undercoat solution suitable for forming images, an ink-jet recording method and an ink-jet recording device.

2. Description of the Related Art

The ink-jet recording system in which ink is discharged from an discharge hole in the form of droplets, has been employed in many printers for the reasons that the printer can be small and inexpensive, image formation is possible without contacting with recording media, and the like. Among these ink-jet recording systems, the piezo-inkjet system involving the discharge of ink by making use of the deformation of a piezoelectric element, and the thermal inkjet system involving the discharge of ink in the form of liquid droplets using the phenomenon of ink boiling under the action of thermal energy, are characterized by high resolution and excellent high-speed printability.

Currently, important problems include high speed and high resolution when printing is performed by an ink-jet printer by impacting ink droplets onto a normal paper or a non-absorptive recording medium such as plastic sheets.

Ink-jet recording involves discharging ink droplets in accordance with an image data, and forming a line or an image with these drops on a recording medium. Particularly, in the case of performing recording on a non-absorptive recording medium as described above, there have been problems in practice, such as that if it takes some time to make ink droplets dry after impact or penetrate into the recording medium, the image is prone to spread, and adjacent ink droplets mix with each other on the recording medium and impair the formation of clear images. When ink droplets mix with each other, ink droplets impacted adjacently to each other unite, thus causing movement of ink droplets. Thus, ink droplets go out from the impact position, and in the case of drawing a thin line, non-uniformity occurs in the line width, and in the case of recording colored planes, color irregularities and the like occur. Furthermore, there has also been a problem that since the non-uniformity of the line width and the extent of the occurrence of color irregularities on colored planes vary with the ink absorbability or wettability of the surface of a recording medium, image changes between various recording medias even though the ink to be used and the conditions for discharge are maintained constant.

As a method of suppressing the spread of images or the non-uniformity of line width, there may be mentioned a method of accelerating the fixation of ink droplets. As an example, a binary liquid type ink having reactivity is used so that the two liquids react with each other on a recording medium, so as to impart high precision drawing properties. For example, a method of attaching a liquid having a basic polymer, and then recording with an ink containing an anionic dye (see, for example, JP-A No. S63-60783); a method of applying a liquid composition containing a cationic material, and then applying an ink containing an anionic compound and a colored material (see, for example, JP-A No. H8-174997); or the like have been disclosed.

Furthermore, there has been proposed an ink-jet recording method comprising using an ultraviolet-curable ink as the ink, irradiating the dots of the ultraviolet-curable color ink discharged on a recording medium with ultraviolet rays according to the respective timing for discharge, preliminarily curing the ink to the extent that adjacent dots have increased viscosities and do not mix with each other, and then further irradiating the dots with ultraviolet rays to cure the dots (see, for example, JP-A No. 2004-42548).

Moreover, there has also been proposed a technology for improving the visibility of color inks, spreading and the problem of images changing between various recording medias, by providing a uniform coating of a radiation-curable white ink as an undercoat layer on a transparent or semi-transparent non-absorbable recording medium, irradiating the white ink with a radiation to solidify the ink or increase the viscosity, and then performing ink-jet recording using a set of radiation-curable color inks (see, for example, JP-A No. 2003-145745 and JP-A No. 2004-42525). Also, a technology for providing a coating of a substantially transparent actinic ray-curable ink, instead of the above-mentioned radiation-curable white ink, by an ink-jet head (see, for example, JP-A No. 2005-96254) has been proposed as well.

On the other hand, as an ultraviolet-curable ink-jet ink composition having good fixability to non-absorptive materials such as plastics or metals, an ultraviolet-curable ink-jet ink composition comprising a phosphorus-based compound is known (see, for example, JP-A No. 2005-126540).

However, with the method described in JP-A No. 2004-42548, spreading is suppressed, but the problem of images changing between various recording medias still remains. Thus, the method is not sufficient for eliminating the problems of non-uniformity in line width or color irregularities, which is caused by the intermixing of ink droplets. Furthermore, the methods described in JP-A No. 2003-145745 and JP-A No. 2004-42525 are also insufficient for eliminating the problems of non-uniformity in line width or color irregularities, which is caused by the intermixing of ink droplets. Moreover, the method described in JP-A No. 2005-96254 also holds the problems of non-uniformity in line width or color irregularities, which is caused by the intermixing of ink droplets.

On the other hand, in an ink-jet image forming system, since color inks are sequentially applied on a base material during image formation, there occur cases where an ink to be applied later is applied on an ink that has been applied previously, and cases where a color ink is applied on a site where ink has been applied. In the respective cases, there is a problem that if the dot diameter (and the dot shape) changes, deterioration of images occur.

Further, in the case of recording images using the ultraviolet-curable ink-jet ink composition described in JP-A No. 2005-126540, since an undercoat solution is not used, there is a problem that mixing of colors occur, or reproducibility of dots cannot be obtained.

On the other hand, in the single-pass system which is capable of high speed image formation such as in the case of recording images using a low resolution head unit, when the amount of ink droplets impacting the medium is small, or the ink droplet impact density during recording is low, the ink droplets (dots) may spread out disorderly to cause smudged images or blurred images. Or to the contrary, dots may not sufficiently spread out, thereby causing problems such as decoloration, decrease of image density, blurring of images, and color irregularities.

SUMMARY OF THE INVENTION

The present invention has been made in view of the above circumstances, and provides an undercoat solution, an ink-jet recording method and an ink-jet recording device.

According to a first aspect of the invention, there is provided an undercoat solution including a radical-polymerizable compound having a phosphoric acid group and being applied in advance on a recording medium prior to discharging an ink onto the recording medium to record an image (hereinafter, may also be referred to as "undercoat solution related to the first aspect").

According to a second aspect of the invention, there is provided an ink-jet recording method including applying, onto a recording medium, an undercoat solution containing a radical-polymerizable compound having a phosphoric acid group; partially curing the applied undercoat solution; and discharging an ink which can be cured by irradiating with an active energy ray onto the partially cured undercoat solution to record an image (hereinafter, may also be referred to as "ink-jet recording method related to the first aspect").

According to a third aspect of the invention, there is provided an ink-jet recording device including an undercoat solution applying unit which applies, onto a recording medium, an undercoat solution containing a radical-polymerizable compound having a phosphoric acid group; an undercoat solution curing unit which is disposed further downstream from the undercoat solution applying unit in the direction of movement of the recording medium, and partially cures the undercoat solution; and an image recording unit which is disposed further downstream from the undercoat solution curing unit in the direction of movement of the recording medium, and discharges an ink which can be cured by irradiating with an active energy ray onto the partially cured undercoat solution to record an image (hereinafter, may also be referred to as "ink-jet recording device related to the first aspect").

The first embodiment of the invention according to the first to third aspects has been achieved in consideration of the circumstances described above, and thus provides an undercoat solution, an ink-jet recording method, and an ink-jet recording device, which have excellent image uniformity with various recording media, regardless of the recording medium; suppress the occurrences of ink spreading, non-uniformity in line width, color irregularities and the like; maintain the diameter of dots uniform, and have excellent drawing properties of thin line and binding properties of adjacent dots; and thus are capable of recording an image in detail at a high density with high reproducibility, without regard to the form of the image.

The first to third aspects related to the first embodiment of the invention have been achieved based on the finding that in order to enable reproduction of clear images by maintaining the entirety of an image, including details, at high of the density, it is important that dots formed on the droplet impact have a property of spreading within a certain range, and the shape of the dots is maintained when the dots are interconnected after the spreading. If the dots spread to a desired extent, and the shape is maintained even after the dots are interconnected, a certain density will be obtained, and the quality of recorded images can be improved, for example, even when image formation is performed in a single-pass system using an inexpensive apparatus equipped with a low resolution head unit.

According to a fourth aspect of the invention, there is provided an undercoat solution including a polymer and a radical-polymerizable compound having a phosphoric acid group and being applied in advance on a recording medium prior to discharging an ink onto the recording medium to record an image (hereinafter, may also be referred to as "undercoat solution related to the second aspect").

According to a fifth aspect of the invention, there is provided an ink-jet recording method including applying, onto a recording medium, an undercoat solution containing a polymer and a radical-polymerizable compound having a phosphoric acid group; partially curing the applied undercoat solution; and discharging an ink which can be cured by irradiation with an active energy ray onto the partially cured undercoat solution to thereby record an image (hereinafter, may also be referred to as "ink-jet recording method related to the second aspect").

According to a sixth aspect of the invention, there is provided an ink-jet recording device including an undercoat solution applying unit which applies, onto a recording medium, an undercoat solution containing a polymer and a radical-polymerizable compound having a phosphoric acid group; an undercoat solution curing unit which is disposed further downstream from the undercoat solution applying unit in the direction of movement of the recording medium, and partially cures the undercoat solution by irradiating with an active energy ray to at least a part of the undercoat solution; and an image recording unit which is disposed further downstream from the undercoat solution curing unit in the direction of movement of the recording medium, and discharges an ink which can be cured by irradiating with an active energy ray onto the partially cured undercoat solution to record an image (hereinafter, may also be referred to as "ink-jet recording device related to the second aspect").

The second aspect of the invention according to the fourth to sixth aspects described above has been achieved in consideration of the circumstances described above, and thus provides an undercoat solution, an ink-jet recording method, and an ink-jet recording device, which have excellent image uniformity with various recording media, regardless of the recording medium; suppress the occurrences of ink spreading, non-uniformity in line width, color irregularities and the like; maintain the diameter of dots uniform even when ink droplets are impacted one on top of another; and is capable of recording an image in detail at a high density with high reproducibility, without regard to the form of the image.

The fourth to sixth aspects related to the second embodiment of the invention have been achieved based on the finding that in any of the cases where a color ink is impacted dropwise on a site not applied with a color ink, and where a color ink is impacted dropwise again on a site already applied with a color ink, good image drawing property is attained, and it is important that the diameter of dots (and the shape of dots) does not change.

BRIEF DESCRIPTION OF THE DRAWINGS

Exemplary embodiments of the present invention will be described in detail based on the following figures, wherein.

DESCRIPTION OF THE PREFERRED EMBODIMENTS

Figure 1:
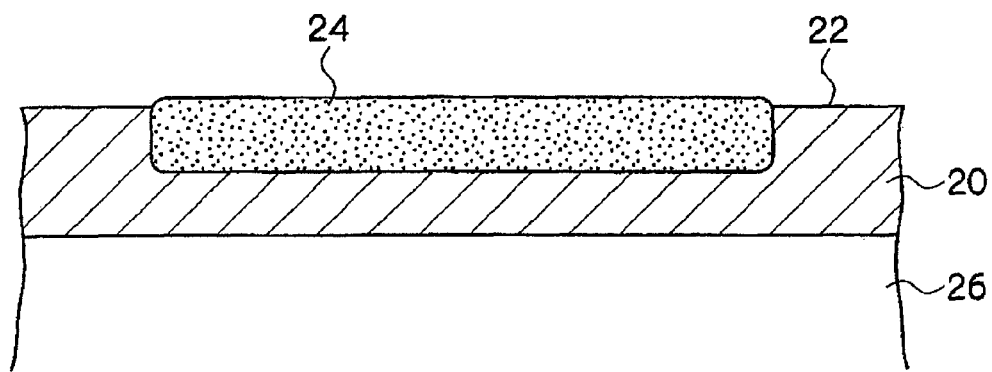
FIG. 1 is a schematic sectional view showing a recording medium on which an image is formed by discharging an ink onto a partially cured undercoating liquid.

Hereinafter, the undercoat solution, the ink-jet recording method and the ink-jet recording device of the present invention will be described in detail.

The undercoat solution related to the first embodiment of the invention is used to be applied in advance on a recording medium, when an ink is discharged on the recording medium to record an image, prior to impacting the ink droplets, and is formed by containing a radical-polymerizable compound having a phosphoric acid group that will be described later. The undercoat solution preferably contains a radical polymerization initiator that will be described later. Furthermore, it is preferable that the undercoat solution is used for the below-described ink-jet recording method of the invention.

The ink-jet recording method related to the first embodiment of the invention includes applying, onto a recording medium, an undercoat solution containing a radical-polymerizable compound having a phosphoric acid group (hereinafter, this may be referred to as "undercoat solution applying process"); partially curing the applied undercoat solution (hereinafter, this may be referred to as "curing process"); and discharging an ink, which is curable by irradiation with an active energy ray, onto the partially cured undercoat solution to record an image (hereinafter, this may be referred to as "recording process"). If necessary, the ink-jet recording method can also include other processes, including a process for partial curing the ink.

The undercoat solution related to the second embodiment of the invention is used to be applied in advance on a recording medium, when an ink is discharged on the recording medium to record an image, prior to impacting the ink droplets, and is formed by containing a polymer that will be described later, and a radical-polymerizable compound having a phosphoric acid group that will be described later. It is more preferable that the undercoat solution contains a radical polymerization initiator that will be described later. Furthermore, it is preferable that the undercoat solution is used for the below-described ink-jet recording method of the invention.

The ink-jet recording method related to the second embodiment of the invention includes applying, onto a recording medium, an undercoat solution containing a polymer and a radical-polymerizable compound having a phosphoric acid group (hereinafter, this may be referred to as "undercoat solution applying process"); partially curing the applied undercoat solution (hereinafter, this may be referred to as "curing process"); and discharging an ink, which can be cured by irradiation with an active energy ray, onto the partially cured undercoat solution to thereby record an image (hereinafter, this may be referred to as "recording process"). If necessary, the ink-jet recording method can also include other processes, including a process for partial curing the ink.

In an ink-jet recording method in general, adjacent ink droplets that are applied to have parts overlapping with each other, so as to obtain a high image density, stay on a recording medium and contact with each other before drying. For this reason, adjacent ink droplets unite, thus causing spreading of image or non-uniformity in the line width of fine lines, and the property of forming clear image is likely to be impaired. However, the ink-jet recording method related to the first and second embodiments of the invention can suppress the uniting of these adjacent ink droplets when ink droplets are applied on a partially cured undercoat solution, even though some parts of the ink droplets overlap with each other, under an interaction between the undercoat solution and the ink droplets, by employing a constitution of applying an undercoat solution on a recording medium, and partially curing the undercoat solution. Accordingly, the spreading of image, non-uniformity in the line width of fine lines on an image, and the occurrence of color irregularities on a colored plane, are effectively prevented.

Moreover, since the undercoat solution related to the first embodiment of the invention is constituted using a radical-polymerizable compound having a phosphoric acid group, the impacted ink droplets adequately spread to connect individual dots, but the ink droplets are suppressed from spreading to the extent that the shape of the dots are impaired, or the phenomenon of smudging or blurring of images occurs. For this reason, the undercoat solution prevents decoloration and maintains high of the density of an image to its entirety, including the details as well, thus enabling recording of an image clearly to the details and reproducibly. Therefore, according to the ink-jet recording method related to the first embodiment of the invention, even though recording is performed with a small amount of ink and low density dots, clear and precise lines having a uniform thickness can be formed, and at the same time, decoloration and density decrease do not occur even in reverse images or solidly colored areas. Thus, reproducibility for fine parts such as fine lines in the image can be improved.

The ink-jet recording device related to the first embodiment of the invention is effective in the case of recording an image on a non-penetrable or slow-penetrable recording medium which has low liquid absorbability as a recording medium, and is also effective in the case of forming an image under a single-pass system using an inexpensive, low-resolution head unit.

In addition, the undercoat solution related to the second embodiment of the invention is constituted using a polymer and a radical-polymerizable compound having a phosphoric acid group, the impacted ink droplets adequately spread to connect individual dots, but the ink droplets are suppressed from spreading to the extent that the shape of the dots are impaired, or the phenomenon of smudging or blurring of images occurs. For this reason, even in the case of recording an image with a low resolution head unit, or in the case of performing the recording of an image area with a low dot density (for example, low density image and low resolution image), using a small amount of ink, the undercoat solution prevents decoloration and maintains high of the density of an image to its entirety, including the details as well, thus enabling recording of an image clearly to the details and reproducibly. Therefore, according to the ink-jet recording method related to the second embodiment of the invention, even though recording is performed with a small amount of ink and low density dots, clear and precise lines having a uniform thickness can be formed, and at the same time, decoloration and density decrease do not occur even in reverse images or solidly colored areas. Thus, reproducibility for fine parts such as fine lines in the image can be improved.

Since the ink-jet recording method related to the second embodiment of the invention is constituted using an undercoat solution containing a polymer and a radical-polymerizable compound having a phosphoric acid group, even in the case of impacting ink droplets of multiple colors in an overlapping manner on the undercoat solution, good image recording can be achieved. For example, even in the case of drawing an image with a first ink on an undercoat solution, and drawing dots or lines with a second ink on that image, spreading of the dots and lines is suppressed, and thus the same dots and lines as in the case where there is no image drawn with the first ink, can be drawn. Likewise, for example, in the case of drawing an image with a first ink on an undercoat solution, and then drawing a lattice pattern composed of lattice lines with a second ink on that image, spreading of the width of the lattice lines drawn with the second ink, is suppressed. As a result, the phenomenon in which a region located between two lattice lines, where droplets of the second ink have not been impacted, becomes narrower can be prevented, and the same lattice pattern as in the case where there is no image drawn with the first ink, can be drawn.

Here, adjacent ink droplets mean drops impacted from discharge nozzle of an ink using a unicolor ink, which drops have been impacted with some parts overlapping with each other, or drops impacted from discharge nozzle of an ink using inks having different colors, which drops have been impacted with some parts overlapping with each other. Adjacent ink droplets may be drops resulting from a simultaneous impact, or may be precedent drops and subsequent drops which are in the relationship of being resulted from a precedent impact and a subsequent impact.

In the invention, at least one type of ink and at least one type of undercoat solution are used as the liquids for forming images. The undercoat solution is preferably different from the ink in the composition. Also, the undercoat solution is preferably applied over a region which is equal to or larger than the region of the image formed by discharging ink droplets on a recording medium.

Meanwhile, in the invention, the ink is preferably used such that inks of multiple colors are used as a multi-color ink set. Furthermore, in the case of using a multi-color ink set, it is preferable to have a constitution that after inks of the respective colors are discharged, the ink droplets are partially cured.

One of specific constitutions of the ink-jet recording method related to the first embodiment of the invention, is a constitution in which ink droplets of multiple colors that are impacted on a recording medium, contain a polymerizable or cross-linkable material for forming images; an undercoat solution which has a composition different from that of the ink, and contains a radical-polymerizable compound having a phosphoric acid group, is applied on the recording medium in advance over an area which is equal to or larger than the region of the image formed by the ink droplets; the undercoat solution applied on the recording medium is partially cured by applying an active energy ray or heat; and after partial curing the undercoat solution by applying an active energy ray or heat, ink droplets of multiple colors are impacted over this undercoat solution.

One of specific constitutions of the ink-jet recording method related to the second embodiment of the invention, is a constitution in which ink droplets of multiple colors that are impacted on a recording medium, contain a polymerizable or cross-linkable material for forming images; an undercoat solution which has a composition different from that of the ink, and contains a polymer and a radical-polymerizable compound having a phosphoric acid group, is applied on the recording medium in advance over an area which is equal to or larger than the region of the image formed by the ink droplets; the undercoat solution applied on the recording medium is partially cured by applying an active energy ray or heat; and after partial curing the undercoat solution by applying an active energy ray or heat, ink droplets of multiple colors are impacted over this undercoat solution.

Also, after applying the undercoat solution in advance, and then at least impacting all of the droplets of at least the desired ink (preferably, ink droplets of multiple colors), it is preferable from the viewpoint of obtaining excellent fixability to the ink, for example, to provide a process for fixing the recorded image (hereinafter, referred to as fixing process) by applying an active energy ray, and further accelerating the curing of the undercoat solution and the discharged ink.

—Application of Undercoat Solution and Recording—

In applying the undercoat solution (the undercoat solution applying process), an undercoat solution is applied on a recording medium. The undercoat solution related to the first embodiment contains at least a radical-polymerizable compound having a phosphoric acid group, and more preferably, may be constituted using a radical polymerization initiator and a surfactant. The undercoat solution related to the second embodiment contains at least a polymer and a radical-polymerizable compound having a phosphoric acid group, and more preferably, may be constituted using a radical polymerization initiator and a surfactant. Furthermore, the undercoat solution related to the first and second embodiments can also be constituted using other components, if necessary. Detailed description on the components constituting the undercoat solution, and the recording medium will be given later.

In the recording of the images (the recording process), the images are recorded by discharging an ink that is curable by irradiation with actinic energy rays onto a partially cured undercoat solution that has been partially cured in a partial curing process to be described later. The ink is applied onto the partially cured undercoat solution in the form of droplets by using an ink jet nozzle or the like.

In the ink jet recording method of the invention, the undercoat solution can be applied onto the recording medium using a coating device, an ink jet nozzle, and the like.

(i) Application Using an Application Device

In a preferable embodiment of the invention, an image is recorded by applying an undercoat solution onto a recording medium using an application device, and thereafter ink droplets are discharged using an ink jet nozzle. Details of the ink jet nozzle will be discussed later.

The type of the application device is not particularly limited and can be selected from known application devices as appropriate according to purposes. Examples of the application devices include an air doctor coater, blade coater, lot coater, knife coater, squeeze coater, immersion coater, reverse roll coater, transfer roll coater, gravure coater, kiss roll coater, cast coater, spray coater, curtain coater and an extruding coater. Details of these coating devices are described in Yuji Harasaki, "Coating Engineering", (1978).

(ii) Discharge by Ink Jet Nozzle

In the invention, an embodiment is also preferable in which an image is recorded by discharging an undercoat solution using an ink jet nozzle, and thereafter ink droplets are discharged by the ink jet nozzle. Details of the ink jet nozzle will be discussed later.

As the conditions for applying of the undercoat solution by the ink jet nozzle, it is preferable that the undercoat solution is discharged by a head capable of discharging a greater amount per droplet and having lower nozzle density as compared with the head for an ink, and the head is arranged as a full-line head unit in a width direction of the recording medium. Such a head having a greater amount per droplets to be discharged generally has a high degree of discharge power, and is therefore compatible with an undercoat solution having high viscosity, and is also advantageous in terms of avoiding nozzle clogging. Further, using of a head capable of discharging a greater amount per droplet is also advantageous from the viewpoint that an inexpensive head having lower driving frequency can be applied, since the droplet resolution of the undercoat solution in a direction in which a recording medium is conveyed can be reduced.

In either case of the above embodiments, liquids other than the undercoat solution and ink can be further applied. Any means such as an application device or an ink jet nozzle can be applied to the application of such liquids, and the timing thereof is also not particularly limited. When a colorant is contained in the liquid other than the undercoat solution and ink, the liquid is preferably applied by discharging with an ink jet nozzle, and is preferably applied after the undercoat solution has been applied.

Next, a method of discharging using an ink jet nozzle (ink jet recording method) will be discussed.

In the invention, known ink jet recording methods are preferably used, such as an electrostatic induction method in which an ink is discharged by means of electrostatic power, drop-on-demand method (pressure-pulse method) utilizing vibration pressure of a piezoelectric element, acoustic ink jet method in which ink is discharged by means of radiation pressure caused by irradiating the ink with an acoustic beam which has been converted from an electric signal, and a thermal ink jet method of utilizing pressure generated by heating ink to form air bubbles.

In the invention, the ink is preferably discharged onto the partially cured undercoat solution to a droplet size of from 0.1 pL (picoliter; hereinafter the same) to 100 pL. When the droplet size is within the above range, an image with high sharpness and density can be effectively formed. The droplet size is more preferably in the range of from 0.5 pL to 50 pL.

The amount of the undercoat solution to be applied in terms of mass ratio per area is preferably from 0.05 to 5, more preferably from 0.07 to 4, and still more preferably from 0.1 to 3.

The discharge interval between the application of the undercoat solution and the discharge of the ink droplets is preferably in the range of from 5µ seconds to 10 seconds. When the discharge interval is within the above range, the effect of the invention can be remarkably achieved. The discharge interval of the ink droplet is more preferably in the range of from 10µ seconds to 5 seconds, and particularly preferably from 20µ seconds to 5 seconds.

Further, in the recording process, a multicolored image can be recorded using an ink set including inks of multiple colors. In this case, in terms of reproducibility of a fine image or color tone, a step of partially curing at least one of the inks of multiple colors discharged onto a recording medium is preferably provided, and after each discharge of the ink of one color or a predetermined set of colors, an exposure process is preferably provided (so-called pinning exposure).

Actinic energy rays are preferably used for the pinning exposure and details thereof is the same as the cases in the fixing process to be described later. Examples of the actinic energy rays include ultraviolet rays, visible rays, α-rays, γ-rays, X-rays and electron beams. Among these, ultraviolet rays and visible rays are preferable in terms of cost and safety, and ultraviolet rays are most preferable.

The amount of the energy required for partial curing here varies depending on the type or content of a polymerization initiator, but is generally preferably from 1 to 500 mJ/cm$^2$, more preferably from 1 to 200 mJ/cm$^2$, and still more preferably from 1 to 100 mJ/cm$^2$.

—Partial Curing—

In the invention, a partial curing process is provided in which the applied undercoat solution is partially cured between a time point after applying the undercoat solution during the above-described applying undercoat solution process, to a time point of impacting at least one kind of ink droplets in the recording process.

In the invention, the description "partial curing" refers to a state in which the undercoat solution is partially but not completely cured. When the undercoat solution that has been applied onto a recording medium (substrate) is partially cured, the degree of the curing may be uneven. For example, the curing is preferably more developed at a deeper point in a depth direction.

When a radical polymerizable undercoat solution is used in the air or the air that has partly been substituted by an inert gas, the radial polymerization at the surface of the undercoat solution tends to be inhibited by the action of oxygen to inhibit the radial polymerization. As a result, the degree of the curing becomes uneven and the curing tends to be more developed in the inside of the undercoat solution than at the surface thereof.

In a case where a cationic polymerization liquid is used in the air containing moisture, the curing also tends to be more developed in the inside of the undercoat solution than at the surface thereof, due to the action of the moisture to inhibit the cationic polymerization.

In the invention, when a radical photopolymerizable undercoat solution is used under coexistence of oxygen that tends to inhibit radical polymerization and partially photo-cured, the curing degree of the undercoat solution becomes higher at the outside than in the inside thereof.

When an ink (hereinafter, referred to as "colored liquid" sometimes) is discharged onto an undercoat solution that has been partially cured, favorable effects can be achieved in the quality of an image that has been formed onto a recording medium. The mechanism of this action can be determined by observing a section of the recording medium.

Hereinafter, explanation will be given taking the case where an ink of about 12 pL is discharged onto a partially cured undercoat solution layer having a thickness of 5 µm as an example.

In the invention, an undercoat solution is partially cured and the degree of curing thereof is higher at a point that is closer to a substrate, relative to that at a point more remote from the substrate. In this case, three features can be observed: that is, as shown in FIG. 1, (1) a part of an ink 24 is exposed on the surface 22; (2) a part of the ink 24 is submerged in an undercoating layer 20; and (3) the undercoat solution 20 exists between the ink 24 and the substrate 26. Therefore, the recording medium on which an image is formed by applying the ink 24 onto the partially cured undercoating layer 20 has a section as schematically shown in FIG. 1. In a case where all of the above conditions (1), (2) and (3) are satisfied, it can be determined that the ink 24 has been applied onto the undercoating layer 20 which is in a partially cured state. In this case, the ink droplets that have been discharged with high density coalesce with each other to form a colored film, and a uniform and high degree of color density can be achieved.

Figure 2A:
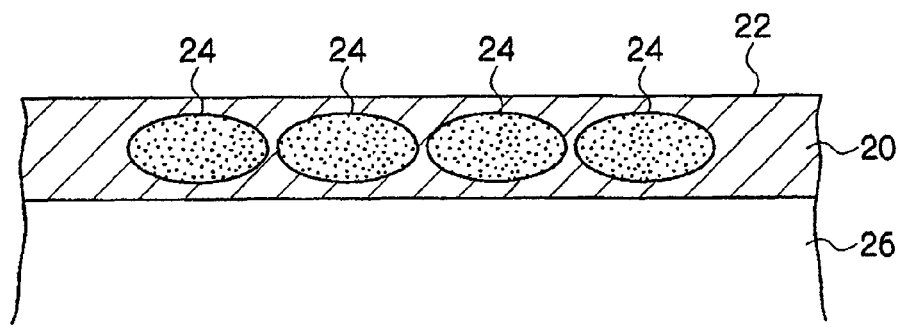
FIGS. 2A and 2B are schematic sectional views showing a recording medium on which an image is formed by discharging an ink onto an undercoating liquid that has not been cured.
Figure 2B:
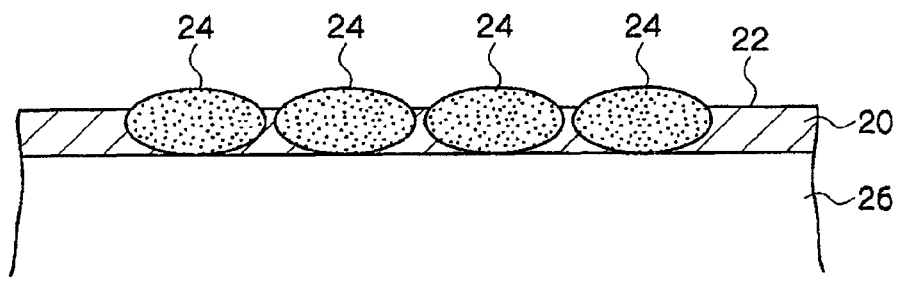

On the other hand, as shown in FIGS. 2A and 2B, when the ink 24 is discharged onto the undercoat solution 20 that has not been cured, the ink 24 submerges entirely in the undercoat solution 20, and/or the undercoat solution 20 does not exist between the ink 24 and the substrate 26. In this case, the droplets remain independent from each other even when the ink is applied with high density, thereby becoming a factor of reduced color density. The recording medium on which an image is formed by applying the ink 24 onto the uncured undercoat solution 20 has a section as schematically shown in FIGS. 2A and 2B.

Figure 2C:
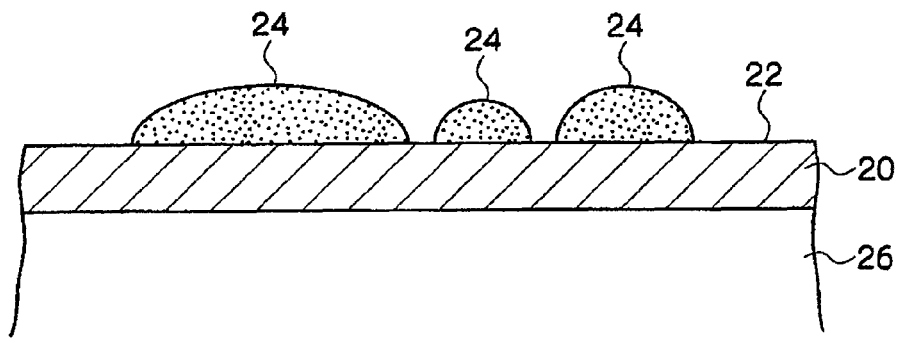
FIG. 2C is a schematic sectional view showing a recording medium on which an image is formed by discharging an ink onto an undercoating liquid that has been completely cured.

When the ink 24 is discharged onto a completely cured undercoat solution 20, the ink 24 does not submerge in the undercoat solution 20, as shown in FIG. 2C. Such a situation may become a factor of interdroplet interference, thereby failing to form a uniform colored liquid film and causing reduction in color reproducibility. The recording medium on which an image is formed by applying the ink 24 onto the completely cured undercoat solution 20 has a section as schematically shown in FIG. 2C.

It is preferable that the amount per area of the uncured part of the undercoat solution is sufficiently smaller than the largest amount per area of the applied ink, from the viewpoint that when the ink droplets are applied with high density, they do not remain independent of each other, and form a uniform liquid layer of the ink; and that the occurrence of interdroplet interference is prevented. Therefore, the mass per area of the uncured part of the undercoat solution "M (undercoat solution)" and the largest mass per area of the applied ink droplets "m (ink)" preferably satisfies a relation "m (ink)/30<M (undercoat solution)<m (ink)", further preferably satisfies a relation "m (ink)/20<M (undercoat solution)<m (ink)/3", and still more preferably satisfies a relation "m (ink)/10<M (undercoat solution)<m (ink)/5". The largest mass per area of the ink to be discharged here refers to the largest mass of each case of respective colors. When a relation "m (ink)/30<M (undercoat solution)" is satisfied, occurrence of interdroplet interference can be prevented and excellent dot size reproducibility can be achieved. Further, when a relation "M (undercoat solution)<m (ink)" is satisfied, uniform liquid layer of the ink can be formed and high density can be obtained.

The mass per area of the uncured part of the undercoat solution can be determined by a transferring test, in which a permeable medium such as a plain paper sheet is pressed against the partially cured undercoat solution, at a point after the completion of the partial curing process (e.g., after irradiation with actinic energy rays) and prior to the discharge of the ink droplets, and the mass of the undercoat solution that has been transferred onto the permeable medium from the undercoating layer is measured.

For example, when the largest discharge amount of the ink droplets in an discharge density of 600×600 dpi is 12 pL per pixel, the largest mass per area of the discharged ink "m (ink)" is determined to be 7.4 g/cm² (here, the density of the ink is assumed to be 1.1 g/m³). Therefore, the preferable mass per area of the uncured part of the undercoat solution is 0.25 to 7.4 g/cm², more preferably 0.37 to 2.5 g/cm², and still more preferably 0.74 to 1.48 g/cm².

Figure 3:
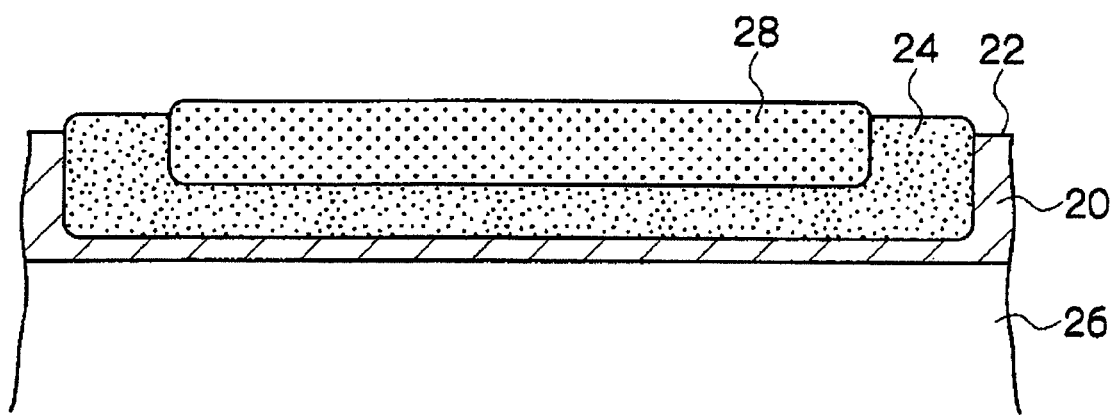
FIG. 3 is a schematic sectional view showing a recording medium on which an image is formed by discharging an ink B onto a partially cured ink A.

Further, in a case of forming a secondary color from the inks of two colors (hereinafter, referred to as an ink A and an ink B), one of the inks can be applied onto the other ink that has been partially cured, e.g., applying the ink B onto the partially cured ink A. When the ink B is discharged onto the partially cured ink A, a part of the ink B28 submerges in the ink A24, and at the same time, the ink A24 exists under the ink B28. Therefore, a recording medium on which an image is formed by applying the ink B28 onto the partially cured ink A24 has a section as schematically shown in FIG. 3. By laminating the cured layers of the inks A and B, favorable color reproduction can be achieved.

Figure 4A:
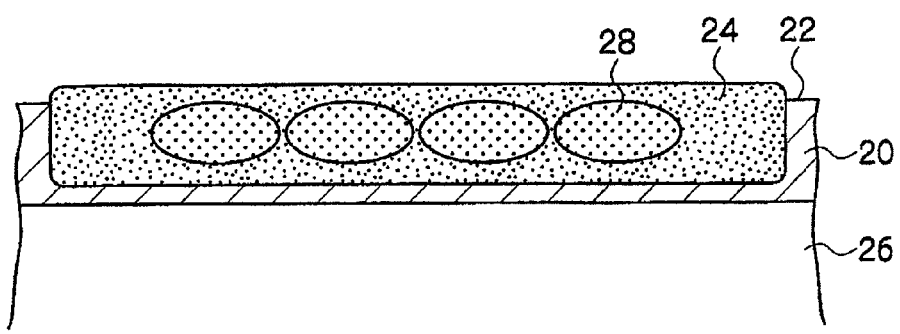
FIGS. 4A and 4B are schematic sectional views showing a recording medium on which an image is formed by discharging an ink B onto an ink A that has not been cured.
Figure 4B:
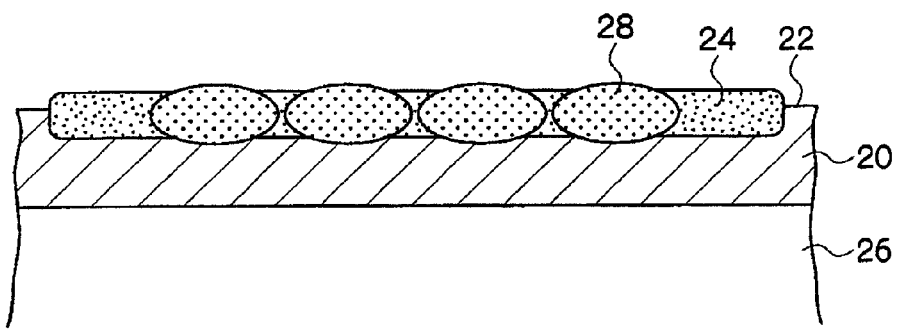

On the other hand, when the ink B is discharged onto the uncured ink A, the ink B28 submerges entirely in the ink A24, as shown in FIG. 4A, and/or the ink A24 does not exist under the ink B28, as shown in FIG. 4B. In this case, the droplets remain independent from each other even when the ink B is applied with high density, thereby becoming a factor of reduced color saturation of the secondary color. The recording medium on which an image is formed by applying the ink B28 onto the uncured ink A24 thus has a section as schematically shown in FIGS. 4A and 4B.

Figure 4C:
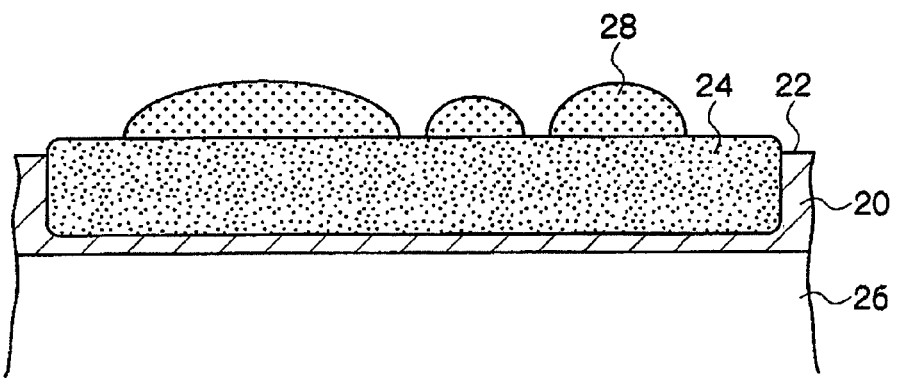
FIG. 4C is a schematic sectional view showing a recording medium on which an image is formed by discharging an ink B onto an ink A that has been completely cured.

When the ink B is discharged onto the completely cured ink A, ink B28 does not submerge in the ink A24, as shown in FIG. 4C. Such a situation may become a factor of interdroplet interference, thereby failing to form a uniform ink film and causing reduction in color reproducibility. The recording medium on which an image is formed by applying the ink B28 onto the completely cured ink A24 thus has a section as schematically shown in FIG. 4C.

It is preferable that the amount per area of the uncured part of the ink A is sufficiently smaller than the largest amount per area of the applied ink B, from the viewpoint that the droplets of the ink B applied with high density does not remain independent of each other, and form a uniform liquid layer of ink B, and that occurrence of interdroplet interference is prevented. Therefore, the mass per area of the uncured part of ink A layer "M (ink A)" and the largest mass per area of the applied droplets of the ink B "m (ink B)" preferably satisfies a relation "m (ink B)/30<M (ink A)<m (ink B)", further preferably satisfies a relation "m (ink B)/20<M (ink A)<m (ink B)/3", and still more preferably satisfies a relation "m (ink B)/10<M (ink A)<m (ink B)/5". When a relation "m (ink B)/30<M (ink A)" is satisfied, occurrence of interdroplet interference can be prevented, and excellent dot size reproducibility can be achieved. Further, when a relation "M (ink A)<m (ink B)" is satisfied, uniform liquid layer of an ink can be formed and high density can be obtained.

The mass per area of the uncured part of the ink A can be determined by a transferring test, in which a permeable medium such as a plain paper sheet is pressed against the partially cured layer of ink A, at a point after the completion of the partial curing process (e.g., after irradiation with actinic energy rays) and prior to the discharge of the droplets of ink B, and the mass of the liquid that has been transferred onto the permeable medium from the layer of the ink A is measured.

For example, when the largest discharge amount of the droplets of the ink B in an discharge density of 600×600 dpi is 12 pL per pixel, the largest mass per area of the discharged ink B "m (ink)" is determined to be 7.4 g/cm² (here, the density of the ink B is assumed to be 1.1 g/cm³). Therefore, the mass per area of the uncured part of the layer of the ink A is preferably 0.25 to 7.4 g/cm$^2$, more preferably 0.37 to 2.5 g/cm$^2$, and still more preferably 0.74 to 1.48 g/cm$^2$.

When the curing reaction is based on an ethylene unsaturated compound or a cyclic ether, the unpolymerization rate can be quantitatively measured from the reaction rate of the ethylene unsaturated compound or the cyclic ether.

When the above-described partially cured state of the undercoat solution and/or the ink is achieved by polymerization reaction of a polymerizable compound that starts polymerization by irradiation with actinic energy rays or heating, the unpolymerization rate defined as "A (after polymerization)/A (before polymerization)" is preferably from 0.2 to 0.9, more preferably from 0.3 to 0.9, and still more preferably from 0.5 to 0.9, in terms of improving abrasion resistance of a printed material.

In the above discussion, "A (after polymerization)" indicates an absorbance at an infrared absorption peak of a polymerizable group after polymerization, and "A (before polymerization)" indicates an absorbance at an infrared absorption peak of a polymerizable group before polymerization. For example, when the polymerizable compound contained in the undercoat solution and/or the ink is an acrylate monomer or a methacrylate monomer, an absorption peak based on a polymerizable group (acrylate group or methacrylate group) can be observed in the vicinity of 810 cm$^{-1}$, and the unpolymerizaion rate is preferably determined by the absorbance at this peak. On the other hand, when the polymerizable compound is an oxetane compound, an absorption peak based on a polymerizable group (oxetane group) can be observed in the vicinity of 986 cm$^{-1}$, and the unpolymerizaion rate is preferably determined by the absorbance at this peak. Further, when the polymerizable compound is an epoxy compound, an absorption peak based on a polymerizable group (epoxy group) can be observed in the vicinity of 750 cm$^{-1}$, and the unpolymerizaion rate is preferably determined by the absorbance at this peak.

As the device for measuring an infrared absorption spectrum, any commercially available infrared spectrometer of transmission type or reflection type may be used and selected according to the form of the sample. For example, an infrared spectrometer (FTS-6000, manufactured by BIO-RAD Laboratories, Inc.) can be used for the measurement.

Furthermore, a preferred partially cured state can be determined by observing the cross-section of ink droplets that have been impacted on an undercoat layer in a partially cured state.

The method of observing the cross-section is not particularly limited, but for example, a commercially available microtome (for example, manufactured by Leica Microsystems Japan, Microtome RM2255) and a commercially available optical microscope (for example, an optical microscope of Nikon Corporation, Measuring Microscope MM-40) can be used. Also, the size of an ink droplet impacted on the undercoat layer brought to a partially cured state is preferably within the range of 1 picoliter to 100 picoliters, and furthermore, the size is more preferably the same as the size of practically used ink droplets. It is also preferable to solidify the partially cured film by any method upon the observation of cross-section. The method for solidifying is not particularly limited, but freezing, curing by polymerization, or the like can be used.

The methods for partially curing the undercoating layer can be any known methods for increasing viscosity such as: (1) a method of utilizing a so-called aggregation phenomenon performed by adding a basic compound to an acidic polymer, or adding an acidic compound or metallic compound to a basic polymer; (2) a method of adjusting the viscosity of the undercoat solution by preliminarily preparing an undercoat solution to have high viscosity, then adding a low boiling point organic solvent to the undercoat solution to decrease the viscosity thereof, and thereafter bringing the undercoat solution back to have high viscosity by evaporating the low boiling point organic solvent; (3) a method of adjusting the viscosity of the undercoat solution by heating the undercoat solution which has previously been prepared to have high viscosity, then cooling the undercoat solution back to have high viscosity; and (4) a method of causing a curing reaction by applying actinic energy rays or heat to the undercoat solution. Among these, (4) a method of causing a curing reaction by applying actinic energy rays or heat to the undercoat solution is most preferable.

The method of causing a curing reaction by applying actinic energy rays or heat to an undercoat solution is a method of causing an insufficient polymerization reaction of a polymerizable compound at the surface of the undercoat solution applied onto a recording medium. At the surface of the undercoating layer, the polymerization reaction is easily inhibited under the influences of oxygen in the air, as compared with the inside of the undercoating layer. Therefore, partial curing of the undercoating layer can be caused by regulating the conditions of application of actinic energy rays or heat.

The amount of the energy required for the partial curing of the undercoat solution varies depending on the type or content of the polymerization initiator, but is generally preferably from about 1 to about 500 mJ/cm$^2$ when energy is applied by actinic energy rays. When energy is applied by heating, it is preferable to heat a recording medium under the conditions where the surface temperature of the recording medium becomes in the range of from 40 to 80° C., for a period of from 0.1 to 1 second.

By applying actinic energy rays or heat such as active light or heat, generation of active species can be promoted by decomposition of the polymerization initiator, and the curing reaction due can also be promoted to polymerization or crosslinking of a polymerizable or crosslinkable material resulting from the active species, by the increased active species or elevated temperature. Increasing of viscosity can also be favorably performed by irradiating with active light or heating.

In the above, the partial curing of the undercoat solution has been discussed, but the same will apply to the cases of partially curing the ink (hereinafter, referred to as "ink liquid" sometimes).

The viscosity (25° C.) of the undercoat solution at the interior in the above-described "partially cured" state is preferably 5000 mPa·s or more. Furthermore, the viscosity (25° C.) of the undercoat solution at the surface part in the above-described "partially cured" state is preferably 100 mPa·s or more and less than 5000 mPa·s. The respective viscosities (25° C.) of the undercoat solution at the surface part and at the interior can be obtained by dividing and collecting by scraping the respective parts, and measuring the viscosity with a commercially available viscometer (for example, a portable digital viscometer for laboratory use, Viscostic, of Maruyasu Industries Co., Ltd.).

Further, the viscosity (25° C.) of the undercoat solution at the interior in the "partially cured" state is preferably 1.5 times or higher, and more preferably 2 times or more, the viscosity (25° C.) of the undercoat solution at the surface part in the "partially cured" state, from the viewpoint of suppressing the uniting of adjacent ink droplets by the interaction between the undercoat solution and the ink droplets. It is even more preferable if the viscosity at the interior is 3 times or higher the viscosity at the surface part.

A standard of the degree of polymerization of the polymerizable compound at the surface of the partially cured undercoat solution is preferably 1% or higher and 70% or lower, more preferably 5% or higher and 60% or lower, and particularly preferably 10% or higher and 50% or lower. The degree of polymerization as described above can be measured by IR spectroscopy or the like.

Details of the active energy ray are the same as in the case of the fixing process that will be described later. For example, ultraviolet ray, visible ray, α-ray, γ-ray, X-ray, electronic ray and the like may be mentioned, and from the viewpoint of the costs and safety, ultraviolet ray and visible ray are preferred, furthermore the ultraviolet ray is particularly preferred.

—Fixing—

A fixing process is preferably carried out after the processes of above discussed undercoat solution applying, partial curing and recording. In the fixing process, curing of the undercoat solution and discharged ink is further promoted by applying energy or the like, thereby fixing the recorded image.

When a polymerizable or crosslinkable material is contained in the image, the curing reaction due to the polymerization or crosslinking of the material is promoted by applying energy, and therefore an image having higher strength can be formed more efficiently. For example, in a case of a system containing a polymerization initiator, generation of active species is promoted by the decomposition of the polymerization initiator, and the curing reaction resulting from polymerization or crosslinking of polymerizable or crosslinkable materials due to the active species is promoted by the increased active species or elevated temperature.

Application of energy can favorably be performed by irradiating with actinic energy rays or heating. As the actinic energy, similar ones to the later discussed active lights for image fixation can be used, such as ultraviolet rays, visible rays, α-rays, γ-rays, X-rays and electron beams, wherein ultraviolet rays and visible rays are preferable and ultraviolet rays are particularly preferable, from the viewpoint of cost or safety.

Further, the heating can be performed using a non-contact type heating device, and preferable ones include a heating device in which the recording medium passes through, such as an oven, or a heating device in which exposure is performed over the whole area with light in the range of ultraviolet light—visible light—infrared light, or the like. Examples of the preferable light sources for use in exposure as a heating device include a metal halide lamp, xenon lamp, tungsten lamp, carbon arc lamp and a mercury lamp.

When the energy is applied by irradiation with active light, the amount of the energy required for curing reaction varies depending on the type or content of the polymerization initiator, but is generally preferably from about 100 to about 10,000 mJ/cm². When the energy is applied by heating, it is preferable to heat a recording medium under such conditions that the surface temperature of the recording medium becomes from 40 to 80° C., for a period of from 0.1 to 1 second.

(Curing Sensitivity of Ink and Undercoat Solution)

In the invention, the curing sensitivity of the ink is preferably equal to or higher than the curing sensitivity of the undercoat solution. More preferably, the curing sensitivity of the ink is not less than the curing sensitivity of the undercoat solution and not more than 4 times as high as the curing sensitivity of the undercoat solution. Further preferably, the curing sensitivity of the ink is not less than the curing sensitivity of the undercoat solution and not more than twice as high as the curing sensitivity of the undercoat solution or less.

When the curing sensitivity of the ink is equal to or higher than the curing sensitivity of the undercoat solution, uniform dot diameter and dot shape can be obtained in cases of discharging an ink onto an undercoat solution or onto an ink that has previously been discharged to form a multicolor image.

The curing sensitivity here refers to the amount of the energy necessary to completely cure the ink and/or the undercoat solution using a mercury lamp of super high pressure, high pressure, medium pressure or the like, preferably a super high pressure mercury lamp. Smaller amount of the energy indicates that the sensitivity is higher. Therefore, the curing sensitivity being twice as high indicates that the amount of energy is ½ as much.

When one of the two curing sensitivities is not more than twice as high as the other, preferably not more than time and a half (1.5 times) as high as the other, the two curing sensitivities are regarded as being equal.

(Physical Properties of Ink and Undercoat Solution)

Regarding the physical properties of the ink (liquid droplet) to be discharged onto a recording medium in an ink jet recording method, the viscosity at 25° C. thereof is preferably in the range of from 5 to 100 mPa·s, and more preferably in the range of from 10 to 80 mPa·s, although the value may vary dependent on the type of the devices.

The viscosity at 25° C. of the undercoat solution related to the first embodiment prior to partial curing is preferably in the range of 10 mPa·s or more and less than 2000 mPa·s, more preferably 20 mPa·s or more and less than 1000 mPa·s, and furthermore preferably 50 mPa·s or more and less than 500 mPa·s. The viscosity at 25° C. of the undercoat solution related to the second embodiment prior to partial curing is preferably in the range of from 100 to 5000 mPa·s, and more preferably in the range of from 200 to 3000 mPa·s.

In the invention, the undercoat solution preferably contains a surfactant from the viewpoint of forming dots of desired size onto a recording medium, and preferably satisfies all of the conditions (A), (B), and (C) described below:

(A) The surface tension of the undercoat solution is smaller than that of at least one of the inks.

(B) At least one surfactant contained in the undercoat solution satisfies the following relation:

$$\gamma s(0) - \gamma s(\text{saturated}) > 0 \ (\text{mN/m}).$$

(C) The surface tension of the undercoat solution satisfies the following relation:

$$\gamma s < (\gamma s(0) + \gamma s(\text{saturated})^{max})/2.$$

In the above relations, $\gamma s$ is the value of the surface tension of the undercoat solution; $\gamma s(0)$ is the value of the surface tension of the liquid having a composition of the undercoat solution from which all surfactants are excluded; $\gamma s(\text{saturated})$ is the value of the surface tension of the liquid, wherein the liquid is obtained by adding one of the surfactants contained in the undercoat solution to the above "liquid excluding all of the surfactants", the value being measured when the surface tension reaches a point of saturation as the density of the surfactant is increased; and $\gamma s(\text{saturated})^{max}$ is the maximum value among the values of $\gamma s(\text{saturated})$ respectively measured for all kinds of the surfactants which are contained in the undercoat solution that satisfy the above condition (B).

<Condition (A)>

In the invention, the surface tension $\gamma s$ of the undercoat solution is preferably smaller than the surface tension $\gamma k$ of at least one of the inks in order to form ink dots of desired size onto the recording medium as described above.

Further, from the viewpoint of preventing spreading of the ink dots during the period from the landing of the ink droplets up to the exposure more effectively, the values of γs and γk preferably satisfy the relation of γs<γk−3 (mN/m), and more preferably satisfy the relation of γs<γk−5 (mN/m).

In a case of printing a full-color image, from the viewpoint of improving sharpness of the image, the surface tension of the undercoat solution γs is preferably at least smaller than the surface tension of the ink containing a coloring agent with high visibility, and more preferably smaller than the surface tensions of all of the inks. The coloring agent with high visibility is, for example, a coloring agent that exhibits the color of magenta, black, or cyan.

Even though the values of the surface tension of the ink γk and the surface tension of the undercoat solution γs satisfy the above-described relations, when both of the values are less than 15 mN/m, formation of the liquid droplets may become difficult at the time of discharging the ink, and the discharge may not be carried out. On the other hand, when the above values are greater than 50 mN/m, wettability with the ink jet head may be deteriorated to cause a failure in discharge. Therefore, it is preferable that each of the surface tension of the ink γk and the surface tension of the undercoat solution γs is within the range of from 15 mN/m to 50 mN/m, more preferably in the range of from 18 mN/m to 40 mN/m, and particularly preferably in the range of from 20 mN/m to 38 mN/m.

The surface tension mentioned here is a value measured in accordance with a Wilhelmy method at a liquid temperature of 20° C. and at 60% RH, by a commonly used surface tensiometer (for example, surface tensiometer CBVP-Z, manufactured by KYOWA INTERFACE SCIENCE Co., Ltd.).

<Conditions (B) and (C)>

In the invention, the undercoat solution preferably contains at least one kind of surfactant in order to form the ink dots of desired size onto a recording medium. In this case, it is preferable that at least one kind of surfactant contained in the undercoat solution satisfies the condition (B) described below:

γs(0)−γs(saturated)>0 (mN/m)   Condition (B):

Further, it is preferable that the surface tension of the undercoat solution preferably satisfies the condition (C) described below:

γs<(γs(0)+γs(saturated)$^{max}$)/2   Condition (C):

As mentioned above, γs is the value of the surface tension of the undercoat solution; γs(0) is the value of the surface tension of the liquid having a composition of the undercoat solution from which all surfactants are excluded; γs(saturated) is the value of the surface tension of the liquid, wherein the liquid is obtained by adding one kind of the surfactants contained in the undercoat solution to the above "liquid excluding all of the surfactants", and wherein the value is measured when the surface tension reaches a point of saturation as the density of the surfactant is increased; and γs(saturated)$^{max}$ is the maximum value among the values of γs(saturated) respectively measured for all kinds of surfactants contained in the undercoat solution that satisfy the above condition (B).

The value γs(0) can be obtained by measuring the value of the surface tension of the liquid having the composition of the undercoat solution from which all surfactants are excluded. The value γs(saturated) can be obtained by adding one kind of the surfactant contained in the undercoat solution to the "liquid excluding all of the surfactants", then increasing the concentration of the surfactant by the increment of 0.01% by mass, and measuring the surface tension at the point where the change in the degree of the surface tension relative to the change in the concentration of the surfactant becomes 0.01 mN/m or less.

Details of the values γs(0), γs(saturated) and γs(saturated)$^{max}$ will be discussed below by reference to the case where the components of the undercoat solution (Example 1) are: a high boiling point solvent (diethyl phthalate, manufactured by Wako Pure Chemical Industries, Ltd.); a polymerizable material (dipropylene glycol diacrylate, manufactured by Akcros Chemicals Ltd.), a polymerization initiator (TPO, shown below as "Initiator-1"); a fluorine-based surfactant (MEGAFAC F475, manufactured by Dainippon Ink and Chemicals, Inc.); and a hydrocarbon-based surfactant (sodium di-2-ethylhexyl sulfosuccinate).

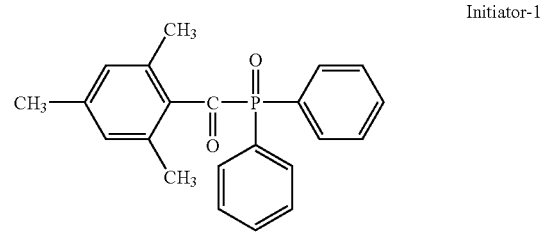 [SMILES: Cc1cc(C)c(C(=O)P(=O)(c2ccccc2)c2ccccc2)c(C)c1]

Initiator-1

In the above example, the values of γs(0), γs(saturated)$^{1}$ (when the fluorine-based surfactant is added), γs(saturated)$^{2}$ (when the hydrocarbon-based surfactant is added), γs(saturated), and γs(saturated)$^{max}$ are determined as follows.

The value of γs(0), indicating the surface tension of the liquid having a composition of the undercoat solution from which all surfactants are excluded, is determined as 36.7 mN/m.

The value of γs(saturated)$^{1}$, which is the saturated value of the surface tension of the liquid when the fluorine-based surfactant is added and the concentration thereof is increased, is determined as 20.2 mN/m.

The value of γs(saturated)$^{2}$, which is the saturated value of the surface tension of the liquid when the hydrocarbon-based surfactant is added and the concentration thereof is increased, is determined as 30.5 mN/m.

Since the undercoat solution (Example 1) contains two kinds of the surfactants that satisfy the above-described condition (B), there are two values of γs(saturated), i.e., the value when the fluorine-based surfactant is added (γs(saturated)$^{1}$) and the value when the hydrocarbon-based surfactant is added (γs(saturated)$^{2}$). Here, the value of γs(saturated)$^{max}$, i.e., the maximum value between γs(saturated)$^{1}$ and γs(saturated)$^{2}$, is determined as the value of γs(saturated)$^{2}$.

The above results are summarized as follows:

γs(0)=36.7 mN/m

γs(saturated)$^{1}$=20.2 mN/m (when the fluorine-based surfactant is added)

γs(saturated)$^{2}$=30.5 mN/m (when the hydrocarbon-based surfactant is added)

γs(saturated)$^{max}$=30.5 mN/m

From the above results, the surface tension of the undercoat solution γs preferably satisfies the relationship:

γs<(γs(0)+γs(saturated)$^{max}$)/2=33.6 mN/m.

As for the above-described condition (C), from the viewpoint of preventing spreading of the ink droplets during the period from the landing of the liquid droplets up to the exposure, the surface tension of the undercoat solution more preferably satisfies the relationship:

$$\gamma s < \gamma s(0) - 3 \times \{\gamma s(0) + \gamma s(saturated)^{max}\}/4$$

and particularly preferably satisfies the relationship:

$$\gamma s \leq \gamma s(saturated)^{max}.$$

The compositions of the ink and the undercoat solution may be selected so that the desired surface tension can be obtained, but it is preferable that these liquids contain a surfactant. As described above, in order to form the ink dots of desired size onto a recording medium, the undercoat solution preferably contains at least one kind of surfactant. Details of the surfactants will be explained below.

(Surfactant)

The surfactant used in the invention is a substance having strong surface activity to at least one solvent selected from hexane, cyclohexane, p-xylene, toluene, ethyl acetate, methylethylketone, butyl carbitol, cyclohexanone, triethylene glycol monobutyl ether, 1,2-hexanediol, propylene glycol monomethyl ether, isopropanol, methanol, water, isobornyl acrylate, 1,6-hexane diacrylate, and polyethylene glycol diacrylate; preferably a substance having strong surface activity to at least one kind of solvent from hexane, toluene, propylene glycol monomethylether, isobonylacrylate, 1,6-hexanediacrylate, and polyethylene glycol diacrylate, more preferably a substance having a strong surface activity to at least one solvent selected from propylene glycol monomethyl ether, isobornyl acrylate, 1,6-hexane diacrylate, and polyethylene glycol diacrylate; and particularly preferably a substance having strong surface activity to at least one solvent selected from isobornyl acrylate, 1,6-hexane diacrylate, and polyethylene glycol diacylate.

Whether a compound has strong surface activity to the solvents listed above can be determined by the procedures as described below.

(Procedures)

One solvent is selected from the solvents listed above and measure the surface tension thereof $\gamma_{solvent}(0)$. Add the objective compound in the same solvent used to measure the $\gamma_{solvent}(0)$, increase the concentration of the compound by the increment of 0.01% by mass, and measure the surface tension of the solution $\gamma_{solvent}$(saturated) at the point when the change in the surface tension with respect to the change in the concentration of the compound becomes 0.01 mN/m or less.

If the relationship between the $\gamma_{solvent}(0)$ and the $\gamma_{solvent}$(saturated) satisfies the following relation, the compound can be determined to have strong surface activity to the solvent:

$$\gamma_{solvent}(0) - \gamma_{solvent}(saturated) > 1 \text{ (mN/m)}.$$

Specific examples of the surfactants contained in the undercoat solution include anionic surfactants such as dialkylsulfosuccinates, alkylnaphthalenensulfonates and fatty acid salts; nonionic surfactants such as polyoxyethyleneakyl ethers, polyoxyethylenealkylallyl ethers, acetylene glycols and polyoxyethylene-polyoxypropylene block copolymers; cationic surfactants such as alkylamine salts and quaternary ammonium salts; and fluorine-based surfactants. Examples of other surfactants include the surfactants described in JP-A No. 62-173463 and JP-A No. 62-183457.

—Recording Medium—

Any recording medium of permeable, non-permeable or slow-permeable can be used as the recording medium in the ink jet recording method in the invention. Among these, a non-permeable and a slow permeable recording medium are preferable from the viewpoint that the effect of the invention can be remarkably displayed. The permeable recording medium refers to, for example, a recording medium having such properties that when a liquid droplet of 10 pL is dropped onto the recording medium, the permeation time for the total amount of the droplet is 100 ms or less. The description "substantially does not permeate" refers to, for example, the conditions where the permeability of the liquid droplets after the lapse of one minute is 5% or less. The slow-permeable recording medium refers to a recording medium having such properties that when a liquid droplet of 10 pL is dropped onto the recording medium, the permeating time for the total amount of the droplet is 100 ms or more.

Examples of the permeable recording media include plain paper, porous paper, and other recording media that are capable of absorbing a liquid.

Examples of the materials of the recording media which are non-permeable or slow-permeable include art paper, synthetic resin, rubber, resin coated paper, glass, metal, ceramic, and wood. In the invention, a composite recording medium composed of some of the above materials in combination can also be used for the purpose of adding functions.

Any kind of synthetic resin can be used as the synthetic resin, and examples thereof include polyesters such as polyethylene terephthalate and polybutadiene terephthalate, polyolefins such as polyvinyl chloride, polystyrene, polyethylene, polyurethane, and polypropylene, acrylic resins, polycarbonate, acrylonitrile-butadiene-styrene copolymers, diacetate, triacetate, polyimide, cellophane, and celluloid. The thickness and shape of the recording medium when a synthetic resin is used are not particularly limited and the medium may be any shape of film, card and block, and may be either transparent or opaque.

As to the form of usage, the synthetic resin is preferably used in the form of a film for so-called light wrapping, and various non-absorbing plastics and a film thereof can be used. Examples of the plastic films include a PET film, an OPS film, an OPP film, a PNy film, a PVC film, a PE film, a TAC film, and a PP film. Examples of other plastics include polycarbonate resins, acrylic resins, ABS resins, polyacetal resins, PVA resins, and rubbers.

Examples of the resin coated papers include a transparent polyester film, an opaque polyester film, an opaque polyolefin resin film, and a paper supporting body having both sides laminated with a polyolefin resin. A paper supporting body having both sides laminated with a polyolefin resin is particularly preferable.

The kind of the metal is not particularly limited and preferable examples thereof include aluminum, iron, gold, silver, copper, nickel, titanium, chromium, molybdenum, silicon, lead, zinc, stainless steel, and composite materials thereof.

Further, ink jet recording can be performed on the label side of read-only optical disks such as CD-ROMs and DVD-ROMs, write-once optical disks such as CD-Rs and DVD-Rs, rewritable optical disks and the like.

—Ink and Undercoat Solution—

The ink and the undercoat solution used in the ink jet recording method in the invention will be explained in detail.

The ink is composed so as to at least form an image. The ink preferably contains at least one kind selected from the polymerizable or crosslinkable materials and at least one kind selected from the radical-polymerizable compound having a phosphoric acid group, and if necessary, the ink can be constituted using a polymerization initiator, a lipophilic solvent, a colorant, and other components.

The undercoat solution related to the first embodiment preferably contains at least a radical-polymerizable compound having a phosphoric acid group, and preferably is constituted to have a composition different from that of the above-described ink. The undercoat solution related to the first embodiment preferably contains at least one polymerizable or cross-linkable material other than the radical-polymerizable compound having a phosphoric acid group, in addition to the radical-polymerizable compound having a phosphoric acid group. If necessary, the undercoat solution can be appropriately constituted using a polymerization initiator, an oleophilic solvent, a colorant and other components.

The undercoat solution related to the second embodiment contains at least a polymer and a radical-polymerizable compound having a phosphoric acid group. With a constitution as such, good images can be recorded even in the case of impacting multi-color ink droplets on the undercoat solution in an overlapping manner. For example, even in the case of drawing an image with a first ink on the undercoat solution, and then drawing dots or lines with a second ink on that image, spreading of the dots and lines is suppressed, and thus the same dots and lines as in the case where there is no image drawn with the first ink, can be drawn. Likewise, for example, in the case of drawing an image with a first ink on the undercoat solution, and then drawing a lattice pattern composed of lattice lines with a second ink on that image, spreading of the width itself of the lattice lines drawn with the second ink, is suppressed. As a result, the phenomenon in which a region located between two lattice lines, where droplets of the second ink have not been impacted, becomes narrower can be prevented, and the same lattice pattern as in the case where there is no image drawn with the first ink, can be drawn.

The undercoat solution related to the second embodiment preferably has a composition different from that of the above-described ink. Further, the undercoat solution related to the second embodiment preferably contains at least one kind or more of polymerizable or cross-linkable materials, and if necessary, the undercoat solution can be appropriately constituted using a polymerization initiator, an oleophilic solvent, a colorant and other components.

The polymerization initiator according to the invention is preferably a material which is capable of initiating a polymerization reaction or a cross-linking reaction under the action of an active energy ray. Then, the undercoat solution that is to be impacted to the recording medium can be cured by irradiating with an active energy ray.

Further, the undercoat solution preferably contains a radical polymerization initiator. It is more preferable that the undercoat solution further contains, in addition to the radical-polymerization initiator, a radical-polymerizable material other than the phosphoric acid group-containing radical-polymerizable compound. Thereby, the curing reaction of the coating solution can be performed for a short time with high sensitivity.

The ink according to the invention preferably contains a colorant. Also, it is preferable that the constitution of the undercoat solution used in combination therewith is either that the undercoat solution does not contain any colorant or contains a colorant in a content of less than 1% by mass, or that the undercoat solution contains a white pigment as a colorant. Hereinafter, various components constituting the respective liquids will be described in detail.

(Radical-Polymerizable Compound Having a Phosphoric Acid Group)

The undercoat solution of the invention contains at least one kind of radical-polymerizable compound having a phosphoric acid group (hereinafter, may be designated as "phosphoric acid group-containing radical-polymerizable compound").

The undercoat solution related to the first embodiment of the invention can favorably maintain the fine line drawing property and the binding property of adjacent dots, by adopting the above-described constitution. This phenomenon is speculated to be manifested by the balance between a polar group and a non-polar group (the molecular orientation toward the ink interface).

The undercoat solution related to the second embodiment of the invention can favorably maintain the fine line drawing property and the binding property of adjacent dots, by adopting the above-described constitution. The cause is not clear, but it is supposed to be because the phosphoric acid group-containing radical-polymerizable compound which is highly polar, diffuses into the undercoat solution and the ink solution dropwise impacted thereon, and delivers the diffusion preventive effect of the polymer to the ink.

In addition, the phosphoric acid group-containing radical-polymerizable compound may be contained in the ink solution as an optional component.

The phosphoric acid group-containing radical-polymerizable compound described above is a compound which undergoes a polymerization reaction upon irradiation with an active energy ray, by the action of a polymerization initiator that will be described later, or the like, and is cured per se. The compound can enhance the adhesive power to the recording medium that is directly contacted with, compared to a system containing a polymer only, under the effect of this polymerization reaction to make the system to attain higher molecular weight. This is speculated to be because the polarity of the phosphoric acid group affects the adhesiveness to the recording medium. As such, the undercoat solution of the invention can inhibit an image recorded on a recording medium from being peeled off under the exertion of an external force, and can form a solid image having excellent scratch resistance.

The undercoat solution of the invention can also further improve the adhesiveness between the undercoat solution of the invention and a recording medium, when used in combination with a radical-polymerizable compound having a phosphoric acid group, and a polymerizable or cross-linkable material other than the radical-polymerizable compound.

The undercoat solution of the invention has high adhesiveness to any type of recording medium such as metal, resins such as PET, or glass, and can sufficiently manifest the effect, particularly to glass and resins such as PET.

It is also possible, by using the undercoat solution of the invention, to suppress a decrease in the ink density after curing, and to enhance the printing density. Further, the undercoat solution of the invention can improve the resistance to light and oxidative gases (particularly, ozone) (light-fastness, ozone resistance) of an image recorded on an arbitrarily selected recording medium, and is also effective in improving the scratch resistance.

The phosphoric acid group-containing radical-polymerizable compound can be used without any particular limitation, as long as it is a polymerizable compound having a phosphoric acid group.

Furthermore, in the case of being used for the purpose of ink-jet recording, the phosphoric acid group-containing radical-polymerizable compound is preferably a substance which does not increase the viscosity of the undercoat solution, when added. Thus, the phosphoric acid group-containing radical-polymerizable compound is preferably a monomer. The molecular weight of the phosphoric acid group-containing radical-polymerizable compound is not particularly limited, and for example, the molecular weight is preferably between 150 and 2000, more preferably between 180 and 1500, and particularly preferably between 200 and 1200.

The number of carbon atoms in the phosphoric acid group-containing radical polymerizable compound is preferably 4 to 100, and more preferably 5 to 60, upon taking the polarity of the phosphoric acid group-containing radical-polymerizable compound, or the like, into consideration.

The number of phosphoric acid group in the phosphoric acid group-containing radical-polymerizable compound is not particularly limited, as long as there is present at least one phosphoric acid group.

As the phosphoric acid group-containing radical-polymerizable compound according to the first embodiment of the invention, a polyfunctional, phosphoric acid group-containing radical-polymerizable compound is preferred, and a trifunctional or higher functional, phosphoric acid group-containing radical-polymerizable compound is more preferred, from the viewpoint of the reproducibility for dot shape.

As the phosphoric acid group-containing radical-polymerizable compound according to the second embodiment of the invention, a compound in which all of the hydroxyl groups of phosphoric acid have been esterified is preferred, from the viewpoint of the mutual solubility with the other polymerizable compound or polymer. Furthermore, the phosphoric acid group-containing radical polymerizable compound related to the second embodiment of the invention is preferably a bifunctional or higher functional, phosphoric acid group-containing radical-polymerizable compound, and more preferably a trifunctional or higher functional, phosphoric acid group-containing radical polymerizable compound, from the viewpoint that the finally formed film has high strength, and the adhesiveness to a substrate is good.

Specific examples of the phosphoric acid group-containing radical-polymerizable compound include, for example, the following compounds.

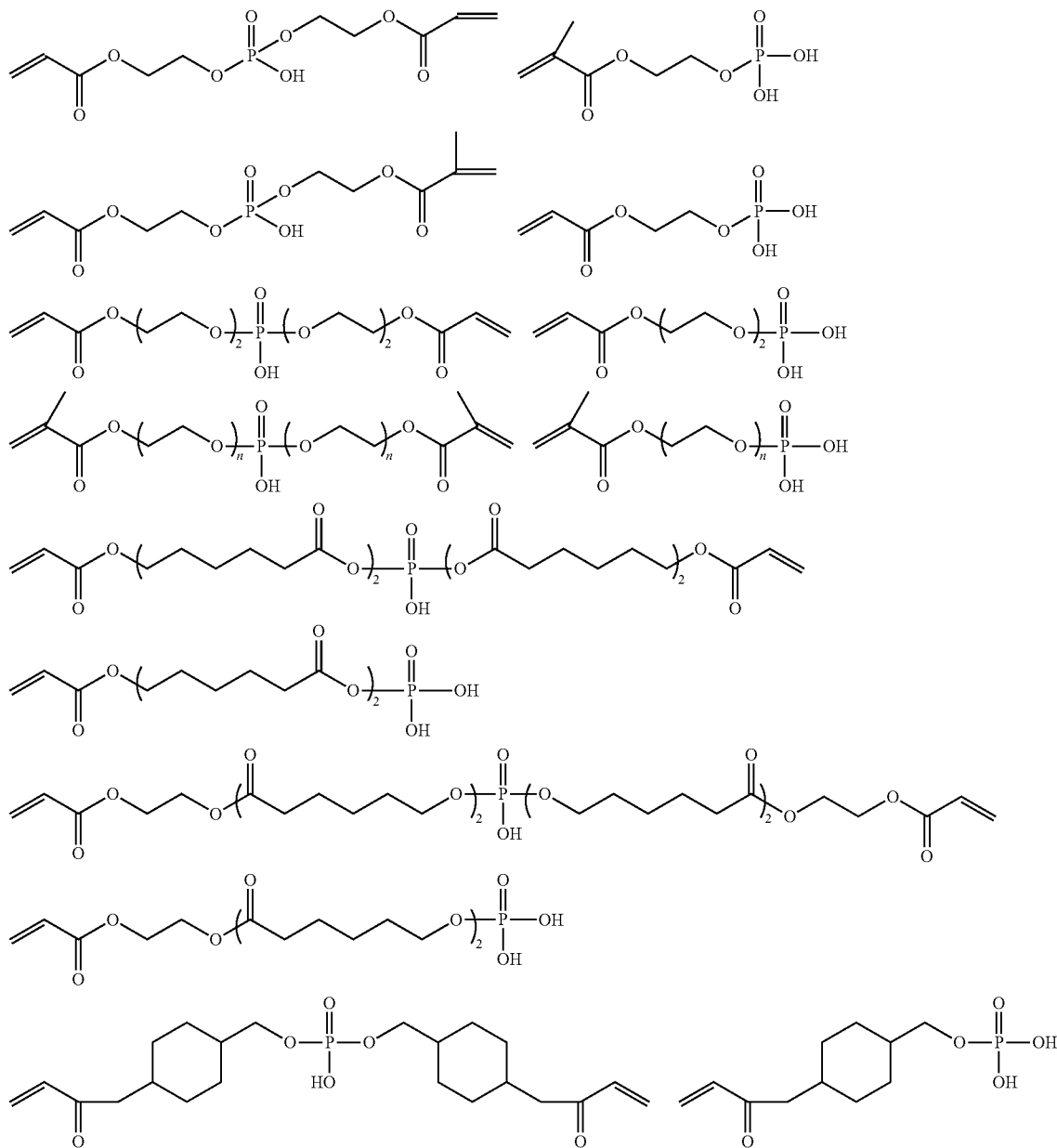

-continued

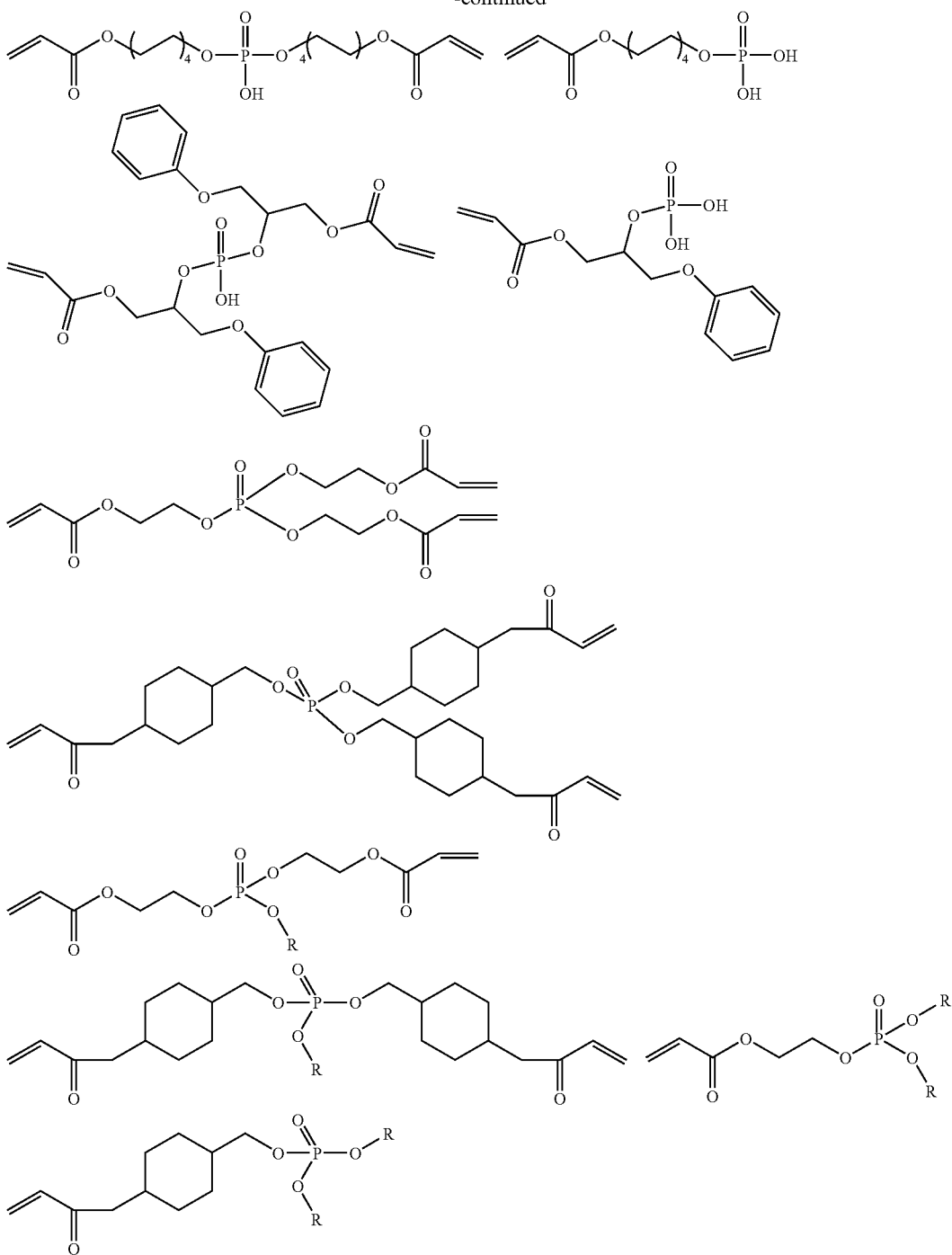

In addition, in the specific examples above, R is an alkyl group or aralkyl group having 1 to 12 carbon atoms; and n is 3 to 20.

Some of the phosphoric acid group-containing radical-polymerizable compounds have been marketed, and are commercially available. Examples of the commercially available products include Kayama PM-1, Kayama PM-2 and Kayama PM-21 manufactured by Nippon Kayaku, Ltd.; Light-Ester P-1M and Light-Ester P-2M manufactured by Kyoeisha Chemical Co., Ltd.; Viscoat #3PA manufactured by Osaka Organic Chemical Industry, Ltd.; JPA514 and JAMP514 manufactured by Johoku Chemical Co., Ltd.; and the like.

The phosphoric acid group-containing radical-polymerizable compounds may be used individually or in combination of plural species.

The content of the phosphoric acid group-containing radical-polymerizable compound in the undercoat solution related to the first embodiment is preferably 0.5 to 30% by mass, more preferably 1 to 20% by mass, and particularly preferably 2 to 10% by mass, based on the total mass of the undercoat solution. When the content of the phosphoric acid group-containing radical-polymerizable compound is within the above-described range, the effect of the invention can be more effectively manifested.

Also, the content of the phosphoric acid group-containing radical-polymerizable compound in the undercoat solution related to the second embodiment is preferably 1 to 50% by mass, more preferably 2 to 30% by mass, and particularly preferably 5 to 20% by mass, based on the total mass of the undercoat solution. When the content of the phosphoric acid group-containing radical-polymerizable compound is within the above-described range, any impairment of the dot shape, or spreading of the ink to an extent resulting in smudging or blurring of images, can be prevented. Also, spreading of the dots of impacted ink and the state of connection between dots are effectively secured.

Since the phosphoric acid group-containing radical-polymerizable compound achieves the effect of the invention even though added in a small amount, the effect thereof on curability and sensitivity may be reduced.

If the undercoat solution contains a polymerizable or cross-linkable material in addition to the phosphoric acid group-containing radical-polymerizable compound, from the viewpoint of the adhesiveness and curability of the undercoat solution, printing density and sensitivity, the mass ratio of the polymerizable or cross-linkable material (x) and the phosphoric acid group-containing radical-polymerizable compound (y), $(y/(x+y) \times 100)$, is preferably 0.2 to 20%, more preferably 1 to 15%, and particularly preferably 2 to 10%.

If the undercoat solution contains a polymerizable or cross-linkable material in addition to the phosphoric acid group-containing radical-polymerizable compound, the content of the phosphoric acid group-containing radical-polymerizable compound in the undercoat solution is preferably determined so as to satisfy the mass ratio condition when the relationship with the content of the polymerizable or cross-linkable material is taken into consideration.

(Polymer)

The undercoat solution related to the second embodiment of the invention includes at least one polymer. By including a polymer in the undercoat solution, an effect of preventing spreading of the ink that has been discharged onto the partially cured undercoat solution can be imparted to the undercoat solution.

The mechanism of the above effect has not been clear, but is presumed as follows:

That is, the viscosity of the undercoat solution increases by adding a polymer and the dot shape of the ink remains granular without reaching the bottom of the undercoat solution, when the droplet size of the discharged ink is minute. Then, as the droplet size of the ink increases, the ink starts to flow from the undercoat solution portion where the ink has accumulated and the ink droplets spread, and as a result, the ink droplets connect with the adjacent ink droplets.

Any kind of polymer can be used in the invention, but is preferably not water-soluble but oil-soluble, since in the preferable embodiment of the invention, the polymer is dissolved in an oil-soluble monomer. Examples of the non-water soluble polymers preferably used in the invention include those described in International Publication pamphlet No. 88/00723 and Japanese Application Publication Laid-Open No. 63-44658. Among these, vinyl or polyester polymers having a repeating unit containing a —(C=O)— linkage are particularly preferably used in the invention. The vinyl monomer favorably used for synthesizing the above vinyl polymers may be used in combination of two or more kinds as a comonomer to each other, according to purposes (e.g., improving solubility). Further, for the purpose of adjusting color development or solubility, a monomer having an acidic group can also be used as a comonomer to such a degree that the resulting comonomer is not water-soluble. Additionally, crosslinkable monomers having two or more ethylene unsaturated components can also be used, and the monomers of such types described in JP-A No. 60-151636 and the like can be favorably used.

When a hydrophilic monomer (here, a monomer is defined as hydrophilic when a homopolymer thereof exhibits hydrophilicity) is used as a comonomer with the vinyl monomer used in the invention, the content of the hydrophilic monomer in the copolymer is not particularly limited as long as the resulting comonomer does not exhibit hydrophilicity, but is preferably 40 mol % or less, more preferably 20 mol % or less, and still more preferably 10 mol % or less. Further, when a hydrophilic comonomer to be copolymerized with the monomer in the invention has an acidic group, the content of the hydrophilic comonomer in the copolymer is generally 20 mol % or less and preferably 10 mol % or less, and further preferably none of such a monomer is contained in the copolymer, from the viewpoint of image stability. The monomer used for polymer synthesizing is preferably methacrylate type, acrylamide type or methacrylamide type, and particularly preferably acrylamide type or methacrylamide type.

Further, the number average molecular weight of the polymers of methacrylate type, acrylamide type and methacrylamide type that can be used in the invention is preferably from 5,000 to 150,000, and more preferably from 10,000 to 100,000. Polymers consisting of only monomer(s) such as styrene, $\alpha$-methyl styrene, $\beta$-methyl styrene, or those having a substituent on the benzene ring thereof are also preferably used as the polymer in the invention. In this case, the number average molecular weight of the polymer is preferably in the range of from 500 to 5,000.

Examples of the polyester polymers used in the invention include polyester resins obtained from condensation of a polyalcohol and a polybasic acid, and polyester resins obtained by ring-opening polymerization. As the polyalcohols used for the former polyesters, glycols or polyalkyl glycols having a HO—$R_1$—OH structure ($R_1$ represents a hydrocarbon chain having 2 to 12 carbon atoms, and is an aliphatic hydrocarbon chain in particular) are effectively used; and as the polybasic acids, those having a HOOC—$R_2$—COOH ($R_2$ represents a single bond or a hydrocarbon chain having 1 to 12 carbon atoms) are effectively used. Preferable examples of the above polyalcohols and polybacic acids used in the invention include those described in JP-A No. 6-250331.

As the monomers used for preparing the latter polyesters, lactones of 4 to 9-membered ring such as $\beta$-propiolactone, $\epsilon$-caprolactone and dimethylpropiolactone are preferably used. Two or more types of the polyalcohols, polybasic acids and/or lactone monomers may be used in combination for the polyester polymers according to purposes, as is the case with the above-described vinyl polymers. A hydrophilic monomer (here, referred to as a monomer that constitutes a homopolymer thereof that exhibits hydrophilicity) can also be used as a comonomer for the polyester polymers, as is the case with the above vinyl polymers, and is preferably used in the amount as described in the case of the vinyl polymers. The polymers which are not water-soluble used in the invention is defined as the polymer having a solubility of 3 g or less, preferably 1 g or less, with respect to 100 g (25° C.) of distilled water. Specific examples of the polymers used in the invention are described below, but the invention is not limited thereto. The copolymerization ratios of the copolymers shown in the following examples are described in terms of mole ratio.

Among the polymers that can be used in the invention, acrylamide polymers are particularly preferably used, from the viewpoint that the image reproducibility of when multiple colors are overlapped is particularly excellent.

Acrylamide polymers are obtained by polymerizing an acrylamide monomer or methacrylamide monomer (hereinafter, simply referred to as "acrylamide" sometimes). It is presumed that the acrylamide polymers having an amide linkage exhibits a particularly significant effect of preventing the ink droplets from spreading by the interaction with the undercoat solution.

The acrylamide polymers used in the invention may be either a homopolymer or a copolymer. When the acrylamide polymer is a copolymer, it may be either a copolymer of two or more acrylamide monomers or a copolymer of an acrylamide monomer and a monomer other than the acrylamide monomer. The ratio of the monomers may be determined as appropriate, but in a case of a copolymer of an acrylamide monomer and a monomer other than the acrylamide monomer, the content of the acrylamide monomer is preferably 20% or more, more preferably 50% or more and further preferably 70% or more, in terms of number average molecular weight. The content of the acrylamide monomer is particularly preferably 100%. Further, the acrylamide is preferably a homopolymer for convenience of polymerization. The acrylamides used in the invention may also have a substituent such as an alkyl group, alkoxy group, aryl group, aryloxy group, heterocyclic group, heterocyclic oxy group, acyl group, acyloxy group, or halogen atom.

In the invention, the average polymerization degree of the acrylamide unit (hereinafter, simply referred to as "average polymerization degree" sometimes) of the acrylamide poloymer is preferably from 30 to 1,000, more preferably from 40 to 800 and still more preferably from 50 to 600, from the viewpoint of viscosity, solubility, preventing property of spreading of the discharged droplets and coating property, when used in the undercoat solution.

Known compounds referred to as acrylamide polymers may be selected as appropriate, but the weight average molecular weight thereof is preferably in the range of from 5,000 to 150,000, and more preferably from 10,000 to 100,000.

As the acrylamide polymers used in the invention, alkyl group-substituted acrylamide polymers and aromatic group-substituted acrylamide polymers are preferably used, and the alkyl group-substituted acrylamide polymers are most preferable. In the invention, all of the alkyl groups having a chain structure, branched structure or ring structure are defined as an alkyl group.

Preferable examples of the alkyl group-substituted acrylamide polymers include those substituted with an alkyl group of 1 to 20 carbon atoms (preferably 1 to 12, and more preferably 2 to 12) such as polyethyl acrylamide, poly t-butyl acrylamide, polyoctyl acrylamide, poly t-octyl acrylamide, polylauryl acrylamide, polycyclohexyl acrylamide, poly t-butyl methacrylamide, and polylauryl methacrylamide.

The following are part of the specific examples of the polymers used in the invention, but the invention is not limited thereto. The copolymerization ratios shown in the following specific examples are based on mole ratio.

P-1) polymethacrylate
P-2) polyethyl methacrylate
P-3) polyisopropyl methacrylate
P-4) polymethylchloro acrylate
P-5) poly(2-tert-butylphenyl acrylate)
P-6) poly(4-tert-butylphenyl acrylate)
P-7) ethyl methacrylate/n-butyl acrylate copolymer (70:30)
P-8) methyl methacrylate/acrylonitrile copolymer (65:35)
P-9) methyl methacrylate/styrene copolymer (90:10)
P-10) N-tert-butyl methacrylamide/methyl methacrylate/acrylic acid copolymer (60:30:10)
P-11) methyl methacrylate/styrene/vinyl sulfoneamide copolymer (70:20:10)
P-12) methyl methacrylate/cyclohexyl methacrylate copolymer (50:50)
P-13) methyl methacrylate/acrylic acid copolymer (95:5)
P-14) methyl methacrylate/n-butyl methacrylate copolymer (65:35)
P-15) methyl methacrylate/N-vinyl-2-pirrolidone copolymer (90:10)
P-16) poly(N-sec-butyl acrylamide)
P-17) poly(N-tert-butyl acrylamide)
P-18) polycyclohexyl methacrylate/methyl methacrylate copolymer (60:40)
P-19) n-butyl methacrylate/methyl methacrylate/acrylamide copolymer (20:70:10)
P-20) diacetone acrylamide/methyl methacrylate copolymer (20:80)
P-21) N-tert-butyl acrylamide/methyl methacrylate copolymer (40:60)
P-22) poly(N-n-butyl acrylamide)
P-23) tert-butyl methacrylate/N-tert-butyl acrylamide copolymer (50:50)
P-24) tert-butyl methacrylate/methyl methacrylate copolymer (70:30)
P-25) poly(N-tert-butyl methacrylamide)
P-26) N-tert-butyl acrylamide/methyl methacrylate copolymer (60:40)
P-27) methyl methacrylate/acrylonitrile copolymer (70:30)
P-28) methyl methacrylate/styrene copolymer (75:25)
P-29) methyl methacrylate/hexyl methacrylate copolymer (70:30)
P-30) poly(4-biphenyl acrylate)
P-31) poly(2-chlorophenyl acrylate)
P-32) poly(4-chlorophenyl acrylate)
P-33) poly(pentachlorophenyl acrylate)
P-34) poly(4-ethoxycarbonylphenyl acrylate)
P-35) poly(4-methoxycarbonylphenyl acrylate)
P-36) poly(4-cyanophenyl acrylate)
P-37) poly(4-methoxyphenyl acrylate)
P-38) poly(3,5-dimethyladamantyl acrylate)
P-39) poly(3-dimethylaminophenyl acrylate)
P-40) poly(2-naphtyl acrylate)
P-41) poly(phenyl acrylate)
P-42) poly(N,N-dibutyl acrylamide)
P-43) poly(isohexyl acrylamide)
P-44) poly(isooctyl acrylamide)
P-45) poly(N-methyl N-phenyl acrylamide)
P-46) poly(adamantyl methacrylate)
P-47) poly(sec-butyl methacrylate)
P-48) N-tert-butyl acrylamide/acrylic acid copolymer (97:3)
P-49) poly(2-chloroethyl methacrylate)
P-50) poly(2-cyanoethyl methacrylate)
P-51) poly(2-cyanomethylphenyl methacrylate)
P-52) poly(4-cyanophenyl methacrylate)
P-53) poly(cyclohexyl methacrylate)
P-54) poly(2-hydroxypropyl methacrylate)
P-55) poly(4-methoxycarbonylphenyl methacrylate)
P-56) poly(3,5-dimethyladamantyl methacrylate)
P-57) poly(phenyl methacrylate)
P-58) poly(4-butoxycarbonylphenyl methacrylamide)
P-59) poly(4-carboxyphenyl methacrylamide)
P-60) poly(4-ethoxycarbonylphenyl methacrylamide)
P-61) poly(4-methoxycarbonylphenyl methacrylamide)

P-62) poly(cyclohexyl chloroacrylate)
P-63) poly(ethyl chloroacrylate)
P-64) poly(isobutyl chloroacrylate)
P-65) poly(isopropyl chloroacrylate)
P-66) poly(phenyl acrylamide)
P-67) poly(cyclohexyl acrylamide)
P-68) poly(phenyl methacrylamide)
P-69) poly(cyclohexyl methacrylamide)
P-70) poly(butylene adipate)
P-71) polystyrene
P-72) poly(α-methylstyrene)
P-73) poly(β-methylstyrene)
P-74) poly(4-chlorostyrene)
P-75) poly(4-methoxystyrene)
P-76) poly(4-methylstyrene)
P-77) poly(2,4-dimethylstyrene)
P-78) poly(4-isopropylstyrene)
P-79) poly(4-t-butylstyrene)
P-80) poly(3,4-dichlorostyrene)
P-81) poly(N-ethyl acrylamide)
P-82) poly(N-n-octyl acrylamide)
P-83) poly(N-t-octyl acrylamide)
P-84) poly(N-lauryl acrylamide)
P-85) poly(N-methoxyethyl acrylamide)
P-86) poly(N-lauryl methacrylamide)
P-87) poly(t-butyl acrylate)
P-88) poly(t-butyl methacrylate)

The polymer(s) according to the invention may be used singly or in combination. The content of the polymer(s) in the undercoat solution is preferably from 1 to 50% by mass, more preferably from 2 to 40% by mass and still more preferably from 5 to 30% by mass, based on the total mass of the undercoat solution.

When the content of the polymer(s) is in the above range, it is further effective in that the spreading of the applied ink dots and the connection thereof can be ensured to a certain degree, while being suppressed so that the shapes of the ink droplets are not impaired and image disorder and bleeding in the image are not caused. Further, it is also advantageous in that the viscosity of the undercoat solution can be kept low, thereby enabling coating the undercoat solution with high precision, even with a low-cost roll coater.

For the undercoat solution related to the second embodiment of the invention, the combination with the polymer and the radical-polymerizable compound having a phosphoric acid group is also important from the viewpoint of attaining the effect according to the invention more effectively. An appropriate combination thereof under such viewpoint is a combination of methacrylate, acrylamide or methacrylamide, with a radical-polymerizable compound having a phosphoric acid group in which all of the hydroxyl groups in phosphoric acid have been esterified. More preferably, the combination is a combination of acrylamide with a radical-polymerizable compound having a phosphoric acid group in which all of the hydroxyl groups in phosphoric acid have been esterified, and particularly preferably a combination of acrylamide with a bifunctional or higher functional, radical-polymerizable compound having a phosphoric acid group.

For the undercoat solution related to the second embodiment of the invention, the mass ratio of the polymer and the radical-polymerizable compound having a phosphoric acid group is also important from the viewpoint of attaining the effect of the invention more effectively. The mass ratio (polymer: radical-polymerizable compound having a phosphoric acid group) under such viewpoint is preferably 1:10 to 10:1, more preferably 1:7 to 7:1, and particularly preferably 1:5 to 5:1.

For the undercoat solution related to the second embodiment of the invention, appropriate ranges for the respective contents of the polymer and the radical-polymerizable compound having a phosphoric acid group are respectively as described above. From the viewpoint of attaining the effect of the invention more effectively, the total content of the radical-polymerizable compound having a phosphoric acid group and the polymer in the undercoat solution related to the second embodiment of the invention is also important. Under the above-described viewpoint, the total content is preferably 5 to 60% by mass, more preferably 10 to 50% by mass, and particularly preferably 15 to 40% by mass, based on the total mass of the undercoat solution.

(Polymerizable or Cross-Linkable Material)

The ink and the undercoat solution according to the invention can be constituted using at least one kind of polymerizable or cross-linkable materials other than the polymerizable compound having a phosphoric acid group.

The polymerizable or cross-linkable material has a function of raising a polymerization or cross-linking reaction under the action of an initiator species, such as a radical generated from the polymerization initiator that will be described later, or the like, and curing the composition containing them.

Known polymerizable or crosslinkable materials that cause a polymerization or crosslinking reaction such as a radical polymerization reaction or dimerization reaction can be applied as the polymerizable or crosslinkable material. Examples of the polymerizable or crosslinkable materials include an addition polymerizable compound having at least one ethylenically unsaturated double bond, a polymer compound having a maleimide group in a side chain, and a polymer having a group having an unsaturated double bond positioned adjacent to an aromatic core and is capable of photo-dimerization, such as a cinnamyl group, a cinnamylidene group, a chalcone group or the like, in a side chain. Among these, an addition polymerizable compound having at least one ethylenically unsaturated double bond is more preferable, and particularly preferably a compound selected from the compounds having at least one and more preferably two or more of terminal ethylenically unsaturated bonds (monofunctional or multifunctional compound). It can be appropriately selected from the widely known compounds in the industrial field to which the invention is related, and examples thereof include a compound having a chemical form of a monomer, a prepolymer (i.e., a dimer, a trimer, and an oligomer), a mixture thereof, and a copolymer of these compounds.

The polymerizable or crosslinkable materials may be used alone, or in combination of two or more kinds.

The polymerizable or crosslinkable materials in the invention are particularly preferably various known radical polymerizable monomers that cause a polymerization reaction by an initiating species generated from a radical initiator.

Examples of the radical polymerization monomers include (meth)acrylates, (meth)acrylamides, aromatic vinyls, vinyl ethers, and compounds having an inner double bond (maleic acid, etc.). In this case, "(meth)acrylate" refers to both or either one of "acrylate" and "methacrylate," and "(meth)acryl" refers to both or either one of "acryl" and "methacryl."

Specific examples of the (meth)acrylates include the following compounds.

Specific examples of the monofunctional (meth)acrylates include hexyl(meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyl diglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-trifluoroethyl(meth)acrylate, 1H,1H,2H,2H-perfluorodecyl(meth)acrylate, 4-butylphenyl(meth)acrylate, phenyl(meth)acrylate, 2,3,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, dimethylaminoethyl(meth)acrylate, diethylaminoethyl(meth)acrylate, dimethyaminopropyl(meth)acrylate, diethylaminopropyl(meth)acrylate, trimethoxysilylpropyl(meth)acrylate, trimethylsilylpropyl(meth)acrylate, polyethyleneoxide monomethylether(meth)acrylate, oligoethyleneoxide monomethylether (meth)acrylate, polyethyleneoxide(meth)acrylate, oligoethylenoxide(meth)acrylate, oligoethyleneoxide monoalkylether(meth)acrylate, polyethyleneoxide monoalkylether(meth)acrylate, dipropylene glycol(meth)acrylate, polypropyleneoxide monoalkylether(meth)acrylate, oligopropyleneoxide monoalkylether(meth)acrylate, 2-methacryloyloxyethyl succinic acid, 2-methacryloyloxyhexahydrophthalic acid, 2-methacryloyloxyethyl-2-hydroxypropyl phthalate, butoxydiethylene glycol(meth)acrylate, trifluoroethyl(meth)acrylate, perfluorooctylethyl(meth)acrylate, 2-hydroxy-3-phenoxypropyl(meth)acrylate, EO-modified phenol(meth)acrylate, EO-modified cresol(meth)acrylate, EO-modified nonylphenol(meth)acrylate, PO-modified nonylphenol(meth)acrylate, and EO-modified-2-ethylhexyl(meth)acrylate.

Specific examples of the bifunctional(meth)acrylates include 1,6-hexadiol di(meth)acrylate, 1,10-decanediol di(meth)acrylate, neopentyl glycol di(meth)acrylate, 2,4-dimethyl-1,5-pentanediol di(meth)acrylate, butylethylpropanediol (meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate.

Specific examples of the trifunctional (meth)acrylates include trimethylolpropane tri(meth)acrylate, trimethylolethane tri(meth)acrylate, alkyleneoxide-modified tri(meth)acrylate of trimethylolpropane, pentaerythritol tri(meth)acrylate, dipentaerythritol tri(meth)acrylate, trimethylolpropane tris((meth)acryloyloxypropyl)ether, isocyanuric alkyleneoxide-modified tri(meth)acrylate, propionic dipentaerythritol tri(meth)acrylate, tris((meth)acryloyloxyethyl)isocyanurate, hydroxypivalaldehyde-modified dimethylolpropane tri(meth)acrylate, sorbitol tri(meth)acrylate, propoxylated trimethylolpropane tri(meth)acrylate, and ethoxylated glycerin triacrylate.

Specific examples of the tetrafunctional (meth)acrylates include pentaerythritol tetra(meth)acrylate, sorbitol tetra(meth)acrylate, ditrimethylolpropane tetra(meth)acrylate, propionic dipentaerythritol tetra(meth)acrylate, and ethoxylated pentaerythritol tetra(meth)acrylate.

Specific examples of the pentafunctional (meth)acrylates include sorbitol penta(meth)acrylate and dipentaerythritol penta(meth)acrylate.

Specific examples of the hexafunctional (meth)acrylates include dipentaerythritol hexa(meth)acrylate, sorbitol hexa(meth)acrylate, alkyleneoxide-modified hexa(meth)acrylate of phosphazene, and captolactone-modified dipentaerythritol hexa(meth)acrylate.

Examples of the (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth)acrylamide, N,N-dimethyl(meth)acrylamide, N,N-diethyl(meth)acrylamide, and (meth)acryloylmorphorine.

Specific examples of the aromatic vinyls include styrene, methylstyrene, dimethylstyrene, trimethylstyrene, ethylstyrene, isopropylstyrene, chlormethylstyrene, methoxystyrene, acetoxystyrene, chlorstyrene, dichlorstyrene, bromstyrene, methyl vinylbenzoate, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethyhexyl)styrene, 4-(2-ethylhexyl)styrene, allylstyrene, isopropenylstyrene, butenylstyrene, octenylstyrene, 4-t-butoxycarbonylstyrene, 4-methoxystyrene, and 4-t-butoxystyrene.

Specific examples of the vinylethers include the following compounds.

Specific examples of the monofunctional vinylethers include methyvinylether, ethylvinylether, propylvinylether, n-butylvinylether, t-butylvinylether, 2-ethylhexylvinylether, n-nonylvinylether, laurylvinylether, cyclohexylvinylether, cyclohexylmethylvinylether, 4-methylcyclohexylmethylvinylether, benzylvinylether, dicyclopentenylvinylether, 2-dicyclopentenoxyethylvinylether, methoxyethylvinylether, ethoxyethylvinylether, butoxyethylvinylether, methoxyethoxyethylvinylether, ethoxyethoxyethylvinylether, methoxypolyethylene glycol vinylether, tetrahydrofurfurylvinylether, 2-hydroxyetylvinylether, 2-hydroxypropylvinylether, 4-hydroxybutylvinylether, 4-hydroxymethylcyclohexylmethylvinylether, diethylene glycol monovinylether, polyethylene glycol vinylether, chlorethylvinylether, chlorbutylvinylether, chlorethoxyethylvinylether, phenylethylvinylether, and phenoxypolyethylene glycol vinylether.

Examples of the polyfunctional vinylethers include divinylethers such as ethylene glycol divinylether, diethylene glycol divinylether, polyethylene glycol divinylether, propylene glycol divinylether, butylene glycol divinylether, hexanediol divinylether, bisphenol A alkyleneoxide divinylether and bisphenol F alkyleneoxide divinylether; and polyfunctional vinylethers such as trimethylolethane trivinylether, trimethylolpropane trivinylether, ditrimethylolpropane tetravinylether, glycerin trivinylether, pentaerythritol tetravinylether, dipentaerythritol pentavinylether, dipentaerythritol hexavinylether, ethyleneoxide added trimethylolpropane trivinylether, propyleneoxide added trimethylolpropane trivinylether, ethyleneoxide added ditrimethylolpropane tetravinylether, propyleneoxide added ditrymethylolpropane tetravinylether, ethyleneoxide added pentaerythritol tetravinylether, propyleneoxide added pentaerythritol tetravinylether, ethyleneoxide added dipentaerythritol hexavinylether, and propyleneoxide added dipentaerythritol hexavinylether.

The vinylether compound is preferably a di- or tri-vinylether compound from the viewpoint of curing property, adhesion to a recording medium, surface hardness of the formed image or the like, and particularly preferably a divinylether compound.

Other examples of the radical polymerizable monomers in the invention include vinylesters such as vinyl acetate, vinyl propionate and vinyl versatate; allylesters such as allyl acetate; halogen-containing monomers such as vinylidene chloride and vinyl chloride; cyanide vinyls such as (meth) acrylonitrile; and olefins such as ethylene and propylene.

Among the above, the radical polymerizable monomer is preferably a (meth)acrylate and (meth)acrylamides in view of curing speed, and particularly preferably a (meth)acrylate of tetrafunctional or more in view of curing speed. From the viewpoint of the viscosity of the ink composition, it is preferable to use a polyfunctional (meth)acrylate in combination with a monofunctional or bifunctional (meth)acrylate or (meth)acrylamide.

The content of the polymerizable or crosslinkable material in the ink and the undercoat solution is preferably in the range of from 50 to 99.6% by mass with respect to the total solid content (mass) in each liquid droplet, more preferably in the range of from 70 to 99.0% by mass, and further preferably in the range of from 80 to 99.0% by mass.

The content of the polymerizable or crosslinkable material in the liquid droplet is preferably in the range of from 20 to 98% by mass with respect to the total mass of each liquid droplet, more preferably in the range of from 40 to 95% by mass, and particularly preferably in the range of from 50 to 90% by mass.

(Polymerization Initiator)

The ink and the undercoat solution can be preferably composed using at least one polymerization initiator, and it is preferable that at least the undercoat solution contains the polymerization initiator. This polymerization initiator is a compound that generates initiating species such as a radical by application of active light, heat, or both of these, and allow the polymerization or crosslinking reaction of the above-described polymerizable or crosslinkable materials to initiate, promote and cure.

From the aspect of the polymerizability, the polymerization initiator preferably causes a radical polymerization (that is, a radical polymerization initiator), and is particularly preferably a photopolymerization initiator.

The photopolymerization initiator is a compound that causes a chemical change by the action of light and an interaction with a sensitizing dye in an electronically excited state and produces at least any one of a radical, acid and base, and a photoradical generator is preferable from the viewpoint that the polymerization can be initiated with a simple means as exposure.

The photopolymerization initiator in the invention can be selected from the photopolymerization initiators having sensitivity to actinic light rays such as ultraviolet rays of from 400 to 200 nm, far ultraviolet rays, g-rays, h-rays, i-rays, KrF excimer laser beams, ArF excimer laser beams, electron beams, X-rays, molecular beams or ion beams.

Specifically, known photopolymerization initiators in the art can be used without limitation, such as the ones described in Bruce M. Monroe et al., *Chemical Reviews*, 93, 435 (1993); R. S. Davidson, *Journal of Photochemistry and Biology A: Chemistry*, 73. 81 (1993); J. P. Faussier, "Photoinitiated Polymerization—Theory and Applications", *Rapra Review Report*, vol. 9, Rapra Technology (1998); and M. Tsunooka et al., *Prog. Polym. Sci.*, 21, 1 (1996). Further, a group of compounds that oxidatively or reductively generates a bond cleavage through interaction with a sensitizing dye in an electronically excited state as described in F. D. Saeva, *Topics in Current Chemistry*, 156, 59 (1990); G. G. Maslak, *Topics in Current Chemistry*, 168, 1 (1993); H. B. Shuster et al., *JACS*, 112, 6329 (1990); I. D. F. Eaton et al., *JACS*, 102, 3298 (1980), and the like.

Preferable photopolymerization initiators can be exemplified by: (a) aromatic ketones; (b) aromatic onium salt compounds; (c) organic peroxides; (d) hexaarylbiimidazole compounds; (e) ketoxime ester compounds; (f) borate compounds; (g) azinium compounds; (h) metallocene compounds; (i) active ester compounds; and (j) compounds having a carbon-halogen bond.

Preferable examples of the (a) aromatic ketones include a compound having a benzophenone skeleton or a thioxanthone skelton described in J. P. Fouassier, J. F. Rabek, "Radiation Curing in Polymer Science and Technology", pp. 77-117 (1993). More preferable examples of the (a) aromatic ketones include α-thiobenzophenone compounds described in Japanese Patent Publication (JP-B) No. 47-6416, benzoin ether compounds described in JP-B No. 47-3981, α-substituted benzoin compounds described in JP-B No. 47-22326, benzoin derivatives described in JP-B No. 47-23664, aroylphosphonic esters described in JP-A No. 57-30704, dialkoxybenzophenone described in JP-B No. 60-26483, benzoinethers described in JP-B No. 60-26403 and JP-B No. 62-81345, α-aminobenzophenones described in JP-B No. 1-34242, U.S. Pat. No. 4,318,791 and EP No. 0284561A1, p-di(dimethylaminozenzoyl)benzene described in JP-A No. 2-211452, thio-substituted aromatic ketones described in JP-A No. 61-194062, acylphosphine sulfides described in JP-B No. 2-9597, acylphosphines described in JP-B No. 2-9596, thioxantones described in JP-B No. 63-61950, and coumarins described in JP-B No. 59-42864.

Examples of the (b) aromatic onium salt compounds include aromatic omium salts of the elements in the groups of V, VI, and VII in the periodic table, specifically N, P, As, Sb, Bi, O, S, Se, Te or I. Preferable examples thereof include iodonium salts described in EP No. 104143, U.S. Pat. No. 4,837,124, JP-A No. 2-150848 and JP-A No. 2-96514; sulfonium salts described in EP Nos. 370693, 233567, 297443, 297442, 279210 and 422570, U.S. Pat. Nos. 3,902,144, 4,933,377, 4,760,013, 4,734,444 and 2,833,827; diazonium salts (such as benzene diazoniums that may have a substituent); diazonium salt resins (such as formaldehyde resins of diazophenylamine); N-alkoxypyridium salts (examples thereof include compounds described in U.S. Pat. No. 4,743,528, JP-A Nos. 63-138345, 63-142345, 63-142346 and JP-B No. 46-42363, specific examples of which including 1-methoxy-4-phenylpyridium and tetrafluoroborate); and compounds described in JP-B Nos. 52-147277, 52-14278 and 52-14279. Radicals and acids are produced as the active species.

Examples of the (c) "organic peroxides" includes almost all of the organic compounds having one or more oxygen-oxygen bonds in the molecule and can be exemplified by ester peroxide type compounds, such as
3,3',4,4'-tetrakis(t-butylperoxycarbonyl)benzophenone,
3,3',4,4'-tetrakis(t-amylperoxycarbonyl)benzophenone,
3,3',4,4'-tetrakis(t-hexylperoxylcarbonyl)benzophenone,
3,3',4,4'-tetrakis(t-octylperoxylcarbonyl)benzophenone,
3,3',4,4'-tetrakis(cumylperoxycarbonyl)benzophenone,
3,3',4,4'-tetrakis(p-isopropylcumylperoxycarbonyl)benzophenone, and di-t-butyldiperoxyisophthalate.

Examples of the (d) hexaarylbiimidazoles include the lophin dimers described in JP-B Nos. 45-37377 and 44-86516, such as
2,2'-bis(o-chlorophenyl)-4,4',5,5'-tetraphenylbiimidazole,
2,2'-bis(o-bromophenyl)-4,4',5,5'-tetraphenylbiimidazole,
2,2'-bis(o,p-dichlorophenyl)-4,4',5,5'-tetraphenylbiimidazole,
2,2'-bis(o-chlorophenyl)-4,4',5,5'-tetrakis(m-methoxyphenyl)biimidazole,
2,2'-bis(o,o'-dichlorophenyl)-4,4',5,5'-tetraphenylbiimidazole,
2,2'-bis(o-nitrophenyl)-4,4',5,5'-tetraphenylbiimidazole,
2,2'-bis(o-methylphenyl)-4,4',5,5'-tetraphenylbiimidazole, and
2,2'-bis(o-trifluorophenyl)-4,4',5,5'-tetraphenylbiimidazole.

Examples of the (e) ketoxime esters include 3-benzoyloxyiminobutane-2-one, 3-acetoxyimonobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-p-toluenesulfonyloxyiminobutane-2-one, and 2-ethoxycarbonyloxyimino-1-phenylpropane-1-one.

Examples of the (f) borate compounds include the compounds described in U.S. Pat. Nos. 3,567,453 and 4,343,891, and EP Nos. 109,772 and 109,773.

Examples of the (g) azinium compounds are include the compounds having a N—O bond described in JP-A Nos. 63-138345, 63-142345, No. 63-142346 and 63-143537, and JP-B No. 46-42363.

Examples of the (h) metallocene compounds include the titanocene compounds described in JP-A Nos. 59-152396, 61-151197, 63-41484, 2-249, and 2-4705; and the iron-arene complexes described in JP-A Nos. 1-304453 and 1-152109.

Specific examples of the titanocene compounds include di-cyclopentadienyl-Ti-di-chloride, di-cyclopentadienyl-Ti-bis-phenyl,
di-cyclopentadienyl-Ti-bis-2,3,4,5,6-pentafluoropheny-1-yl,
di-cyclopentadienyl-Ti-bis-2,3,5,6-tetrafluoropheny-1-yl,
di-cyclopentadienyl-Ti-bis-2,4,6-trifluoropheny-1-yl,
di-cyclopentadienyl-Ti-2,6-difluoropheny-1-yl,
di-cyclopentadienyl-Ti-bis-2,4-difluoropheny-1-yl,
di-methylcyclopentadienyl-Ti-bis-2,3,4,5,6-pentafluoropheny-1-yl,
di-methylcyclopentadienyl-Ti-bis-2,3,5,6-tetrafluoropheny-1-yl,
di-methylcyclopentadienyl-Ti-bis-2,4-difluoropheny-1-yl,
bis(cyclopentadienyl)-bis(2,6-difluoro-3-(pyri-1-yl)phenyl)titanium,
bis(cyclopentadienyl)bis[2,6-difluoro-3-(methylsulfoneamide)phenyl]titanium, and
bis(cyclopentadienyl)bis[2,6-difluoro-3-(N-butylbiaroyl-amino)phenyl]titanium.

Examples of the (i) active ester compounds include the nitrobenzylester compounds described in EP Nos. 0290750, 046083, 156153, 271851 and 0388343, U.S. Pat. Nos. 3,901,710 and 4,181,531, JP-A Nos. 60-198538 and 53-133022; iminosulfonate compounds described in EP Nos. 0199672, 84515, 044115 and 0101122, U.S. Pat. Nos. 4,618,564, 4,371,605 and 4,431,774, JP-A Nos. 64-18143, 2-245756 and 4-365048; and the compounds described in JP-B No. 62-6223, JP-B No. 63-14340, and JP-A No. 59-174831.

Preferable examples of the (j) compounds having a carbon-halogen bond include the compounds described in Wakabayashi et al., *Bull. Chem. Soc. Japan*, 42, 2924 (1969), compounds described in U.K. Patent No. 1388492, compounds described in JP-A No. 53-133428, and the compounds described in German Patent No. 3337024.

Further, preferable examples of the compounds also include the compounds described in F. C. Schaefer et al., *J. Org. Chem.*, 29, 1527 (1964), compounds described in JP-A Nos. 62-58241 and 5-281728, compounds described in German Patent Nos. 2641100 and 3333450, and the compounds described in German Patent Nos. 3021590 and 3021599.

Examples of the photopolymerization initiator in the invention may be the compounds as shown below, but are not limited thereto. In the following formulae, Ar represents an aromatic group.

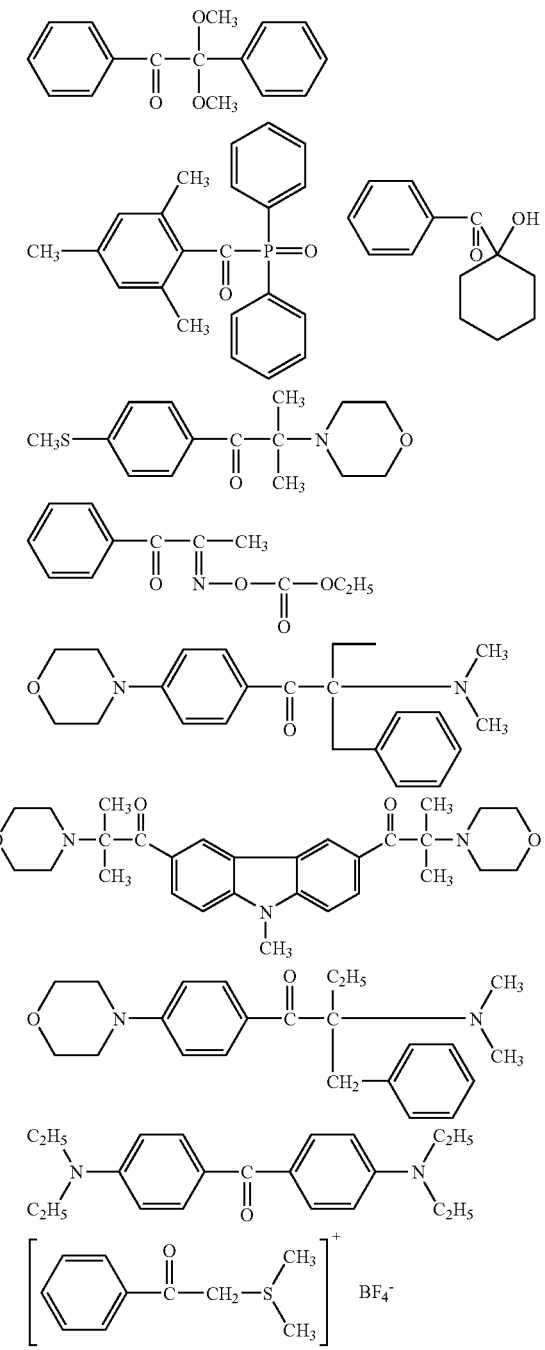

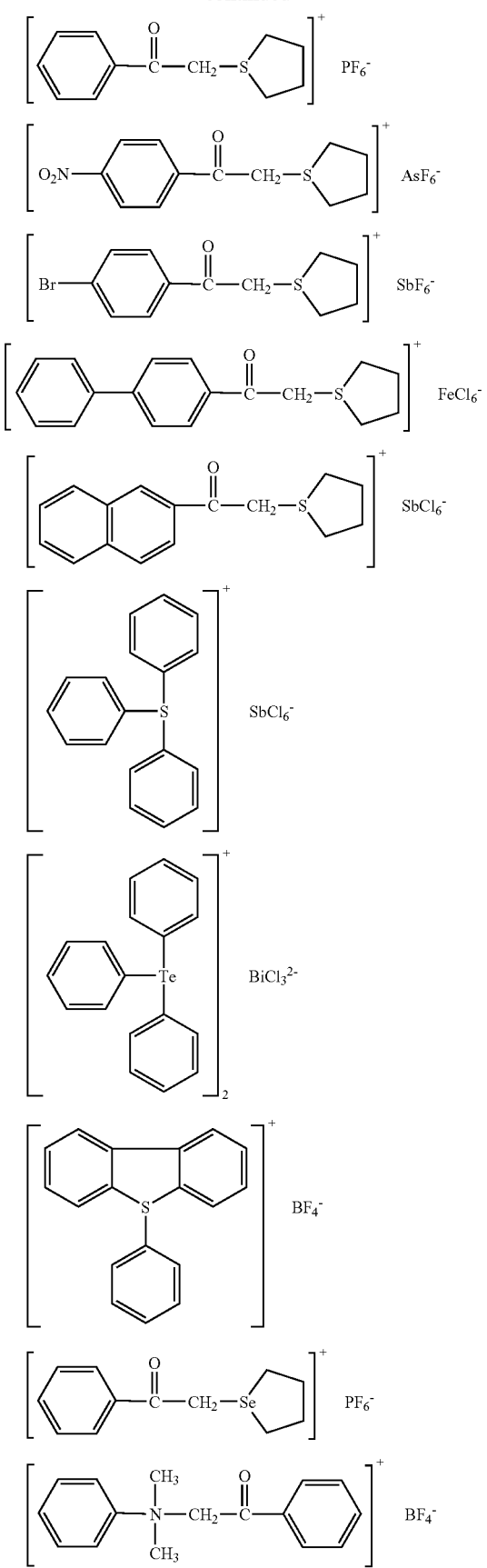
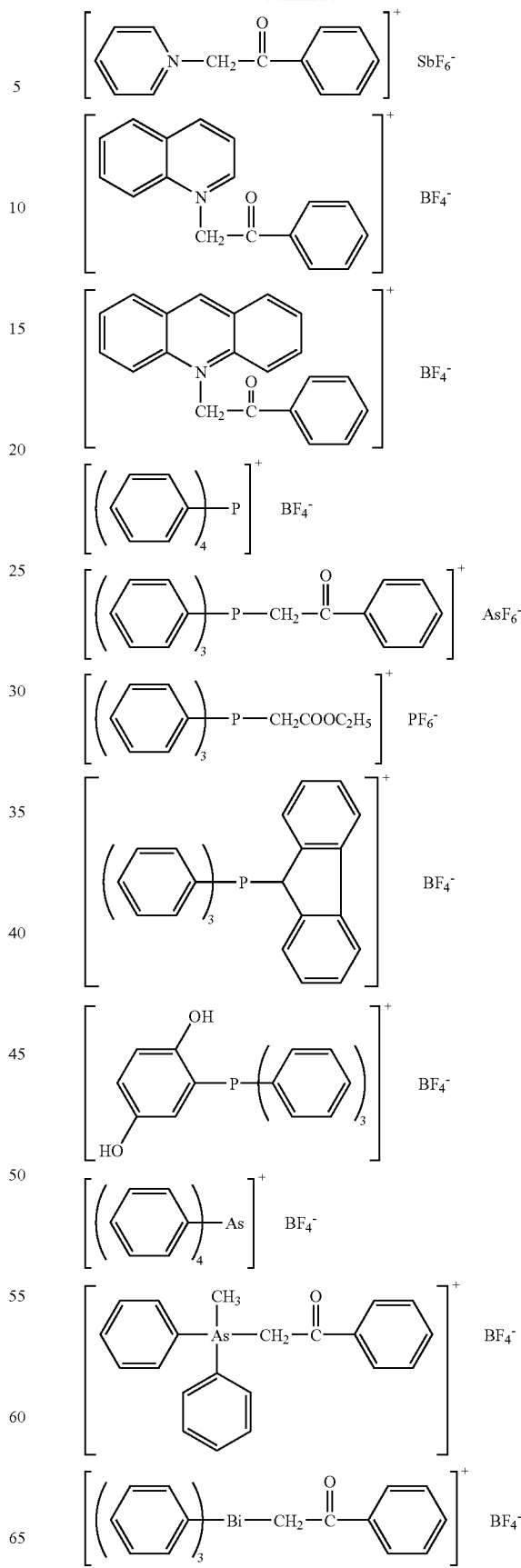

-continued
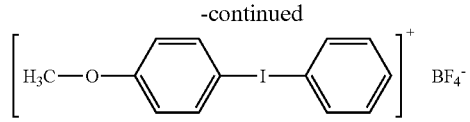
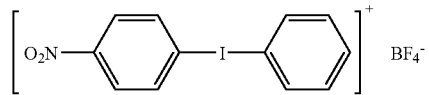
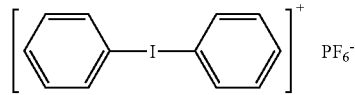
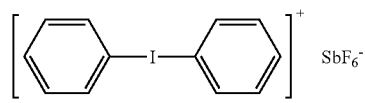
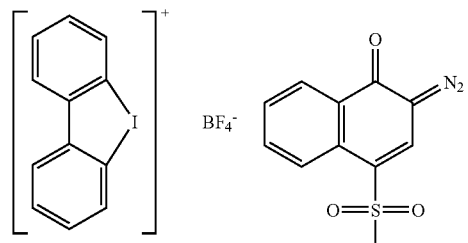
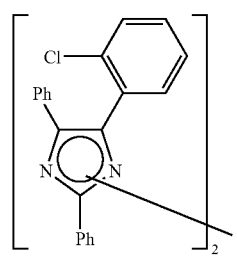
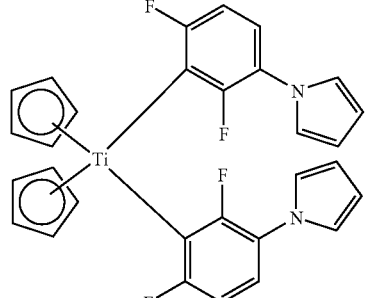
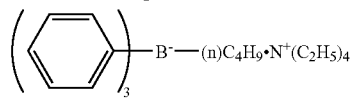
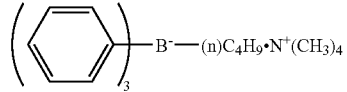
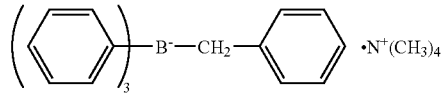
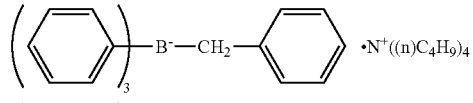
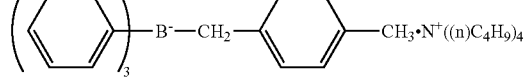
-continued
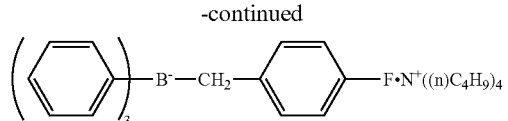
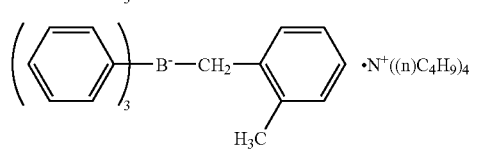
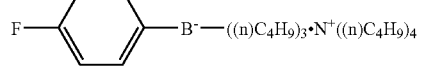
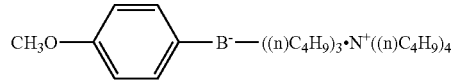
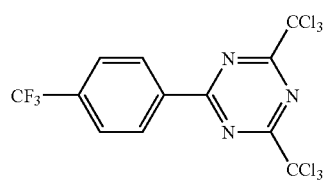
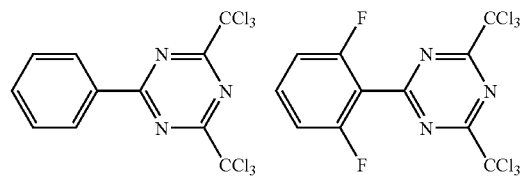
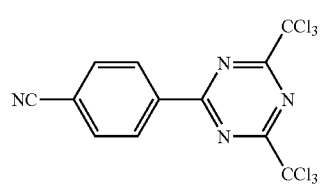
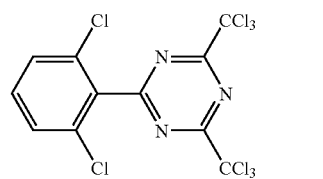
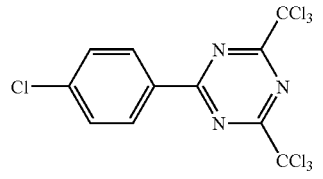
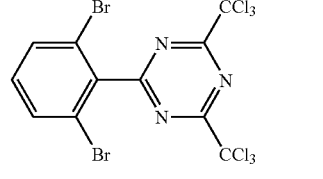
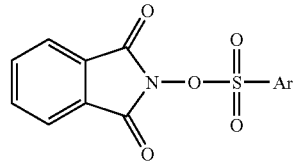

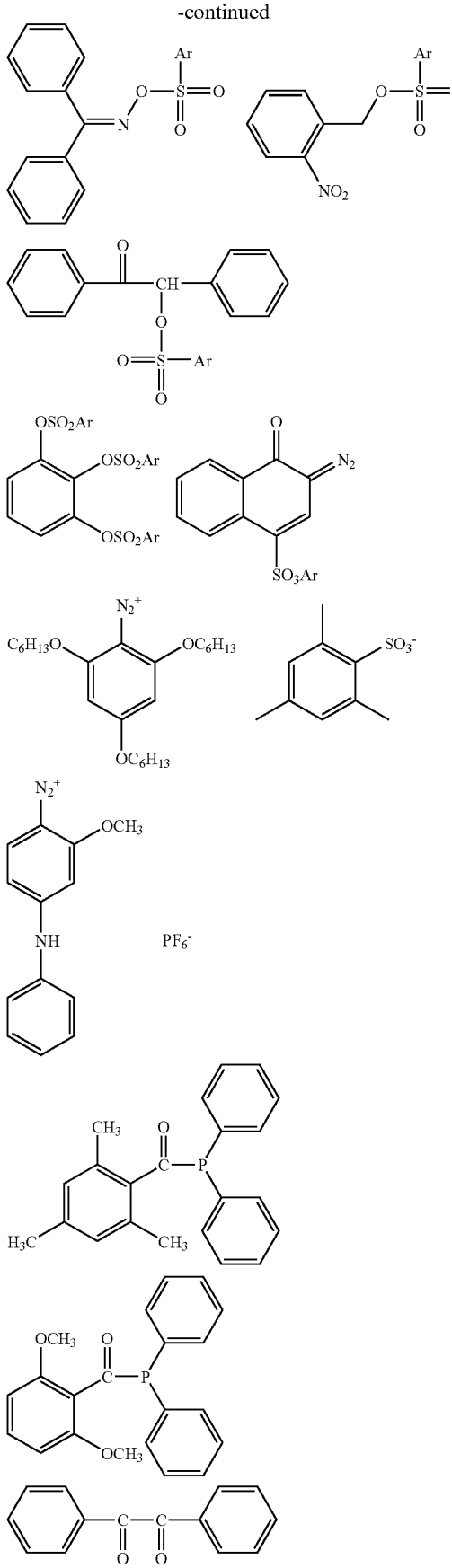

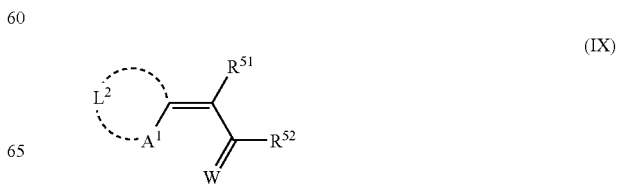

The polymerization initiator preferably has a high degree of sensitivity. However, from the viewpoint of storage stability, the polymerization initiator that does not cause thermal decomposition at a temperature up to 80° C. is preferably selected.

The polymerization initiator may be used alone or in combination of two or more kinds. Known sensitizers may be also used in combination for the purpose of improving the sensitivity as long as the effect of invention is not spoiled.

The content of the polymerization initiator in the undercoat solution is preferably in the range of from 0.5 to 20% by mass with respect to the amount of the polymerizable material contained in the undercoat solution, more preferably from 1 to 15% by mass, and particularly preferably from 3 to 10% by mass, from the viewpoint of temporal stability, curing property and curing speed. By containing the polymerization initiator of the amount in the above-described range, occurrence of precipitation or separation with the lapse of time and deterioration in the performances such as ink strength or rubbing resistance after curing can be suppressed.

The polymerization initiator may be contained in the ink as well as in the undercoat solution, and the content thereof can be appropriately determined in the range where the storage stability of the ink can be maintained at the desired level. The content of the polymerization initiator in the ink droplet is preferably from 0.5 to 20% by mass with respect to the polymerizable or crosslinkable compound in the ink, and more preferably from 1 to 15% by mass.

(Sensitizing Dye)

A sensitizing dye may be added for the purpose of improving the sensitivity of the photopolymerization initiator in the invention. Preferred examples of the sensitizing dyes are the compounds included in the following compounds indicated below and have an absorption wavelength in the range of from 350 nm to 450 nm.

Polynuclear aromatics (for example, pyrene, perylene, and triphenylene), xanthenes (for example, fluorescein, eosin, erythrosine, rhodamine B, and rose bengal), cyanines (for example, thiacarbocyanine and oxacarbocyanine), merocyanines (for example, merocyanine and carbomerocyanine), thiazines (for example, thionine, methylene blue, and toluyzine blue), acridines (for examples, acridine orange, chloroflavin, and acriflavin), anthraquinones (for example, anthraquinone), squaryliums (for example, squarylium), and cumarins (for example, 7-diethylamino-4-methylcumarin).

Examples of the preferred sensitizing dyes are the compounds represented by the following Formulae (IX) to (XIII).

(IX)

$$\begin{array}{c} L^2 \diagdown A^1 = \diagup R^{51} \\ \diagdown R^{52} \\ W \end{array}$$

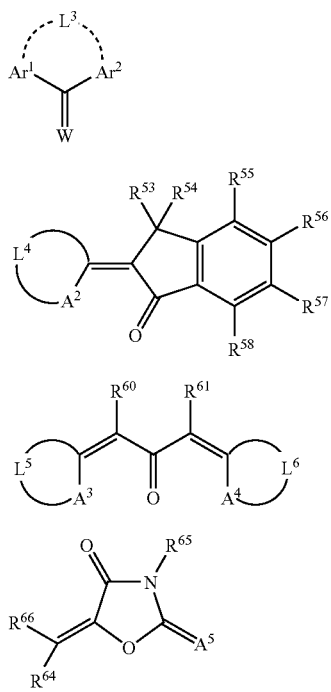

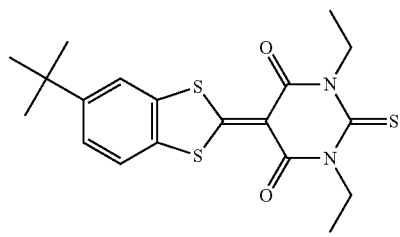

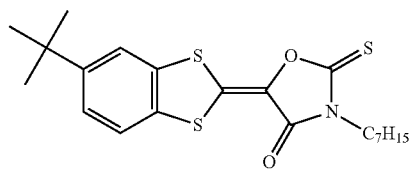

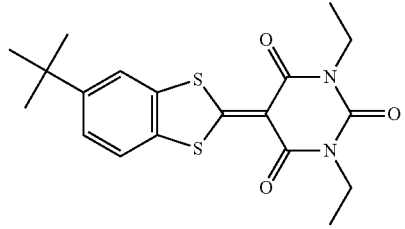

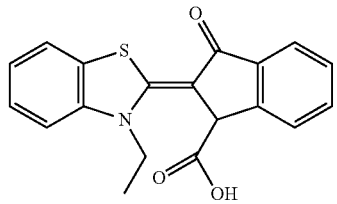

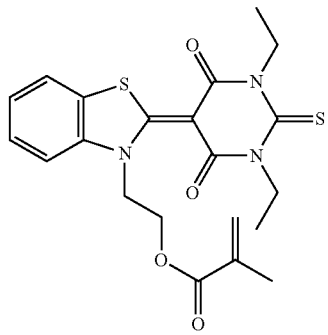

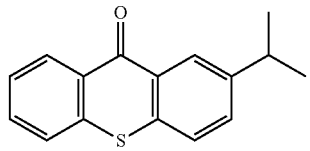

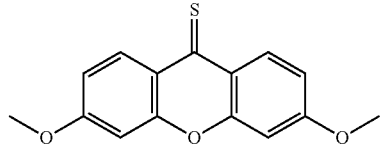

In Formula (IX), $A^1$ represents a sulfur atom or —$NR^{50}$—, $R^{50}$ represents an alkyl group or an aryl group, $L^2$ represents a non-metal atomic group that forms a basic nucleus of a dye together with the adjacent $A^1$ and the adjacent carbon atom, $R^{51}$ and $R^{52}$ each independently represent a hydrogen atom or a monovalent non-metal atomic group, wherein $R^{51}$ and $R^{52}$ may form an acid nucleus of a dye by bonding to each other. W represents an oxygen atom or a sulfur atom.

In Formula (X), $Ar^1$ and $Ar^2$ each independently represent an aryl group, and connect with each other via a bond by -$L^3$-, wherein $L^3$ represents —O— or —S—. W represents an oxygen atom or a sulfur atom.

In Formula (XI), $A^2$ represents a sulfur atom or —$NR^{59}$—, $L^4$ represents a non-metal atomic group that forms a basic nucleus of a dye together with the adjacent $A^2$ and the carbon atom. $R^{53}$, $R^{54}$, $R^{55}$, $R^{56}$, $R^{57}$, and $R^{58}$ each independently represent a group of a monovalent non-metal atomic group, and $R^{59}$ represents an alkyl group or an aryl group.

In Formula (XII), $A^3$ and $A^4$ each independently represent —S—, —$NR^{62}$—, or —$NR^{63}$—, $R^{62}$ and $R^{63}$ each independently represent a substituted or unsubstituted alkyl group or a substituted or unsubstituted aryl group, $L^5$ and $L^6$ each independently represent a non-metal atomic group that forms a basic nucleus of a dye together with the adjacent $A^3$, $A^4$, and the adjacent carbon atom, and $R^{60}$ and $R^{61}$ each independently represent a hydrogen atom or a monovalent non-metal atomic group, or can form an aliphatic or aromatic ring by bonding to each other.

In Formula (XIII), $R^{66}$ represents an aromatic ring or a hetero ring that may have a substituent, and $A^5$ represents an oxygen atom, a sulfur atom, or —$NR^{67}$—. $R^{64}$, $R^{65}$, and $R^{67}$ each independently represent a hydrogen atom or a monovalent non-metal atomic group, and $R^{67}$ and $R^{64}$, and $R^{65}$ and $R^{67}$ can bond to each other to form an aliphatic or an aromatic ring.

Specific examples of the compounds represented with the Formulae (IX) to (XIII) include Exemplary Compounds (A-1) to (A-20) shown as follows.

-continued

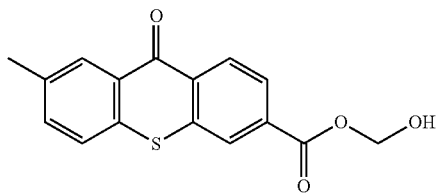
(A-8)

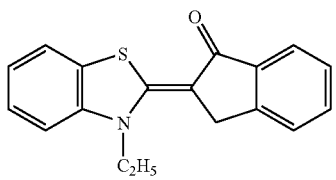
(A-9)

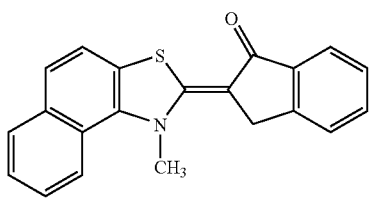
(A-10)

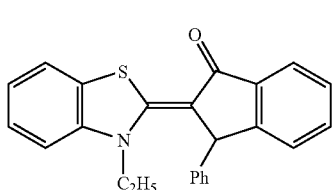
(A-11)

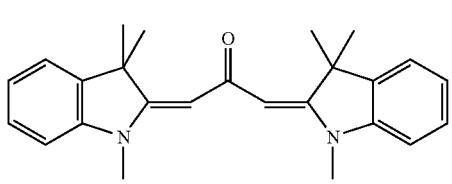
(A-12)

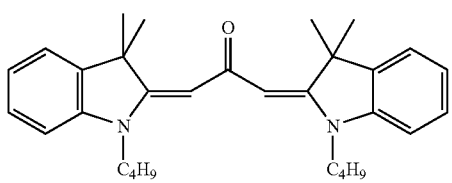
(A-13)

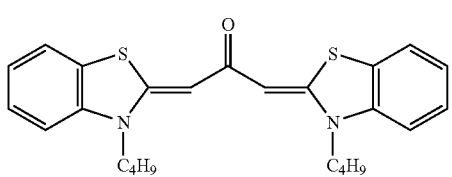
(A-14)

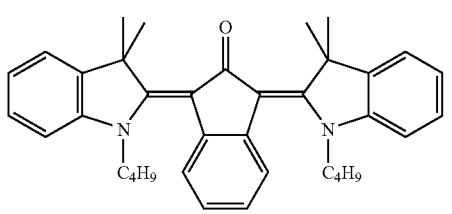
(A-15)

-continued

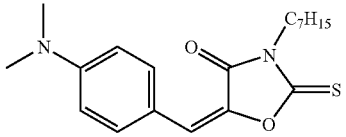
(A-16)

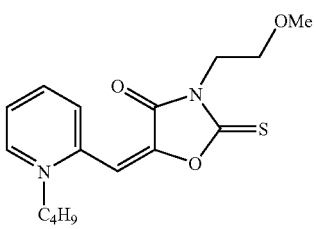
(A-17)

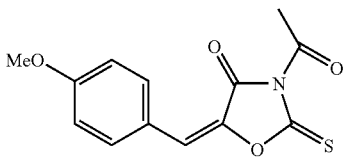
(A-18)

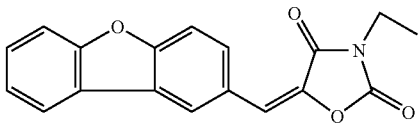
(A-19)

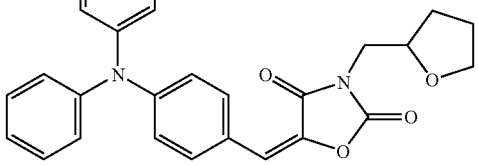
(A-20)

(Cosensitizer)

Known compounds having the capacity to further improve sensitivity or suppress the inhibition of polymerization by oxygen may be added as a cosensitizer.

Examples of the cosensitizers include amines such as the compounds described in M. R. Sander et al., *Journal of Polymer Society*, vol. 10, 3173 (1972), JP-B No. 44-20189, JP-A Nos. 51-82102, 52-134692, 59-138205, 60-84305, 62-18537 and 64-33104, and *Research Disclosure* No. 33825. Specific compounds thereof include triethanolamine, p-dimethylaminobenzenethylester, p-formyldimethyaniline, and p-methylthiodimethylaniline.

Other examples of the cosensitizers include thiols and sulfides such as the thiol compounds described in JP-A No. 53-702, JP-B No. 55-500806, and JP-A No. 5-142772, and the disulfide compounds described in JP-A No. 56-75643. Specific examples thereof include 2-mercaptobenzothiazole, 2-mercaptobenzoxazole, 2-mercaptobenzoimidazole, 2-mercapto-4-(3H)-quinazoline, and β-mercaptonaphthalene.

Other examples of the cosensitizers further include amino acid compounds (for example, N-phenylglycine), the organic metal compounds described in JP-B No. 48-42965 (for example, tributyl tin acetate), the hydrogen donors described in JP-B No. 55-34414, the sulfur compounds described in JP-A No. 6-308727 (for example, trithiane), the phosphor compounds described in JP-A No. 6-250387 (for example, diethylphosphite), and the compounds of Si—H and Ge—H described in JP-A No. 8-65779.

(Colorant)

The ink and the undercoat solution preferably contain at least one coloring agent, and more preferably a coloring agent is contained at least in the ink. The coloring agent may be included in the undercoat solution and other liquids other than the ink.

The coloring agent is not particularly limited, and may be appropriately selected from known water-soluble dyes, oil-soluble dyes, and pigments. The ink and the undercoat solution in the invention are preferably composed as a non-water soluble organic solvent system from the viewpoint of the effect of the invention, and oil-soluble dyes or pigments that readily dissolve and uniformly disperse in a non-water soluble medium are preferably used.

The content of the coloring agent in the ink is preferably from 1 to 30% by mass, more preferably from 1.5 to 25% by mass, and particularly preferably from 2 to 15% by mass. When the undercoat solution contains a white pigment, the content thereof in the undercoat solution is preferably from 2 to 45% by mass, and more preferably from 4 to 35% by mass.

Details of the pigments will be explained focusing on the preferable examples thereof in the invention.

(Pigment)

In the invention, it is preferable that a pigment is used as the coloring agent. Either of organic pigments and inorganic pigments can be used as the pigment, but a carbon black pigment can be named as a preferable black pigment. The pigments of black and the three basic colors of cyan, magenta, and yellow are generally used, but pigments having other hues such as red, green, blue, brown and white, metallic-glossy pigments such as gold and silver, and body pigments of colorless or a light color can also be used depending on the purposes.

Examples of the organic pigments are not limited by the hues thereof, and include the pigments of perylene, perynone, quinacridone, quinacridone quinone, anthraquinone, anthoanthrone, benzimidazolone, disazo condensation, disazo, azo, indanthrone, phthalocyanine, triarylcarbonium, dioxadine, aminoanthraquinone, diketopyrrolopyrrole, thio indigo, isoindoline, isoindolinone, pyranthrone and isoviolanthrone, and mixtures thereof.

Further specific examples of the pigments include perylene-based pigments such as C. I. Pigment Red 190 (C. I. No. 71140), C. I. Pigment Red 224 (C. I. No. 71127), and C. I. Pigment Violet 29 (C. I. No. 71129); perynone-based pigments such as C. I. Pigment Orange 43 (C. I. No. 71105) and C. I. Pigment Red 194 (C. I. No. 71100); quinacridone-based pigments such as C. I. Pigment Violet 19 (C. I. No. 73900), C. I. Pigment Violet 42, C. I. Pigment Red 122 (C. I. No. 73915), C. I. Pigment Red 192, C. I. Pigment Red 202 (C. I. No. 73907), C. I. Pigment Red 207 (C. I. No. 73900 and No. 73906), and C. I. Pigment Red 209 (C. I. No. 73905); quinacridone quinone-based pigments such as C. I. Pigment Red 206 (C. I. No. 73900/73920), C. I. Pigment Orange 48 (C. I. No. 73900/73920), and C. I. Pigment Orange 49 (C. I. No. 73900/73920); anthraquinone-based pigments such as C. I. Pigment Yellow 147 (C. I. No. 60645); anthoanthrone-based pigments such as C. I. Pigment Red 168 (C. I. No. 59300); benzimidazolone-based pigments such as C. I. Pigment Brown 25 (C. I. No. 12510), C. I. Pigment Violet 32 (C. I. No. 12517), C. I. Pigment Yellow 180 (C. I. No. 21290), C. I. Pigment Yellow 181 (C. I. No. 11777), C. I. Pigment Orange 62 (C. I. No. 11775), and C. I. Pigment Red 185 (C. I. No. 12516); disazo condensation-based pigments such as C. I. Pigment Yellow 93 (C. I. No. 20710), C. I. Pigment Yellow 94 (C. I. No. 20038), C. I. Pigment Yellow 95 (C. I. No. 20034), C. I. Pigment yellow 128 (C. I. No. 20037), C. I. Pigment Yellow 166 (C. I. No. 20035), C. I. Pigment Orange 34 (C. I. No. 21115), C. I. Pigment Orange 13 (C. I. No. 21110), C. I. Pigment Orange 31 (C. I. No. 20050), C. I. Pigment Red 144 (C. I. No. 20735), C. I. Pigment Red 166 (C. I. No. 20730), C. I. Pigment Red 220 (C. I. No. 20055), C. I. Pigment Red 221 (C. I. No. 20065), C. I. Pigment Red 242 (C. I. No. 20067), C. I. Pigment Red 248, C. I. Pigment Red 262, and C. I. Pigment Brown 23 (C. I. No. 20060);

Disazo-based pigments such as C. I. Pigment Yellow 13 (C. I. No. 21100), C. I. Pigment Yellow 83 (C. I. No. 21108), and C. I. Pigment Yellow 188 (C. I. No. 21094); azo-based pigments such as C. I. Pigment Red 187 (C. I. No. 12486), C. I. Pigment Red 170 (C. I. No. 12475), C. I. Pigment Yellow 74 (C. I. No. 11714), C. I. Pigment Yellow 150 (C. I. No. 48545), C. I. Pigment Red 48 (C. I. No. 15865), C. I. Pigment Red 53 (C. I. No. 15585), C. I. Pigment Orange 64 (C. I. No. 12760), and C. I. Pigment Red 247 (C. I. No. 15915); indanthrone-based pigments such as C. I. Pigment Blue 60 (C. I. No. 69800); phthalocyanine-based pigments such as C. I. Pigment Green 7 (C. I. No. 74260), C. I. Pigment Green 36 (C. I. No. 74265), C. I. Pigment Green 37 (C. I. No. 74255), C. I. Pigment Blue 16 (C. I. No. 74100), C. I. Pigment Blue 75 (C. I. No. 74160: 2), and 15 (C. I. No. 74160); triarylcarbonium-based pigments such as C. I. Pigment Blue 56 (C. I. No. 42800) and C. I. Pigment Blue 61 (C. I. No. 42765: 1); dioxadine-based pigments such as C. I. Pigment Violet 23 (C. I. No. 51319) and C. I. Pigment Violet 37 (C. I. No. 51345); aminoanthraquinone-based pigments such as C. I. Pigment Red 177 (C. I. No. 65300); diketopyrrolopyrrole-based pigments such as C. I. Pigment Red 254 (C. I. No. 56110), C. I. Pigment 255 (C. I. No. 561050), C. I. Pigment Red 264, C. I. Pigment Red 272 (C. I. No. 561150), C. I. Pigment Orange 71, and C. I. Pigment Orange 73; thio indigo-based pigments such as C. I. Pigment Red 88 (C. I. No. 73312); isoindoline-based pigments such as C. I. Pigment Yellow 139 (C. I. No. 56298) and C. I. Pigment Orange 66 (C. I. No. 48210); isoindolinone-based pigments such as C. I. Pigment Yellow 109 (C. I. No. 56284) and C. I. Pigment Orange 61 (C. I. No. 11295); pyranthrone-based pigments such as C. I. Pigment Orange 40 (C. I. No. 59700) and C. I. Pigment Red 216 (C. I. No. 59710); and isoviolanthrone-based pigments such as C. I. Pigment Violet 31 (60010).

In the invention, two or more kinds of the organic pigments or solid solutions of the organic pigments can be combined and used.

Other materials such as particles composed of a core of silica, almina, resin or the like having a dye or a pigment fixed on the surface, an insoluble laked compound of a dye, colored emulsion and colored latex can also be used as the pigment. Further, a pigment coated with a resin can be also used, which is called a micro capsule pigment and the products thereof are commercially available from Dainippon Ink and Chemicals, Inc., Toyo Ink MFG. Co., Ltd. and the like.

The volume average particle diameter of the pigment particles contained in the liquid is preferably in the range of from 10 to 250 nm, from the viewpoint of the balance between optical concentration and storage stability, and further preferably from 50 to 200 nm. The volume average particle diameter of the pigment particles can be measured with a particle diameter distribution analyzer such as LB-500 (manufactured by HORIBA, Ltd.).

The coloring agents may be used alone or in the form of a mixture of two or more kinds thereof. Further, different coloring agents may be used in different liquid droplets to be discharged and liquids, or the same coloring agent may be used therein.

(Other Components)

Components other than the ones described above such as known additives can also be used as appropriate according to usage.

(Storage Stabilizer)

A storage stabilizer can be added in the ink and the undercoat solution according to the invention (preferably in the ink) for the purpose of suppressing undesired polymerization during storage. The storage stabilizer is preferably used together with the polymerizable or crosslinkable material, and is preferably soluble in the liquid droplets or liquid or other coexistent components in which the storage stabilizer is contained.

Examples of the storage stabilizers include a quaternary ammonium salt, hydroxylamines, cyclic amides, nitrites, substituted ureas, heterocyclic compounds, organic acids, hydroquinone, hydroquinone monoethers, organic phosphines and copper compounds, and specific examples thereof include benzyltrimethylammonium chloride, diethylhydroxylamine, benzothiazole, 4-amino-2,2,6,6-tetramethylpiperizine, citric acid, hydroquinone monomethylether, hydroquinone monobutylether and copper naphthenate.

The addition amount of the storage stabilizer is preferably adjusted as appropriate according to the activity of the polymerization initiator, polymerization capability of the polymerizable or crosslinkable material, or the type of the storage stabilizer, but is preferably from 0.005 to 1% by mass in terms of the solid content, more preferably from 0.01 to 0.5% by mass, and further preferably 0.01 to 0.2% by mass, in view of the balance between storage stability and curing property.

(Conductive Salt)

Conductive salts are solid compounds that improve conductivity. In the invention, it is preferable that the conductive salt is not substantially used since there is a large possibility that they deposit at the time of storage, but appropriate amount thereof may be added when the solubility is in good condition by enhancing the solubility of the conductive salt or using a substance having high solubility in the liquid component, and the like.

Examples of the conductive salts include potassium thiocyanate, lithium nitrate, ammonium thiocyanate and dimethylamine hydrochloride.

(Solvent)

Known solvents can be used in the invention, as necessary. The solvent can be used for the purpose of improving the polarity, viscosity or the surface tension of the liquid (ink), improving the solubility or dispersibility of the coloring agent, adjusting the conductivity, or adjusting the printing performance.

The solvent in the invention is preferably a non-water soluble liquid that does not contain an aqueous solvent from the viewpoint of recording a high quality image that dries quickly and is uniform in line width, and is more preferably a solvent composed of a high boiling point organic solvent. The high boiling point organic solvent used in the invention preferably has a good compatibility with the constituent materials, especially with the monomers.

Preferable examples of the solvents include tripropylene glycol monomethylether, dipropylene glycol monomethylether, propylene glycol monomethylether, ethylene glycol monobutylether, diethylene glycol monobutylether, triethylene glycol monobutylether, ethylene glycol monobenzylether and diethylene glycol monobenzylether.

Although there are known low boiling point organic solvents having a boiling point of 100° C. or less, it is preferable to avoid using such solvents in consideration of unfavorable effects on the curing ability and the possibility of causing environmental pollution. In the case of using these solvents, it is preferable to select a solvent with high safety, i.e., a solvent with high control concentration (the index indicated according to the working environment evaluation standard), which is preferably 100 ppm or more and further preferably 200 ppm or more. Examples of such solvents include alcohols, ketones, esters, ethers and hydro carbons, and specifically include methanol, 2-butanol, acetone, methylethylketone, ethyl acetate, tetrahydrofuran.

The solvent can be used alone or in combination of two or more kinds. However, when water and/or a low boiling point organic solvent are used, the total amount thereof in each liquid is preferably from 0 to 20% by mass, more preferably from 0 to 10% by mass, and it is further preferable that they are substantially not contained. It is preferable that the ink and the undercoat solution in the invention substantially does not contain water from the viewpoint of achieving temporal stability without decreasing the uniformity or increasing the turbidity of the liquid due to precipitation of a dye and the like, with the lapse of time, and from the viewpoint of securing the drying property when an impermeable or slow-permeable recording medium is used. The term "Substantially does not contain" here means that the admissible level of inevitable impurities may exist.

(Other Additives)

Known additives such as a polymer, a surface tension regulator, an ultraviolet absorber, an antioxidant, an anti-fading agent, and a pH regulator can be used in combination.

Known compounds may be appropriately selected and used as the above additives, and specific examples thereof include the additives described in JP-A 2001-181549.

Further, a pair of compounds that generate an aggregate or increase viscosity when they react with each other upon mixing can be contained separately in the ink and the undercoat solution in the invention. The above pair of compounds has a characteristic of rapidly forming the aggregate or rapidly increasing viscosity of the liquid, thereby suppressing coalescence of adjacent liquid droplets more effectively.

Examples of the reaction of the above pair of compounds include an acid/base reaction, a hydrogen bonding reaction by a carbonic acid/amide group containing compound, a crosslinking reaction such as a reaction of boronic acid/diol, and a reaction by electrostatic interaction by cation/anion.

Next, the ink-jet recording device of the invention will be described.

The ink-jet recording device related to the first embodiment of the invention is constituted to include an undercoat solution application unit which applies, onto a recording medium, an undercoat solution containing a radical-polymerizable compound having a phosphoric acid group; an undercoat solution curing unit which is disposed downstream of the undercoat solution application unit in a direction of movement of the recording medium, and partially cures the undercoat solution; and an image recording unit which is disposed downstream of the undercoat solution curing unit in the direction of movement of the recording medium, and discharges an ink, which is curable by irradiation with an active energy ray, onto the partially cured undercoat solution to record an image.

The ink-jet recording device related to the second embodiment of the invention is constituted to include an undercoat solution application unit which applies, onto a recording medium, an undercoat solution containing a polymer and a radical-polymerizable compound having a phosphoric acid group; an undercoat solution curing unit which is disposed downstream of the undercoat solution application unit in a direction of movement of the recording medium, and partially cures the undercoat solution by irradiating an active energy ray to at least a part of the undercoat solution; and an image recording unit which is disposed downstream of the undercoat solution curing unit in the direction of movement of the recording medium, and discharges an ink, which can be cured by irradiation with an active energy ray, onto the partially cured undercoat solution to record an image.

Furthermore, the ink-jet recording devices related to the first and second embodiments of the invention can be constituted to further include a conveying unit which conveys the recording medium; and an active energy irradiation unit which is disposed downstream of the image recording unit in a direction of conveyance of a conveyance path for the recording medium, and irradiates with an active energy ray the recording medium having an image recorded thereon by the image recording unit, to further accelerate curing of the undercoat solution and the discharged ink (i.e., image), In addition, the image recording unit is preferably disposed in parallel to a direction perpendicular to the direction of conveyance of the recording medium, and preferably discharges the ink using at least one linear ink-jet head having a length corresponding to the entire recordable width of the recording medium.

—Mechanism of Image Recording and Recording Device—

An example of the mechanism of the invention to form an image on a recording medium while avoiding interdroplet interference will be explained by referring to FIGS. 5A to 5D.

Figure 5A:
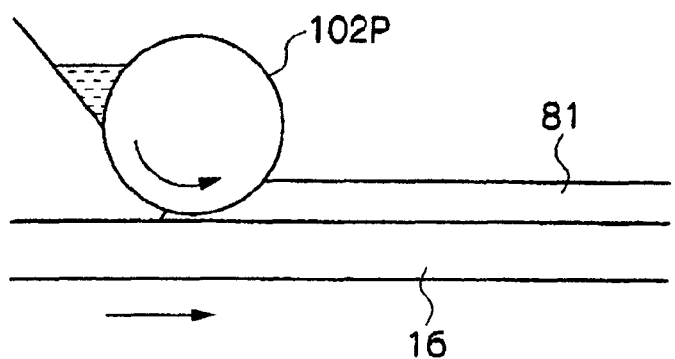
FIGS. 5A to 5D are flow charts showing the mechanism of forming an image.

The undercoat solution that does not contain a coloring agent is applied onto a recording medium 16 to form a liquid film 81 consisting of the undercoat solution on the surface of the recording medium 16, as shown in FIG. 5A. The undercoat solution is applied by coating in FIG. 5A, but may also be applied by discharge using an ink jet head (also referred to as "discharge"), spray coating or the like.

The thickness of the liquid film of the applied undercoat solution is determined as an average thickness obtained by dividing the value of the volume of the applied undercoat solution by the value of the area onto which the undercoat solution is applied. In the case where the undercoat solution is applied by discharge, the thickness of the liquid film can be obtained from the value of the discharged volume and the value of the area onto which the undercoat solution has been discharged. The thickness of the liquid film of the undercoat solution is desirably uniform with no local unevenness. From this point of view, the undercoat solution preferably wets the recording medium well and spreads thereon, i.e., has a small degree of static surface tension, as long as the liquid can be discharged stably from the ink jet head.

Figure 5B:
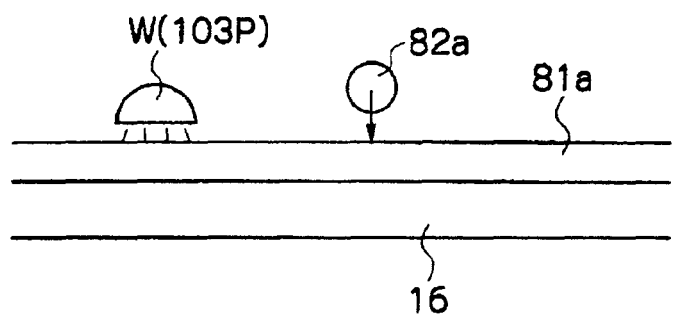
Figure 5C:
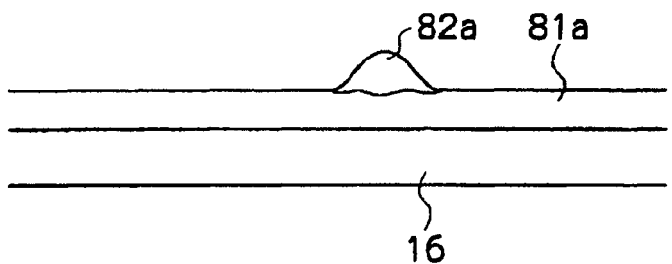

After the undercoat solution is partially cured by irradiation with active light from a light source W (partially cured undercoat solution (partially cured undercoat solution layer); 81*a*), an ink droplet 82*a* is discharged as shown in FIG. 5B, thereby depositing the ink droplet 82*a* onto the undercoating film 81 as shown in FIG. 5C. At this time, the degree of curing at the surface of the undercoating layer is lower than that in the insider thereof, thereby having good compatibility with the ink droplet 82*a*.

Figure 5D:
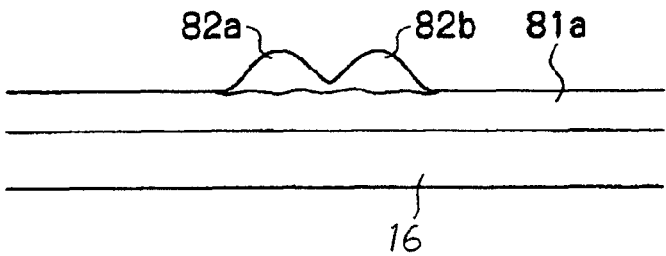

Subsequently, another ink droplet 82*b* is discharged onto the recording medium 16 in the region where the layer of the undercoat solution 81*a* is formed and near the position where the first liquid droplet 82*a* has been discharged, as shown in FIG. 5D. At this time, the undercoating layer liquid layer 81 has a lower degree of curing at the surface thereof than in the inside thereof, thereby having good compatibility with the ink droplet 82*b*. Although a force works to make the ink droplet 82*a* and the ink droplet 82*b* to coalesce with each other, the interdroplet interference can be suppressed since the adhesion of the ink droplet and the surface of the undercoating layer is strong and the inside of the undercoating layer which has been cured acts as a resistance force against the coalescence between the ink droplets.

A substance that causes a chemical reaction by which a coloring material contained in the ink aggregates or becomes insoluble has conventionally been contained in the undercoat solution, in order to avoid the interdroplet interference. However, according to the invention, the interdroplet interference can be avoided without containing such a substance in the undercoat solution.

While the interdroplet interference is avoided and the shapes of the ink droplets of 82*a* and 82*b* are maintained (in the case of the invention, during a period of from a few hundred milliseconds to 5 seconds) as shown in FIG. 5D, i.e., before the shapes of the droplets are lost, the ink droplets 82*a* and 82*b* are cured or partially cured to a level such that the shapes thereof are kept, and the color material in the ink droplets 82*a* and 82*b* are fixed onto the recording medium 16. At least the ink contains actinic energy rays curing-type polymerizable compound and is cured by a so-called polymerization reaction when irradiated with actinic energy rays such as ultraviolet rays. The polymerization compound can also be contained in the undercoat solution, which is preferable for promoting adhesion since the whole liquid that has been discharged is cured.

Next, the entire configuration of an inline label printer, an example of the image recording device provided with the ink jet recording device in the invention, will be explained by reference with the figures.

Figure 6:
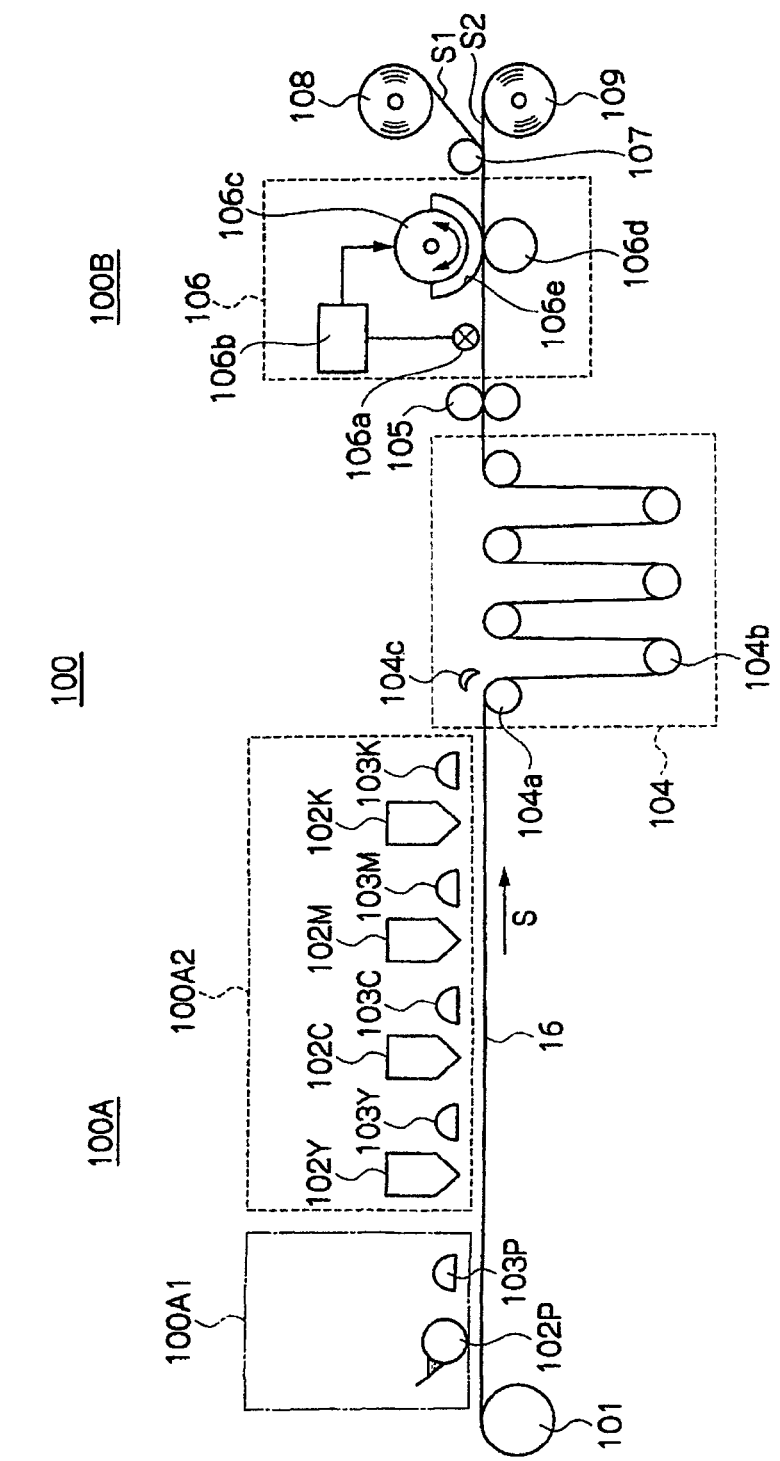
FIG. 6 is a schematic sectional view showing the entire configuration of an image recording device that records an image in accordance with the ink jet recording method of the invention.

FIG. 6 is an entire configuration diagram showing one example of an inline label printer (image recording device) 100. The image recording device 100 consists of an ink jet recording part 100A in the invention, a post-processing part 100B that performs a post-processing to the recording medium that has been recorded an image, and a buffer 104 as a cushioning unit provided between the ink jet recording part 100A and the post-processing part 100B.

The ink jet recording device in the invention is applied to the ink jet recording part 100A. The ink jet recording part 100A consists of an undercoat solution film forming unit 100A1 that forms a partially cured undercoat solution film that does not contain a coloring agent on the recording medium (label) 16, and an image forming unit 100A2 that forms a desired image on the recording medium 16 by applying four inks containing a coloring material on the prescribed position of the recording medium 16.

Favorable images can be formed particularly when a recording medium that does not have permeability (for example, OPP (Oriented Polypropylene Film), CPP (Casted Polypropylene Film), PE (Polyethylene), PET (Polyethylene Terephthalate), PP (Polypropylene), a soft wrapping material with low permeability, laminate paper, coated paper and art paper is used as the recording medium.

In FIG. 6, the ink jet recording part 100A is provided with the image forming unit 100A2 where an ink is applied by ink jetting onto the recording medium 16 on which the undercoat solution has been applied with a roll coater 102P.

The image recording device 100 is provided with a liquid storage/loading unit that is prevented from light-transmittance (not shown) and store the undercoat solution and the ink to be supplied to the undercoat solution film forming part 100A1 and the image forming part 100A2; a paper supplying unit 101 that supplies the recording medium 16; an image detecting unit 104*c* that reads an image as the result of discharge of the ink (the state of the deposited ink droplets) by the image forming part 100A2; and a rewinding unit 109 that rewinds the recorded recording medium 16.

The paper supplying unit 101 is described in FIG. 6 as a paper supplying unit that supplies a roll paper (continuous paper), but the unit may be the type that supplies precut sheets of paper.

Further details of the ink jet recording unit 100A will now be explained. The ink jet recording unit 100A has the image forming part 100A2 including discharge heads 102Y, 102C, 102M, and 102K that discharge ink onto the recording medium 16 in a single pass, pinning light sources 103Y, 103C, and 103M, and a final curing light source 103K; and the undercoat solution film forming part 100A1 including the roll coater 102P and a light source for partial curing 103P. Specifically, it is a so-called full-line head which is a line-formation head having a length corresponding to the entire width of the recordable area of the recording medium 16, the head being arranged in a direction perpendicular to a direction of conveying the recording medium (shown by an arrow S in FIG. 6). Further, the pinning light sources 103Y, 103C, and 103M are respectively arranged downstream of the discharging heads 102Y, 102C and 102M, which cure the dots of discharged ink of each color at least to such a level that the dots do not lose their shape.

The roll coater 102P and the discharging heads 102Y, 102C, 102M, and 102K having plural nozzles (liquid discharging ports) are arranged in the length longer than at least one side of the recording medium 16 of the maximum size for which the ink jet recording part 100A is intended.

The discharging heads 102Y, 102C, 102M, and 102K corresponding to each liquid are arranged in the order of yellow ink (Y), cyan ink (C), magenta ink (M), and black ink (K) from the upstream side (the left side of FIG. 6) along with the direction S of conveying the recording medium, and by which a color image can be formed on the recording medium 16.

Specifically, the undercoat solution is first uniformly applied onto the recording medium 16 with the roll coater (102P), then partial curing of the undercoat solution is performed by the ultraviolet light source for partial curing 103P. Next, the ink is discharged from the discharging head for yellow ink 102Y toward the recording medium 16, then the yellow ink on the recording medium is partially cured to such a level that the surface thereof is not cured and the shape thereof is kept by the pinning light source 103Y arranged downstream of the discharging head 102Y. Subsequently, the same processes as that of the yellow ink are repeated with the heads 102C and 102M, and after the discharge by the discharging head for black ink 102K, curing is completed by the final curing light source 103K capable of completely curing the undercoat solution and all of the inks. In this process, by partially curing the undercoat solution and the inks after application, interdroplet interference can be avoided.

According to the image forming part 100A2 consisting of a full-line discharging head, an image can be recorded on the entire surface of the recording medium 16 at one operation of relatively moving the recording medium 16 and the image forming part 100A2 in a direction of conveying the recording medium. Therefore, high-speed printing can be performed as compared with a case of using a shuttle type head in which the discharging head moves back and forth in a direction perpendicular to the direction of conveying the recording medium while conveying the recording medium, thereby improving the productivity.

In the embodiments, inks of the standard colors YCMK (4 colors) are used, but the number of the colors or the combination thereof is not limited to the examples shown here, and other inks of a light color, dark color, white or other spot colors, or transparent inks may also be used depending on necessity. Examples of the possible constitutions thereof include using an discharging head that discharges an ink of light colored type such as light cyan and light magenta in combination; delineating the background with a white ink; and adjusting the glossiness with a transparent ink.

UV light sources 103P, 103Y, 103C, 103M, and 103K radiate ultraviolet rays to the recording medium 16 in order to cure the ink containing a polymerizable compound. Known light sources such as a medium-pressure mercury lamp, a high-pressure mercury lamp, an ultrahigh-pressure mercury lamp, a metal-halide lamp, a xenon lamp, a carbon arc lamp, an ultraviolet fluorescent lamp, an ultraviolet LED, and an ultraviolet LD can be used as the ultraviolet light source. Among these, a high-pressure mercury lamp, an ultrahigh-pressure mercury lamp, and a metal-halide lamp are preferably used from the aspect of practicality. The UV light source preferably has a peak of the amount of light in the wavelength range of from 200 nm to 400 nm, and preferably has an irradiation light intensity in the range of from 1 to 500 mW/cm$^2$ in the wavelength at the peak amount of light. The UV light source is preferably constituted using a cold mirror in a reflector and an infrared cut glass in a cover glass so as to prevent the increase in temperature of the recording medium by the irradiation with heat rays. In a case of using an ink containing a radical based polymerizable compound, hindrance of the polymerization due to oxygen can be suppressed, and curing and fixing of the ink can be performed more favorably, by substituting the curing atmosphere created by the final curing light source 103K with an inert gas such as nitrogen (not shown).

An electron beam irradiation device (not shown) may also be used as a means of curing the ink containing a polymerizable compound.

In the above, the use of a UV light source and an electron beam irradiation device is discussed as a means of curing the polymerizable compound, but the means is not limited to thereto and other radiant rays such as α-rays, 65 -rays, and X-rays may also be used.

The image detecting unit 104c includes an image sensor (such as a line sensor) to pick up the image of the result of the discharge by the image forming part 100A2, and functions as a means of checking the presence of discharge abnormalities, such as clogging of the nozzles, from the image read by the image sensor.

A buffer 104 is provided as a cushioning unit between the ink jet recording part 100A and the post-processing part 100B. The recording medium that has been subjected to ink jet recording passes through the buffer 104 consisting of several upper rollers 104a and several lower rollers 104b, while repeating going up and down a few times. The buffer 104 serves as a regulator that absorbs the difference between the operation speeds (the speeds for conveying the recording medium 16) in the ink jet recording part 100A positioned upstream of the buffer and in a later-described post-processing part 100B positioned downstream of the buffer.

In the downstream of the buffer 104 is provided a varnish coater 105. In the varnish coater 105, the surface of a label is slightly coated with a varnish to improve scratch-resistance of the label surface.

A drier X is provided downstream of the varnish coater 105. For example, a UV lamp (same as the final curing light source 103K) can be used for the drier X when a UV varnish is used.

A label cutting unit 106 provided downstream of the varnish coater 105 is composed of a marking reader 106a, a die cutter driver 106b, a dye cutter 106c equipped with a roll (a plate) 106e having a blade, and a facing roller 106d.

A label cut by the die cutter 106c in the label cutting unit 106 is wound up by a label winding unit 109 into the form of a product, and other parts are peeled off by a scrap removing unit 108 and disposed as a waste.

*Structure of Discharging Head

Figure 7A:
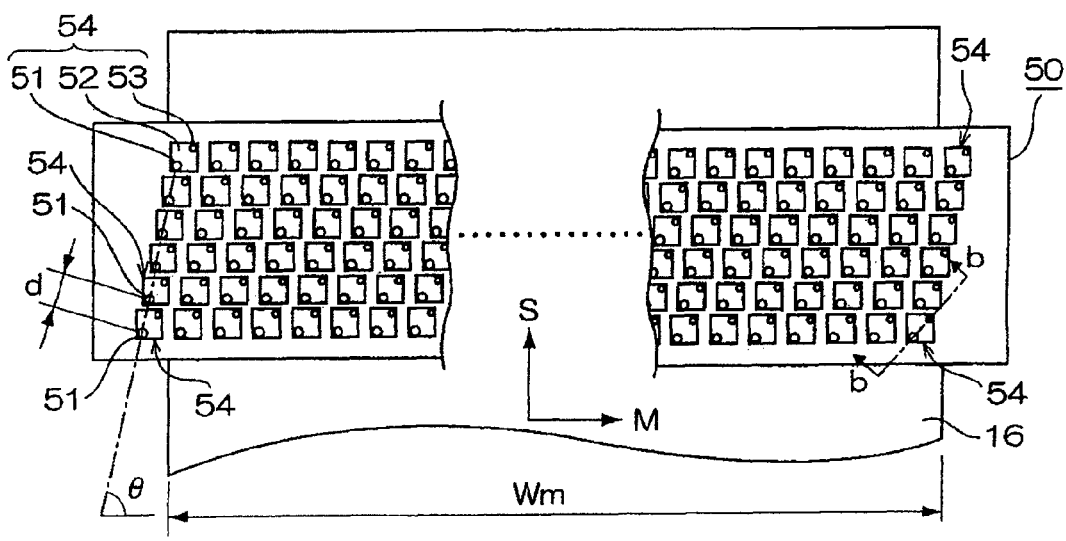
FIG. 7A is a plan view showing an example of a basic entire structure of the discharging head shown in FIG. 6.

FIG. 7A is a plan perspective view showing an example of the entire basic structure of an discharging head marked with the number 50 which is representative of the discharging heads 102Y, 102C, 102M, and 102K.

The discharging head 50 shown as one example in FIG. 7A is a so-called full-line head equipped with a number of nozzles 51 (liquid discharge ports) that discharge liquid toward the recording medium 16 arranged in a two-dimensional manner over the length corresponding to the width Wm of the recording medium 16 in a direction (the main scanning direction indicated by an arrow M) which is perpendicular to a direction of conveying the recording medium 16 (the vertical scanning direction indicated by an arrow S).

In the discharging head 50, plural pressure chamber units 54 each consisting of a nozzle 51, a pressure chamber 52 communicating to the nozzle 51 and a liquid supplying port 53 are arranged along two directions, i.e., the main scanning direction M and an inclined direction at a prescribed acute angle θ (0 degree<θ<90 degrees) with the main scanning direction M. For illustration purpose, only a part of the pressure chamber unit 54 is shown in FIG. 7A.

The nozzles 51 are arranged at a regular pitch d in the inclined direction at a prescribed acute angle θ with the main scanning direction M, which can be equated to that in which the nozzles are arranged in a straight line along with the main scanning direction M at an interval of "d×cos θ".

Figure 7B:
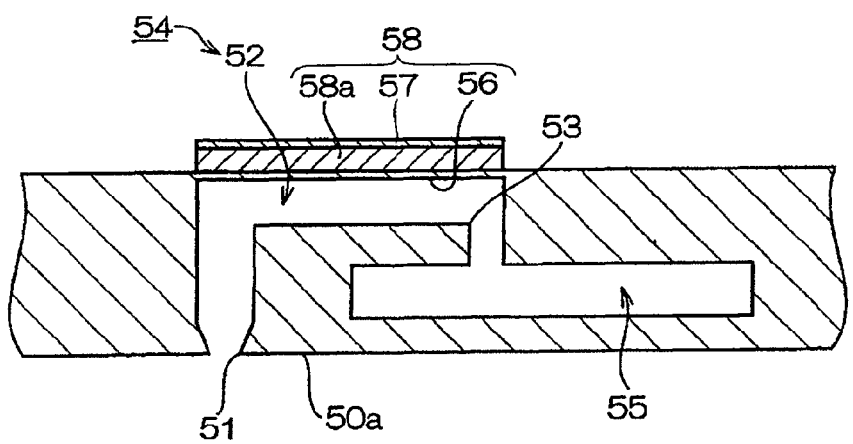
FIG. 7B is a b-b line section of FIG. 7A.

FIG. 7B shows a cross section along the b-b line shown in FIG. 7A of the pressure chamber unit 54 as an discharge element that constitutes the discharge head 50.

Each pressure chamber 52 communicates with a common liquid chamber 55 via the liquid supplying port 53. The common liquid chamber 55 communicates with a tank as a liquid supplying source (not shown), from which the liquid is supplied and distributed to each pressure chamber 52 via the common liquid chamber 55.

A piezoelectric body 58a is positioned on a vibrating plate 56 that forms a top face of the pressure chamber 52, and an individual electrode 57 is positioned on the piezoelectric body 58a. The vibrating plate 56 is grounded and functions as a common electrode. These vibrating plate 56, individual electrode 57 and piezoelectric body 58a constitute a piezoelectric actuator 58 that serves as a means of generating liquid discharge force.

When a prescribed driving voltage is applied to the individual electrode 57 in the piezoelectric actuator 58, the piezoelectric body 58a is deformed to change the volume of the pressure chamber 52, resulting in the change in pressure in the pressure chamber 52, and thereby a liquid is discharged from the nozzle 51. When the volume of the pressure chamber 52 returns back to the initial state after the discharge of the liquid, a new liquid is supplied to the pressure chamber 52 from the common liquid chamber 55 via the liquid supplying port 53.

In FIG. 7A, an example is shown in which plural nozzles 51 are arranged in a two-dimensional manner as the structure capable of forming an image with high resolution on the recording medium 16 at high-speed. However, the structure of the discharging head in the invention is not particularly limited to the above structure and may be a structure in which the nozzles are arranged in a one-dimensional manner. The structure of the pressure chamber unit 54 as an discharge element that constitutes the discharging head is also not particularly limited to the example shown in FIG. 7B. For example, the common liquid chamber 55 may be positioned above the pressure chamber 52 (i.e., the opposite side of the discharge face 50a) instead of positioning the same under the pressure chamber 52 (i.e., the discharge face 50a side of the pressure chamber 52). Further, the liquid discharge force may be generated by an exothermic body instead of the piezoelectric body 58a.

In the ink jet recording device in the invention, other means such as discharge of the undercoat solution from nozzles may also be used for the application of the undercoat solution onto the recording medium, instead of coating.

The device used for the coating is not particularly limited, and known coating devices can be selected as appropriate according to usage. Examples thereof include an air doctor coater, a blade coater, a rod coater, a knife coater, a squeeze coater, an impregnating coater, a reverse roll coater, a transfer roll coater, a gravure coater, a kiss roll coater, a cast coater, a spray coater, a curtain coater, and an extruding coater.

*Liquid Supply System

Figure 8:
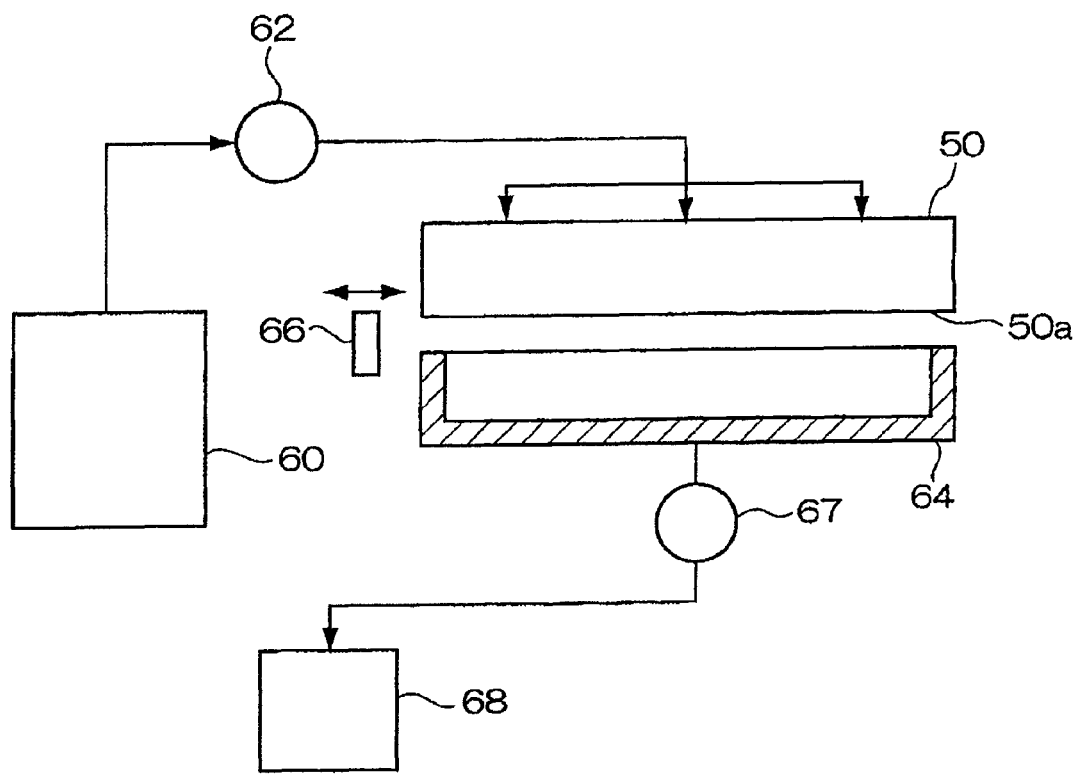
FIG. 8 is a schematic view showing an exemplary configuration of a liquid supplying system that constitutes the image recording device.

FIG. 8 is a schematic view showing a configuration of the liquid supply system in the image recording device 100.

A liquid tank 60 supplies a liquid to the discharging head 50 as a base tank. In the midstream of a tube that connects the liquid tank 60 and the discharging head 50, a liquid supplying pump 62 that sends the liquid to the discharging head 50 is provided. The tube, liquid tank 60 and the discharging head 50 preferably have a temperature which is regulated together with the ink contained therein, by a temperature detecting means and a heater. The ink temperature is preferably regulated to a range of from 40° C. to 80° C.

The image recording device 100 is provided with a cap 64 as a means for preventing a meniscus of the nozzle 51 from drying during the intermission of discharge, or from increasing in viscosity in the vicinity of the meniscus, and a cleaning blade 66 as a means for cleaning the discharge face 50a. A maintenance unit including the cap 64 and the cleaning blade 66 can be transferred relatively to the discharging head 50 by a transfer system (not shown), and can be transferred to a maintenance position positioned below the discharging head 50 from a prescribed retracting position as necessary.

The cap 64 is elevated relatively to the discharging head 50 with an elevation mechanism (not shown). The elevation mechanism is designed to cover at least the region of the nozzle in the discharge face 50a with the cap 64, by elevating the cap 64 up to a prescribed position and attaching the cap 64 to the discharging head 50.

The cap 64 preferably has the inside thereof divided into plural areas each corresponding to each row of the nozzles by dividing walls, and each of the divided areas can be selectively suctioned using a selector or the like.

The cleaning blade is composed of an elastic member such as rubber, and is capable of sliding on the discharge face 50a of the discharging head 50 with a transfer mechanism for the cleaning blade (not shown). When the liquid droplets or foreign materials are attached onto the discharge face 50a, the discharge face 50a is wiped off by sliding the cleaning blade 66 on the discharge face 50a and cleaned.

A suction pump 67 sucks a liquid from the nozzle 51 of the discharging head 50 while the discharge face 50a of the discharging head 50 is covered with the cap 64, and sends the sucked liquid to a collection tank 68.

The above suction operation is also performed when the liquid tank 60 is loaded in the image recording device 100 and the liquid tank 60 is filled with a liquid from the liquid tank 60 (at the time of the initial filling) or when the liquid having viscosity that has been increased during the long-term cessation is removed (at the time of starting the operation after a long-term intermission).

Note that there are two types of discharge from the nozzle: first, a normal discharge performed onto a recording medium such as paper in order to form an image; and second, a purge performed onto the cap 64 serving as a liquid receiver (also referred to as a blank discharge).

Further, when air bubbles are mixed into the nozzle 51 or the pressure chamber 52 in the discharging head 50 or increase in the viscosity in the nozzle 51 exceeds a certain level, the liquid cannot be discharged from the nozzle 51 by the above-described blank discharge. In this case, the liquid with the air bubbles or increased viscosity in the pressure chamber 52 in the discharging head 50 is sucked by the suction pump 67 by applying the cap 64 onto the discharge face 50a in the discharging head 50.

The discharging head 50, liquid tank 60, liquid supplying pump 62, cap 64, cleaning blade 66, suction pump 67, collection tank 68 and an ink flowing route that connects these units, as well as other members and equipments with which the ink directly contact, preferably have dissolution resistance and swelling resistance. Further, these members and equipments preferably have a light shielding property.

*Control System

Figure 9:
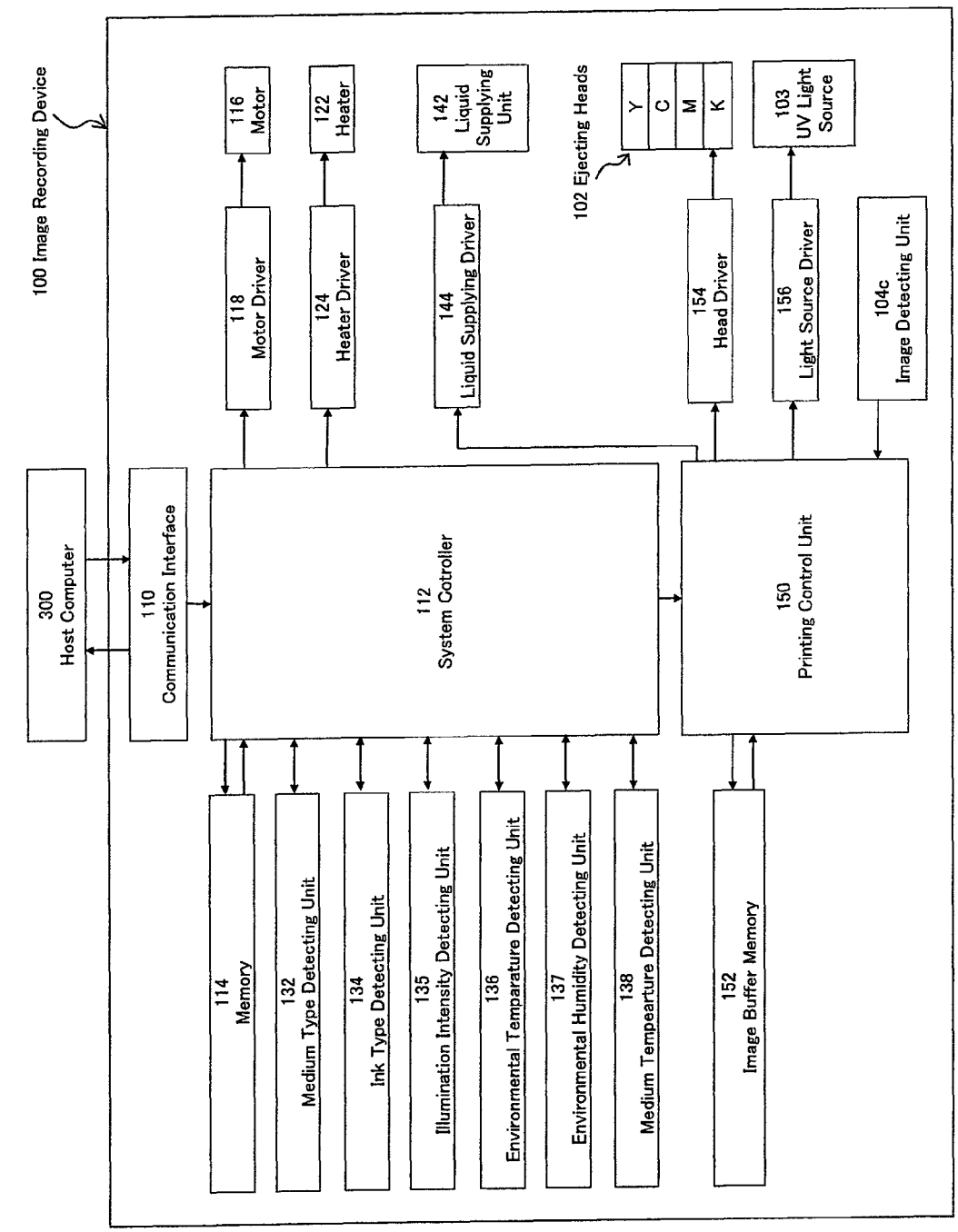
FIG. 9 is a block diagram showing an exemplary configuration of a control system that constitutes the image recording device.

FIG. 9 is a block diagram of the main part showing a system configuration of the image recording device 100.

In FIG. 9, the image recording device 100 is mainly composed of an image forming unit 102, image detecting unit 104c, UV light source 103, communication interface 110, system controller 112, memory 114, image buffer memory 152, motor for transportation 116, motor driver 118, heater 122, heater driver 124, medium type detecting unit 132, ink type detecting unit 134, illumination intensity detecting unit 135, environmental temperature detecting unit 136, environmental humidity detecting unit 137, medium temperature detecting unit 138, liquid supplying unit 142, liquid supplying driver 144, printing control unit 150, head driver 154, and a light source driver 156.

Since the image forming unit 102 is shown as a representative of the discharging heads 102Y, 102C, 102M and 102K shown in FIG. 6, the UV light source is shown as a representative of the curing light sources 103P, 103Y, 103C, 103M and 103K shown in FIG. 6, and the image detecting unit 104c is the same as the one described in FIG. 6 which have been mentioned above, further explanations thereof are omitted here.

The communication interface 110 is an image data inputting means that receives the image data sent from a host computer 300. For the communication interface 110, wired interfaces such as USB (Universal Serial Bus) or IEEE1394, or wireless interfaces can be applied. The image data inputted into the image recording device 100 via the communication interface 110 are temporarily memorized in a first memory 114 for memorizing image data.

The system controller 112 is composed of a central processing unit (CPU), its surrounding circuit, and the like, and is a main controlling means of controlling the entire image recording device 100 according to a prescribed program that has been previously memorized in the first memory 114. That is, the system controller 112 controls each unit of the communication interface 110, motor driver 118, heater driver 124, medium type detecting unit 132, ink type detecting unit 134, printing control unit 150 and the like.

The motor for transportation 116 imparts a driving force to rollers, belts or the like that transport a recording medium. By this motor for transportation 116, the discharging head 50 that constitutes the image forming unit 102 and the recording medium move relatively to each other. The motor driver 118 is a circuit that drives the motor for transportation 116 in accordance with the instructions given from the system controller 112.

The heater 122 is a circuit that drives a heater (or a cooling element) 122 which is not shown in the Figure, and maintains the temperature of the recording medium to be constant. The heater driver 124 is a circuit that drives the heater 122 in accordance with the instructions given from the system controller 112.

The medium type detecting unit 132 detects the type of the recording medium. There are various embodiments of detecting the type of the recording medium, and examples thereof include an embodiment of detecting the type by a sensor provided at a paper supplying unit which is not shown in the Figure; an embodiment of inputting the type by the operation of a user; an embodiment of inputting the type from the host computer 300; and an embodiment in which the type is automatically detected by analyzing the image data (for example, resolution or color) inputted from the host computer 300 or supplemental data of the image data.

The ink type detecting unit 134 detects the type of the ink. There are various embodiments of detecting the type of the ink and examples thereof include an embodiment of detecting by a sensor provided in the liquid storage/loading unit which is not shown in the Figure; an embodiment of inputting the type by the operation of a user; an embodiment of inputting the type from the host computer 300; and an embodiment in which the type is automatically detected by analyzing the image data (for example, resolution or color) inputted from the host computer 300 or supplemental data of the image data.

The illumination intensity detecting unit 135 detects the illumination intensity of the UV rays emitted from the UV light source 103. Examples of the embodiments of detecting the illumination intensity include an embodiment of detecting the illumination intensity by a sensor provided near the UV light source 103 shown in FIG. 6. The feedback of the output of this illumination intensity sensor is sent to the output of the UV light source.

The environmental temperature detecting unit 136 detects the temperatures of the outside air and the inside of the image recording device. Examples of the embodiments of detecting the environmental temperature include an embodiment of detecting the environmental temperature by a sensor provided at the outside or inside of the device.

The environmental humidity detecting unit 137 detects the humidity of the outside air and the inside of the image recording device. Examples of the embodiments of detecting the environmental humidity include an embodiment of detecting the humidity by a sensor provided at the outside or the inside of the device.

The medium temperature detecting unit 138 detects the temperature of the recording medium at the time of forming an image. There are various embodiments of detecting the medium temperature and examples thereof include an embodiment of detecting the temperature by a contact type temperature sensor and an embodiment of detecting the temperature by a non-contact type temperature sensor provided above the recording medium 16. The temperature of the recording medium is maintained to be constant by the heater 122.

The liquid supplying unit 142 is composed of a tube through which the ink flows from the liquid tank 60 shown in FIG. 8 to the image forming unit 102, the liquid supplying pump 62, and the like.

The liquid supplying driver 144 is a circuit that drives the liquid supplying pump that constitutes the liquid supplying unit and the like so that the liquid can be supplied to the image forming unit 102.

The printing control unit 150 produces the data (discharge data) necessary for each discharging head 50 that constitute the image forming unit 102 to perform discharge (jetting) toward the recording medium based on the image data inputted in the image recording device 100. That is, the printing control unit 150 functions as an image processing means that performs image processing such as various processes, corrections or the like to generate the discharge data from the image data stored in the first memory 114 in accordance with the control of the system controller 112, and supplies the generated discharge data to the head driver 154.

The printing control unit 150 is accompanied with a second memory 152, and the discharge data and the like are temporarily stored in the second memory 152 at the time of performing the image processing in the printing control unit 150.

In FIG. 9, the second memory 152 is shown as an embodiment in which it accompanies the printing control unit 150. However, the first memory 114 can also function as the second memory 152 at the same time. Further, the printing control unit 150 and the system controller 112 can also be integrated and configured with a single processor.

The head driver 154 outputs a driving signal for the discharge to each discharging head 50 that constitute the image forming unit 12 based on the discharge data given from the printing control unit 150 (practically, it is the discharge data stored in the second memory 152). The driving signal for the discharge outputted from this head driver 154 is given to each discharging head 50 (specifically, the actuator 58 shown in FIG. 7B), the liquid (liquid droplets) is discharged onto the recording medium from the discharging head 50.

A light source driver 156 is a circuit that controls the voltage, time and the timing to be inputted in the UV light source 103 based on the instructions given from the printing control unit 150, illumination intensity detected by the illumination intensity detecting unit 135, environmental temperature detected by the environmental temperature detecting unit 136, environmental humidity detected by the environmental humidity detecting unit 137 and the medium temperature detected by the medium temperature detecting unit 138, and drives the UV light source 103.

The present invention includes the following embodiment.

<1> An undercoat solution comprising a radical-polymerizable compound having a phosphoric acid group that is applied in advance onto a recording medium prior to discharging an ink onto the recording medium to record an image.

<2> The undercoat solution as described in <1>, further comprising a radical polymerization initiator.

<3> An ink-jet recording method, comprising:
applying, onto a recording medium, an undercoat solution containing a radical-polymerizable compound having a phosphoric acid group;
partially curing the applied undercoat solution; and
discharging an ink, which is curable by irradiation with an active energy ray, onto the partially cured undercoat solution to record an image.

<4> The ink-jet recording method as described in <3>, wherein the undercoat solution is partially cured by irradiating with the active energy ray.

<5> The ink-jet recording method as described in <3> or <4>, wherein the undercoat solution further contains a radical polymerization initiator.

<6> The ink-jet recording method as described in any one of <3> to <5>, wherein in the recording of the image, an ink set containing multiple colored inks is used to perform image recording, and at least one of the discharged colored inks is partially cured.

<7> The ink-jet recording method as described in any one of <3> to <6>, wherein the curing of the undercoat solution and the discharged inks is further accelerated.

<8> The ink-jet recording method as described in any one of <3> to <7>, wherein the curing sensitivity of the ink is equal to or greater than the curing sensitivity of the undercoat solution.

<9> An ink-jet recording device, comprising:
an undercoat solution application unit which applies, onto a recording medium, an undercoat solution containing a radical-polymerizable compound having a phosphoric acid group;
an undercoat solution curing unit which is disposed downstream of the undercoat solution application unit in a direction of movement of the recording medium, and partially cures the undercoat solution; and
an image recording unit which is disposed downstream of the undercoat solution curing unit in the direction of movement of the recording medium, and discharges an ink, which is curable by irradiation with an active energy ray, onto the partially cured undercoat solution to record an image.

<10> The ink-jet recording device as described in <9>, further comprising:
a conveying unit which conveys the recording medium; and
an active energy irradiation unit which is disposed downstream of the image recording unit in a direction of conveyance of a conveyance path for the recording medium, and irradiates with an active energy ray the recording medium having an image recorded thereon by the image recording unit, to further accelerate curing of the undercoat solution and the discharged ink,
wherein the image recording unit is disposed in parallel to a direction perpendicular to the direction of conveyance of the recording medium, and discharges the ink using at least one linear ink-jet head having a length corresponding to the entire recordable width of the recording medium.

Furthermore, the present invention includes the following embodiment.

<11> An undercoat solution comprising a polymer and a radical-polymerizable compound having a phosphoric acid group that is applied in advance onto a recording medium prior to discharging an ink onto the recording medium to record an image.

<12> The undercoat solution as described in <11>, wherein the polymer is an acrylamide polymer.

<13> The undercoat solution as described in <11> or <12>, further comprising a radical polymerization initiator.

<14> An ink-jet recording method, comprising:
applying, onto a recording medium, an undercoat solution containing a polymer and a radical-polymerizable compound having a phosphoric acid group;
partially curing the applied undercoat solution; and
discharging an ink, which can be cured by irradiation with an active energy ray, onto the partially cured undercoat solution to thereby record an image.

<15> The ink-jet recording method as described <14>, wherein the polymer is an acrylamide polymer.

<16> The ink-jet recording method as described <14> or <15>, wherein the undercoat solution is partially cured by irradiation with an active energy ray.

<17> The ink-jet recording method as described in any one of <14> to <16>, wherein the undercoat solution further contains a radical polymerization initiator.

<18> The ink-jet recording method as described in any one of <14> to <17>, wherein in the recording of the image, an ink set containing multiple colored inks is used to perform image recording, and at least one of the discharged colored inks is partially cured.

<19> The ink-jet recording method as described in any one of <14> to <18>, wherein the curing of the undercoat solution and the discharged inks is further accelerated.

<20> The ink-jet recording method as described in any one of <14> to <19>, wherein the curing sensitivity of the ink is equal to or greater than the curing sensitivity of the undercoat solution.

<21> An ink-jet recording device, comprising:
an undercoat solution application unit which applies, onto a recording medium, an undercoat solution containing a polymer and a radical-polymerizable compound having a phosphoric acid group;
an undercoat solution curing unit which is disposed downstream of the undercoat solution application unit in a direction of movement of the recording medium, and partially cures the undercoat solution by irradiating an active energy ray to at least a part of the undercoat solution; and
an image recording unit which is disposed downstream of the undercoat solution curing unit in the direction of movement of the recording medium, and discharges an ink, which can be cured by irradiation with an active energy ray, onto the partially cured undercoat solution to record an image.

<22> The ink-jet recording device as described <21>, further comprising:
a conveying unit which conveys the recording medium; and
an active energy irradiation unit which is disposed downstream of the image recording unit in a direction of conveyance of a conveyance path for the recording medium, and irradiates with an active energy ray the recording medium having an image recorded thereon by the image recording unit, to further accelerate curing of the undercoat solution and the discharged ink,
wherein the image recording unit is disposed in parallel to a direction perpendicular to the direction of conveyance of the recording medium, and discharges the ink using at least one linear ink-jet head having a length corresponding to the entire recordable width of the recording medium.

EXAMPLES

Hereinbelow, the invention will be described in detail by way of Examples. However, the invention is not limited to these Examples as long as the scope of the invention is not impaired. In the description of Examples, unless otherwise specified, "parts" refers to parts by mass.

Example 1

<Preparation of Cyan Pigment Dispersion P-1>

16 g of PB15:3 (IRGALITE BLUE GLO; manufactured by Ciba Specialty Chemicals, Ltd.), 48 g of dipropylene glycol diacrylate (DPGDA; manufactured by Daicel-Cytec Company, Ltd.), and 16 g of Solsperse 32000 (manufactured by AstraZeneca, PLC) were mixed, and the mixture was stirred with a stirrer for 1 hour. The mixture after the stirring was dispersed with an Eiger mill to obtain a pigment dispersion P-1.

Here, the conditions for dispersion were such that zirconia beads having a diameter of 0.65 mm were charged at a charge ratio of 70%, the circumferential speed was 9 m/s, and the dispersion time was 1 hour.

<Preparation of Cyan Ink-Jet Recording Liquid I-1>

Components of the following composition were mixed with stirring and dissolved to prepare a cyan ink-jet recording liquid I-1 for cyan image recording.

<Composition>

Pigment dispersion P-1 above: 2.16 g
Dipropylene glycol diacrylate: 9.84 g
(polymerizable compound)
(DPGDA: manufactured by Daicel-Cytec Company, Ltd.)
Polymerization initiator described below: 1.5 g
(Irg907; manufactured by Ciba Specialty Chemicals, Ltd.)
Sensitizer described below: 0.75 g
(Darocur ITX; manufactured by Ciba Specialty Chemicals, Ltd.)
Sensitizer described below: 0.75 g
(Darocur EDB; manufactured by Ciba Specialty Chemicals, Ltd.)

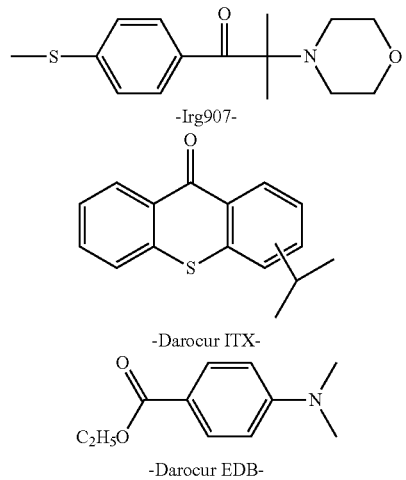

-Irg907-

-Darocur ITX-

-Darocur EDB-

<Preparation of Magenta Pigment Dispersion P-2>

A magenta pigment dispersion P-2 was prepared in the same manner as in the process for the cyan pigment dispersion P-1, except that the pigment PB15:3 (IRGALITE BLUE GLO; manufactured by Ciba Specialty Chemicals, Ltd.) used in the preparation of the cyan pigment dispersion P-1 was replaced with PV19 (CINQUASIA MAGENTA RT-355D; manufactured by Ciba Specialty Chemicals, Ltd.), and the dispersant Solsperse 32000 was replaced with BYK168 (manufactured by BYK Chemie, Inc.).

<Preparation of Yellow Pigment Dispersion P-3>

A yellow pigment dispersion P-3 was prepared in the same manner as in the process for the cyan pigment dispersion P-1, except that the pigment PB15:3 (IRGALITE BLUE GLO; manufactured by Ciba Specialty Chemicals, Ltd.) used in the preparation of the cyan pigment dispersion P-1 was replaced with PY155 (NOVOPERM YELLOW 4G01; manufactured by Clariant Corporation), and the dispersant Solsperse 32000 was replaced with BYK168 (manufactured by BYK Chemie, Inc.).

<Preparation of Black Pigment Dispersion P-4>

A black pigment dispersion P-4 was prepared in the same manner as in the process for the cyan pigment dispersion P-1, except that the pigment PB15:3 (IRGALITE BLUE GLO;

manufactured by Ciba Specialty Chemicals, Ltd.) used in the preparation of the cyan pigment dispersion P-1 was replaced with carbon black (SPECIAL BLACK 250; manufactured by Evonik Degussa, Inc.), and 16 g of the dispersant Solsperse 32000 was replaced with 14 g of Solsperse 32000 (manufactured by AstraZeneca, PLC) and 2 g of Solsperse 5000 (manufactured by AstraZeneca, PLC).

<Preparation of Magenta Ink-Jet Recording Liquid I-2>

Components of the following composition were mixed with stirring and dissolved to prepare a magenta inkjet recording liquid I-2 for magenta image recording.

<Composition>

Pigment dispersion P-2 above: 5.86 g

Dipropylene glycol diacrylate: 6.14 g (polymerizable compound)

(DPGDA; manufactured by Daicel-Cytec Company, Ltd.)

Polymerization initiator above: 1.5 g (Irg907; manufactured by Ciba Specialty Chemicals, Ltd.)

Sensitizer above: 0.75 g (Darocur ITX; manufactured by Ciba Specialty Chemicals, Ltd.)

Sensitizer above: 0.75 g (Darocur EDB; manufactured by Ciba Specialty Chemicals, Ltd.)

<Preparation of Yellow Ink-Jet Recording Liquid I-3>

Components of the following composition were mixed with stirring and dissolved to prepare a yellow ink-jet recording liquid I-3 for yellow image recording.

<Composition>

Pigment dispersion P-3 above: 4.68 g

Dipropylene glycol diacrylate: 7.32 g (polymerizable compound)

(DPGDA; manufactured by Daicel-Cytec Company, Ltd.)

Polymerization initiator above: 1.5 g (Irg907; manufactured by Ciba Specialty Chemicals, Ltd.)

Sensitizer above: 0.75 g (Darocur ITX; manufactured by Ciba Specialty Chemicals, Ltd.)

Sensitizer above: 0.75 g (Darocur EDB; manufactured by Ciba Specialty Chemicals, Ltd.)

<Preparation of Black Ink-Jet Recording Liquid I-4>

Components of the following composition were mixed with stirring and dissolved to prepare a black ink-jet recording liquid I-4 for black image recording.

<Composition>

Pigment dispersion P-4 above: 3.3 g

Dipropylene glycol diacrylate: 8.7 g (polymerizable compound)

(DPGDA; manufactured by Daicel-Cytec Company, Ltd.)

Polymerization initiator above: 1.5 g (Irg907; manufactured by Ciba Specialty Chemicals, Ltd.)

Sensitizer above: 0.75 g (Darocur ITX; manufactured by Ciba Specialty Chemicals, Ltd.)

Sensitizer above: 0.75 g (Darocur EDB; manufactured by Ciba Specialty Chemicals, Ltd.)

<Preparation of Undercoat Solution II-1>

Components of the following composition were mixed with stirring and dissolved to prepare an undercoat solution II-1 for comparison, which did not contain a phosphoric acid group-containing radical-polymerizable compound.

<Composition>

Dipropylene glycol diacrylate: 11.85 g (polymerizable compound)

(DPGDA; manufactured by Daicel-Cytec Company, Ltd.)

Polymerization initiator above: 1.5 g (Irg907 manufactured by Ciba Specialty Chemicals, Ltd.)

Sensitizer above: 0.75 g (Darocur ITX; manufactured by Ciba Specialty Chemicals, Ltd.)

Sensitizer above: 0.75 g (Darocur EDB; manufactured by Ciba Specialty Chemicals, Ltd.)

BYK-307 (manufactured by BYK Chemie, Inc.): 0.15 g

<Preparation of Undercoat Solutions II-2 to II-14>

Undercoat solutions II-2 to II-14 were prepared in the same manner as in the process for the undercoat solution II-1, except that the phosphoric acid group-containing radical-polymerizable compound suggested in the following Table 1 were added in the amounts of addition suggested in the following Table 1 during the preparation procedure for the undercoat solution II-1.

In addition, while preparing these undercoat solutions, DPGDA in an amount corresponding to the added portion of the phosphoric acid group-containing radical-polymerizable compound, was subtracted from the undercoat solution II-1, so that the total amount was adjusted to 15 g.

TABLE 1

| Level of undercoat solution | Radical-polymerizable compound having a phosphoric acid group | |
|---|---|---|
| | Species | Amount of addition (%; relative to mass of undercoat solution) |
| II-1 | — | — |
| II-2 | Viscoat #3PA (manufactured by Osaka Organic Chemical Industry, Ltd.) | 0.8% |
| II-3 | Viscoat #3PA (manufactured by Osaka Organic Chemical Industry, Ltd.) | 1.5% |
| II-4 | Viscoat #3PA (manufactured by Osaka Organic Chemical Industry, Ltd.) | 3.0% |
| II-5 | Viscoat #3PA (manufactured by Osaka Organic Chemical Industry, Ltd.) | 6.0% |
| II-6 | Viscoat #3PA (manufactured by Osaka Organic Chemical Industry, Ltd.) | 12.0% |
| II-7 | JPA514 (manufactured by Johoku Chemical Co., Ltd.) | 3.0% |
| II-8 | JPA514 (manufactured by Johoku Chemical Co., Ltd.) | 6.0% |
| II-9 | JAMP514 (manufactured by Johoku Chemical Co., Ltd.) | 3.0% |
| II-10 | JAMP514 (manufactured by Johoku Chemical Co., Ltd.) | 6.0% |
| II-11 | Light-Ester P-1M (manufactured by Kyoeisha Chemical Co., Ltd.) | 3.0% |
| II-12 | Light-Ester P-1M (manufactured by Kyoeisha Chemical Co., Ltd.) | 6.0% |

TABLE 1-continued

| | Radical-polymerizable compound having a phosphoric acid group | |
|---|---|---|
| Level of undercoat solution | Species | Amount of addition (%; relative to mass of undercoat solution) |
| II-13 | Light-Ester P-2M (manufactured by Kyoeisha Chemical Co., Ltd.) | 3.0% |
| II-14 | Light-Ester P-2M (manufactured by Kyoeisha Chemical Co., Ltd.) | 6.0% |

<Image Recording and Evaluation>

As an image recording device, there was provided an experimental apparatus including a conveying mechanism which is a conveying units for roll conveying a recording medium by rotating a driving roller; a roll coater which is an undercoat solution applying units for coating an undercoat solution onto the recording medium; an undercoat solution partial-curing light source which is an undercoat solution curing units for partial curing the undercoat solution after the coating [a plurality of ultrahigh pressure mercury lamps are arranged in parallel to a direction perpendicular to the direction of conveyance of the recording medium (that is, the direction of fast scanning upon recording on the recording medium (width direction))]; an ink-jet printer unit mounted with a head unit [manufactured by Toshiba TEC Corporation; mounted with 4 pairs of head sets in which two variable heads each having the conditions: frequency of dropwise impacting: 6.2 KHz, number of nozzles: 636, nozzle density 300 npi (nozzles/inch, the same hereinbelow); drop size: 6 pl to 42 pl was divided into 7 stages, were arranged in full-line to result in 600 npi], which is an image recording units; and a metal halide lamp which is an active energy ray irradiating units for further curing the undercoat solution and recorded image on the recording medium.

Along the conveyance path for conveying the recording medium, a roll coater and an undercoat solution partial-curing light source are disposed in sequence from the upstream toward the downstream, as described in FIG. 6. On the downstream side of this light source, a head unit having the respective discharging heads for yellow, cyan, magenta and black, and ultrahigh pressure mercury lamps for ink partial curing, each disposed on the respective side of conveyance direction of the discharging heads for the respective colors, are installed in parallel, so that the recording medium can pass immediately underneath the head. The head is constituted such that the discharging heads for yellow, cyan, magenta and black are fixed in body in sequence from the upstream of the direction of conveyance along the conveyance path for the recording medium. Also, a metal halide lamp is disposed further downstream from the black discharging head in the direction of conveyance for the recording medium.

In the present Example 1, on the experimental apparatus, the undercoat solution II-1 was loaded, and at the same time, the ink-jet recording liquids I-1 to I-4 of four colors were loaded on the ink-jet printer unit. And, the following images were recorded on the recording medium as follows.

First, the undercoat solution was uniformly coated to a thickness of 5 μm using a roll coater in the experimental apparatus described above (coating speed: 400 mm/s). After coating, the undercoat solution was exposed by the undercoat solution partial-curing light source (light intensity: 500 mW/cm$^2$) to partially cure the coated undercoat solution.

A transcription test was performed using normal paper (copy paper C2 manufactured by Fuji Xerox Co., Ltd., product code: V436) as a non-penetrable medium. The normal paper was pressed against the undercoat solution in a partially cured state or the colored liquid in a partially cured state on the recording medium drawn out, with a uniform force (500 mN/cm$^2$), and was left still for about 1 minute. Thereafter, the normal paper was carefully peeled off, and the weight of the normal paper was measured to determine the amount of uncured liquid.

In the case of forming an image with 12 picoliters, the amount of uncured liquid was 0.10 mg/cm$^2$ to 0.12 mg/cm$^2$. In the Example 1, the maximum mass 'm' of the ink discharged per unit area was, in the case of 600 dpi×600 dpi and 12 picoliters, 0.74 mg/cm$^2$ to 0.87 mg/cm$^2$.

Therefore, the relationship between the weight per unit area of uncured undercoat solution, M (undercoat solution), and the maximum weight of ink discharged per unit area, m (recording liquid), is expressed by "m(recording liquid)/10<M(undercoat solution)<m(recording liquid)/5.

Thereafter, the ink-jet recording liquids I-1 to I-4 were each individually discharged onto the recording medium on which the undercoat solution had been applied, using heads loaded with the ink-jet recording liquids I-1 to 1-4 (the ultrahigh pressure mercury lamps for ink partial curing that were installed in parallel were not irradiated), and the ink-jet recording liquids were irradiated (cured) with ultraviolet ray (wavelength: 365 nm) from a metal halide lamp, at a light intensity of 3000 mW/cm$^2$ to be fixed thereto.

Here, the monochromatic images drawn by discharging each of the ink-jet recording liquids I-1 to I-4 alone, were lines drawn at a fast scan direction of 600 dpi and a slow scan direction of 150 dpi (used 1 drop; 6 pl impacted dropwise), and whole-area dropwise impact images drawn at a fast scan direction of 600 dpi and a slow scan direction of 600 dpi (used 2 drops: 12 pl impacted dropwise). Also, the angle with respect to the fast scan direction of the head was varied, and whole-area dropwise impact images were also drawn at a fast scan direction of 600 dpi and a slow scan direction of 450 dpi (used 2 drops: 12 pl impacted dropwise).

Further, after performing the coating and partial curing of the undercoat solution in the same manner as described above, the ink-jet recording liquids I-1 to I-4 were all discharged from the heads loaded with the ink-jet recording liquids I-1 to I-4, onto the recording medium to which the undercoat solution had been applied, to draw a full-color image of a person (female) at a fast scan direction of 600 dpi and a slow scan direction of 600 dpi (conveying speed for the recording medium: 400 mm/s, three-stage gradient drawing at 6 to 24 pl, an anti-aliasing treatment performed). In this case, pinning exposure (light intensity: 500 mW/cm$^2$) was repeated for the respective colors (that is, each color) with an ultrahigh pressure mercury lamp for ink partial curing, to partially cure the inks. Thereafter, irradiation (curing) with ultraviolet ray (wavelength: 365 nm) was carried out using a metal halide lamp at a light intensity of 3000 mW/cm$^2$, to fix a full-color image.

The maximum mass 'm' of ink discharged per unit area was, in the case of 600 dpi×600 dpi and 12 picoliters, 0.74 mg/cm$^2$ to 0.87 mg/cm$^2$.

Furthermore, the amount of uncured liquid of the yellow liquid after exposing with the pinning light source, the amount of uncured liquid of the cyan liquid after exposing with the pinning light source, and the amount of uncured liquid of the magenta liquid after exposing with the pinning light source, were measured in a transcription test by extracting samples after each process. In all of the liquids, the amount of uncured liquid was 0.10 mg/cm² to 0.12 mg/cm², in the case of forming an image with 12 picoliters.

Therefore, when combining liquids having different colors, the relationship between the mass per unit area of the uncured part of liquid A applied onto the recording medium, M (liquid A), and the maximum mass per unit area of liquid B applied subsequently, m (liquid B), is expressed as "m(liquid B)/10<M(liquid A)<m(liquid B)/5."

In the above, the interval between the completion of partial curing of the undercoat solution and the dropwise impact (discharging) of the first yellow ink-jet recording liquid I-3 was set to 0.2 seconds.

Also, as the recording medium, Lintec Upo80 (manufactured by Lintec Corporation) was used.

After the image recording by using the undercoat solution II-1, the undercoat solution II-1 was replaced with the above-described undercoat solutions II-2 to II-14, and images were drawn under the same conditions as described above.

Here, the obtained monochromatic images were cut with a microtome and observed by using an optical microscope (manufactured by Nikon Corporation; optical microscope measuring microscope MM-40). In addition, a microtome (manufactured by Leica Microsystems, Inc., Microtome RM2255) was used to obtain sections.

In the obtained image, some parts of the cured product of the recording liquid of the image parts were, as described in FIG. 1, rose to the surface 22, while another parts thereof penetrated into an undercoat layer 20. The undercoat layer 20 was observed below the curing product of the recording liquid. Furthermore, the formation of a uniform cured layer of recording liquid could be confirmed.

Likewise, some parts of the cured product of the recording liquid 28 of the full-color image parts were, as described in FIG. 3, rose to the surface, while another parts thereof penetrated into the layer of the recording liquid 24. The layer of the recording liquid 24 was observed below the recording liquid 28. Furthermore, the formation of a uniform cured layer of the recording liquid 28 could be confirmed.

For each of the images obtained as described above, the measurement and evaluation described below were performed. The results of the measurement and evaluation are presented in the following Tables 2 to 6.

—1. Measurement of "A (after polymerization)/A (before polymerization)"—

Infrared absorption spectra of the undercoat solution were measured after coating the undercoat solution and before and after exposing the undercoat solution by using the undercoat solution partial-curing light source, to determine the "A (after polymerization)/A (before polymerization)."

For the measurement of the infrared absorption spectra, an infrared spectrophotometer FTS-6000 manufactured by BIO-RAD Laboratories, Inc. was used. A (after polymerization) was the absorption intensity of the infrared absorption peak resulting from the polymerizable group after the polymerization reaction, while A (before polymerization) was the absorption intensity of the infrared absorption peak resulting from the polymerizable group before the polymerization reaction. In addition, the infrared absorption peak near 810 cm$^{-1}$ was used as the infrared absorption peak.

—2. Measurement of Line Width—

The line width of the image drawn in the form of lines was measured using a dot analyzer DA 6000 (manufactured by Oji Scientific Instruments Co., Ltd.).

An ideal line width is 42 to 43 μm at 600 dpi.

—3. Evaluation of Whole-Area Dropwise Impacted Image at 600 dpi×600 dpi—

The whole-area dropwise impacted images were observed by naked eyes, and were evaluated according to the following evaluation criteria.

<Evaluation Criteria>
A: No decolored parts were observed over the whole area.
B: Some decolored parts (less than 5 μm) were observed.
C: Decolored parts (5 μm or more) were clearly observed.

—4. Evaluation of Whole-Area Dropwise Impacted Image at 600 dpi×450 dpi—

The whole-area dropwise impacted images were observed by naked eyes, and were evaluated according to the following evaluation criteria.

<Evaluation Criteria>
A: No decolored parts were observed over the whole area.
B: Some decolored parts (less than 5 μm) were observed.
C: Decolored parts (5 μm or more) were clearly observed.

—5. Evaluation of Practical Image—

A practical full-color image of a person (female) was observed by naked eyes, and was evaluated according to the following evaluation criteria.

<Evaluation Criteria>
A: A good, clearly printed image of high image density was obtained.
B: High density parts such as hair parts were perceived to be somewhat light.
C: The overall colors were perceived to be light
D: The image was blurry.
E: Color irregularities were observed.

TABLE 2

<Cyan Ink>

| Level of undercoat solution | Line width | 600 × 600 dpi Whole-area dropwise impact | 600 × 450 dpi whole-area dropwise impact | Remarks |
|---|---|---|---|---|
| II-1 | 60 μm | B | B | Comparative Example |
| II-2 | 50 μm | A | A | the present invention |
| II-3 | 46 μm | A | A | the present invention |
| II-4 | 44 μm | A | A | the present invention |
| II-5 | 42 μm | A | A | the present invention |
| II-6 | 40 μm | A | A | the present invention |
| II-7 | 42 μm | A | A | the present invention |
| II-8 | 42 μm | A | A | the present invention |
| II-9 | 42 μm | A | A | the present invention |
| II-10 | 42 μm | A | A | the present invention |
| II-11 | 42 μm | A | A | the present invention |
| II-12 | 42 μm | A | A | the present invention |
| II-13 | 42 μm | A | A | the present invention |
| II-14 | 42 μm | A | A | the present invention |

TABLE 3

<Magenta Ink>

| Level of undercoat solution | Line width | 600 × 600 dpi Whole-area dropwise impact | 600 × 450 dpi whole-area dropwise impact | Remarks |
|---|---|---|---|---|
| II-1 | 60 μm | B | B | Comparative Example |
| II-2 | 50 μm | A | A | the present invention |
| II-3 | 46 μm | A | A | the present invention |
| II-4 | 44 μm | A | A | the present invention |
| II-5 | 42 μm | A | A | the present invention |
| II-6 | 40 μm | A | A | the present invention |
| II-7 | 42 μm | A | A | the present invention |
| II-8 | 42 μm | A | A | the present invention |

TABLE 3-continued

<Magenta Ink>

| Level of undercoat solution | Line width | 600 × 600 dpi Whole-area dropwise impact | 600 × 450 dpi whole-area dropwise impact | Remarks |
|---|---|---|---|---|
| II-9 | 42 μm | A | A | the present invention |
| II-10 | 42 μm | A | A | the present invention |
| II-11 | 42 μm | A | A | the present invention |
| II-12 | 42 μm | A | A | the present invention |
| II-13 | 42 μm | A | A | the present invention |
| II-14 | 42 μm | A | A | the present invention |

TABLE 4

<Yellow Ink>

| Level of undercoat solution | Line width | 600 × 600 dpi Whole-area dropwise impact | 600 × 450 dpi whole-area dropwise impact | Remarks |
|---|---|---|---|---|
| II-1 | 60 μm | B | B | Comparative Example |
| II-2 | 50 μm | A | A | the present invention |
| II-3 | 46 μm | A | A | the present invention |
| II-4 | 44 μm | A | A | the present invention |
| II-5 | 42 μm | A | A | the present invention |
| II-6 | 40 μm | A | A | the present invention |
| II-7 | 42 μm | A | A | the present invention |
| II-8 | 42 μm | A | A | the present invention |
| II-9 | 42 μm | A | A | the present invention |
| II-10 | 42 μm | A | A | the present invention |
| II-11 | 42 μm | A | A | the present invention |
| II-12 | 42 μm | A | A | the present invention |
| II-13 | 42 μm | A | A | the present invention |
| II-14 | 42 μm | A | A | the present invention |

TABLE 5

<Black Ink>

| Level of undercoat solution | Line width | 600 × 600 dpi Whole-area dropwise impact | 600 × 450 dpi whole-area dropwise impact | Remarks |
|---|---|---|---|---|
| II-1 | 60 μm | B | B | Comparative Example |
| II-2 | 50 μm | A | A | the present invention |
| II-3 | 46 μm | A | A | the present invention |
| II-4 | 44 μm | A | A | the present invention |
| II-5 | 42 μm | A | A | the present invention |
| II-6 | 40 μm | A | A | the present invention |
| II-7 | 42 μm | A | A | the present invention |
| II-8 | 42 μm | A | A | the present invention |
| II-9 | 42 μm | A | A | the present invention |
| II-10 | 42 μm | A | A | the present invention |
| II-11 | 42 μm | A | A | the present invention |
| II-12 | 42 μm | A | A | the present invention |
| II-13 | 42 μm | A | A | the present invention |
| II-14 | 42 μm | A | A | the present invention |

TABLE 6

| Level of undercoat solution | Full-color image | Remarks |
|---|---|---|
| II-1 | B | Comparative Example |
| II-2 | A | the present invention |
| II-3 | A | the present invention |
| II-4 | A | the present invention |
| II-5 | A | the present invention |
| II-6 | A | the present invention |
| II-7 | A | the present invention |
| II-8 | A | the present invention |
| II-9 | A | the present invention |
| II-10 | A | the present invention |
| II-11 | A | the present invention |
| II-12 | A | the present invention |
| II-13 | A | the present invention |
| II-14 | A | the present invention |

As shown in the Tables 2 to 6, in the Examples (present inventions) where a radical-polymerizable compound having a phosphoric acid group was used in the undercoat solution, good fine line drawing properties were obtained. Also, in these Examples, while fine lines could still be drawn, adjacent dots were all connected compactly upon the whole-area dropwise impact, and thus no decoloration phenomenon occurred. For the full-color images, clear images with high density were obtained. Furthermore, as the amount of addition of the radical-polymerizable compound having a phosphoric acid group in the undercoat solution increased, the fine line reproducibility was further enhanced.

On the contrary, in the Comparative Example where the undercoat solution did not contain a radical-polymerizable compound having a phosphoric acid group, the fine line drawing property was poor, and dots were not connected upon the whole-area dropwise impact, thus causing a decoloration phenomenon. The full-color image had a low image density.

Additionally, in the above Tables 2 to 6, the value of "A (after polymerization)/A (before polymerization)" of the invention was each in the range of 0.3 to 0.7, and the partially cured state could be confirmed (In addition, the quantitative degree of precision was estimated on the basis of the difference in the coating thickness, the light source stability and the like, to be approximately ±20%).

Example 2

<Preparation of Cyan Pigment Dispersion P-1>

16 g of PB15:3 (IRGALITE BLUE GLO; manufactured by Ciba Specialty Chemicals, Ltd.), 48 g of dipropylene glycol diacrylate (DPGDA; manufactured by Daicel-Cytec Company, Ltd.), and 16 g of Solsperse 32000 (manufactured by AstraZeneca, PLC) were mixed, and the mixture was stirred with a stirrer for 1 hour. The mixture after the stirring was dispersed with an Eiger mill to obtain a pigment dispersion P-1.

Here, the conditions for dispersion were such that zirconia beads having a diameter of 0.65 mm were charged at a charge ratio of 70%, the circumferential speed was 9 m/s, and the dispersion time was 1 hour.

<Preparation of Cyan Ink-Jet Recording Liquid I-1>

Components of the following composition were mixed with stirring and dissolved to prepare a cyan ink-jet recording liquid I-1 for cyan image recording. The surface tension at 25° C. of the cyan ink jet recording liquid I-1 was 27 mN/m, and the viscosity at 25° C. thereof was 15 mPa·s.

<Composition>
Pigment dispersion P-1 above: 2.16 g
Dipropylene glycol diacrylate: 9.84 g
(polymerizable compound)
(DPGDA: manufactured by Daicel-Cytec Company, Ltd.)
Polymerization initiator described below: 1.5 g
(Irg907; manufactured by Ciba Specialty Chemicals, Ltd.)
Sensitizer described below: 0.75 g
(Darocur ITX; manufactured by Ciba Specialty Chemicals, Ltd.)
Sensitizer described below: 0.75 g
(Darocur EDB; manufactured by Ciba Specialty Chemicals, Ltd.)

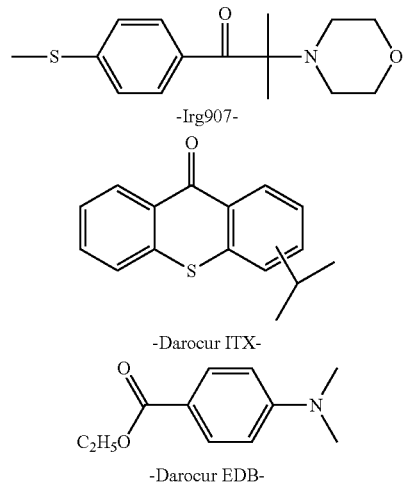

<Preparation of Magenta Pigment Dispersion P-2>
A magenta pigment dispersion P-2 was prepared in the same manner as in the process for the cyan pigment dispersion P-1, except that the pigment PB15:3 (IRGALITE BLUE GLO; manufactured by Ciba Specialty Chemicals, Ltd.) used in the preparation of the cyan pigment dispersion P-1 was replaced with PV19 (CINQUASIA MAGENTA RT-355D; manufactured by Ciba Specialty Chemicals, Ltd.), and the dispersant Solsperse 32000 was replaced with BYK168 (manufactured by BYK Chemie, Inc.).

<Preparation of Yellow Pigment Dispersion P-3>
A yellow pigment dispersion P-3 was prepared in the same manner as in the process for the cyan pigment dispersion P-1, except that the pigment PB15:3 (IRGALITE BLUE GLO; manufactured by Ciba Specialty Chemicals, Ltd.) used in the preparation of the cyan pigment dispersion P-1 was replaced with PY155 (NOVOPERM YELLOW 4G01; manufactured by Clariant Corporation), and the dispersant Solsperse 32000 was replaced with BYK168 (manufactured by BYK Chemie, Inc.).

<Preparation of Black Pigment Dispersion P-4>
A black pigment dispersion P-4 was prepared in the same manner as in the process for the cyan pigment dispersion P-1, except that the pigment PB15:3 (IRGALITE BLUE GLO; manufactured by Ciba Specialty Chemicals, Ltd.) used in the preparation of the cyan pigment dispersion P-1 was replaced with carbon black (SPECIAL BLACK 250; manufactured by Evonik Degussa, Inc.), and 16 g of the dispersant Solsperse 32000 was replaced with 14 g of Solsperse 32000 (manufactured by AstraZeneca, PLC) and 2 g of Solsperse 5000 (manufactured by AstraZeneca, PLC).

<Preparation of Magenta Ink-Jet Recording Liquid I-2>
Components of the following composition were mixed with stirring and dissolved to prepare a magenta ink-jet recording liquid I-2 for magenta image recording. The surface tension at 25° C. of the magenta ink jet recording liquid I-2 was 27 mN/m, and the viscosity at 25° C. thereof was 16 mPa·s.
<Composition>
Pigment dispersion P-2 above: 5.86 g
Dipropylene glycol diacrylate: 6.14 g
(polymerizable compound)
(DPGDA; manufactured by Daicel-Cytec Company, Ltd.)
Polymerization initiator above: 1.5 g
(Irg907; manufactured by Ciba Specialty Chemicals, Ltd.)
Sensitizer above: 0.75 g
(Darocur ITX; manufactured by Ciba Specialty Chemicals, Ltd.)
Sensitizer above: 0.75 g
(Darocur EDB; manufactured by Ciba Specialty Chemicals, Ltd.)

<Preparation of Yellow Ink-Jet Recording Liquid I-3>
Components of the following composition were mixed with stirring and dissolved to prepare a yellow ink-jet recording liquid I-3 for yellow image recording. The surface tension at 25° C. of the yellow ink jet recording liquid I-3 was 27 mN/m, and the viscosity at 25° C. thereof was 16 mPa·s.
<Composition>
Pigment dispersion P-3 above: 4.68 g
Dipropylene glycol diacrylate: 7.32 g
(polymerizable compound)
(DPGDA; manufactured by Daicel-Cytec Company, Ltd.)
Polymerization initiator above: 1.5 g
(Irg907; manufactured by Ciba Specialty Chemicals, Ltd.)
Sensitizer above: 0.75 g
(Darocur ITX; manufactured by Ciba Specialty Chemicals, Ltd.)
Sensitizer above: 0.75 g
(Darocur EDB; manufactured by Ciba Specialty Chemicals, Ltd.)

<Preparation of Black Ink-Jet Recording Liquid I-4>
Components of the following composition were mixed with stirring and dissolved to prepare a black ink-jet recording liquid I-4 for black image recording. The surface tension at 25° C. of the black ink jet recording liquid I-4 was 27 mN/m, and the viscosity at 25° C. thereof was 15 mPa·s.
<Composition>
Pigment dispersion P-4 above: 3.3 g
Dipropylene glycol diacrylate: 8.7 g
(polymerizable compound)
(DPGDA; manufactured by Daicel-Cytec Company, Ltd.)
Polymerization initiator above: 1.5 g
(Irg907; manufactured by Ciba Specialty Chemicals, Ltd.)
Sensitizer above: 0.75 g
(Darocur ITX; manufactured by Ciba Specialty Chemicals, Ltd.)
Sensitizer above: 0.75 g
(Darocur EDB; manufactured by Ciba Specialty Chemicals, Ltd.)

<Preparation of Undercoat Solution III-1>
Components of the following composition were mixed with stirring and dissolved to prepare an undercoat solution for comparison III-1, which contained neither a polymer nor a phosphoric acid group-containing radical-polymerizable compound. The surface tension at 25° C. of the undercoat solution III-1 was 22 mN/m, and the viscosity at 25° C. was 12 mPa·s.

<Composition>

Dipropylene glycol diacrylate: 11.85 g
(polymerizable compound)
(DPGDA; manufactured by Daicel-Cytec Company, Ltd.)
Polymerization initiator described below: 1.5 g
(Irg907; manufactured by Ciba Specialty Chemicals, Ltd.)
Sensitizer described below: 0.75 g
(Darocur ITX; manufactured by Ciba Specialty Chemicals, Ltd.)
Sensitizer described below: 0.75 g
(Darocur EDB; manufactured by Ciba Specialty Chemicals, Ltd.)
BYK-307 (manufactured by BYK Chemie, Inc.): 0.15 g <Preparation of Undercoat Solutions III-2 to III-21>

Undercoat solutions III-2 to III-21 were prepared in the same manner as in the process for the undercoat solution III-1, except that the polymers and the phosphoric acid group-containing radical-polymerizable compounds suggested in the following Table 7 were added to the amounts of addition suggested in the following Table 7, in the preparation process for the undercoat solution III-1.

In addition, upon preparing these undercoat solutions, DPGDA in an amount corresponding to the added portion of the polymer and the phosphoric acid group-containing radical-polymerizable compound, was subtracted from the undercoat solution III-1, so that the total amount of the polymer, the phosphoric acid group-containing radical-polymerizable compound, and DPGDA was adjusted to 15 g.

TABLE 8

|       | Surface tension [mN/m] | Viscosity [mPa · s] |
|-------|------------------------|---------------------|
| III-2  | 22 | 95   |
| III-3  | 22 | 480  |
| III-4  | 22 | 1500 |
| III-5  | 22 | 70   |
| III-6  | 22 | 130  |
| III-7  | 22 | 230  |
| III-8  | 22 | 240  |
| III-9  | 22 | 260  |
| III-10 | 22 | 310  |
| III-11 | 22 | 340  |
| III-12 | 22 | 350  |
| III-13 | 22 | 370  |
| III-14 | 22 | 270  |
| III-15 | 22 | 350  |
| III-16 | 22 | 330  |
| III-17 | 22 | 250  |
| III-18 | 22 | 310  |
| III-19 | 22 | 290  |
| III-20 | 22 | 350  |
| III-21 | 22 | 270  |

Furthermore, in the Example 2, the measurement of the surface tension was performed using a surface tensiometer CBVP-Z (manufactured by Kyowa Interface Science Co., Ltd.), and the measurement of the viscosity was performed using a viscometer TVE-22LT (manufactured by Toki Sangyo Co., Ltd.).

TABLE 7

| Level of undercoat solution | Polymer | | | Radical-polymerizable compound having phosphoric acid group | |
|---|---|---|---|---|---|
| | Species | Weight-average molecular weight | Amount of addition (%: relative to mass of undercoat solution) | Species*[1] | Amount of addition (%: relative to mass of undercoat solution) |
| III-1  | —    | —     | —   | —              | —   |
| III-2  | P-17 | 20000 | 10% | —              | —   |
| III-3  | P-17 | 20000 | 20% | —              | —   |
| III-4  | P-17 | 20000 | 30% | —              | —   |
| III-5  | —    | —     | —   | Viscoat #3PA   | 10% |
| III-6  | —    | —     | —   | Viscoat #3PA   | 20% |
| III-7  | —    | —     | —   | Viscoat #3PA   | 30% |
| III-8  | P-17 | 20000 | 10% | Viscoat #3PA   | 10% |
| III-9  | P-17 | 20000 | 10% | JPA514         | 10% |
| III-10 | P-17 | 20000 | 10% | JAMP514        | 10% |
| III-11 | P-17 | 20000 | 10% | Light-Ester P-1M | 10% |
| III-12 | P-17 | 20000 | 10% | Light-Ester P-2M | 10% |
| III-13 | P-17 | 20000 | 10% | Kayama PM-21   | 10% |
| III-14 | P-82 | 20000 | 10% | Viscoat #3PA   | 10% |
| III-15 | P-44 | 20000 | 10% | Viscoat #3PA   | 10% |
| III-16 | P-67 | 20000 | 10% | Viscoat #3PA   | 10% |
| III-17 | P-25 | 20000 | 10% | Viscoat #3PA   | 10% |
| III-18 | P-84 | 20000 | 10% | Viscoat #3PA   | 10% |
| III-19 | P-23 | 20000 | 10% | Viscoat #3PA   | 10% |
| III-20 | P-13 | 20000 | 10% | Viscoat #3PA   | 10% |
| III-21 | P-27 | 20000 | 10% | Viscoat #3PA   | 10% |

*[1]'Viscoat #3PA' is a phosphoric acid group-containing radical-polymerizable compound of Osaka Organic Chemical Co., Ltd. 'JPA514' and 'JAMP514' are phosphoric acid group-containing radical-polymerizable compounds of Johoku Chemical Industry, Ltd. 'Light-Ester P-1M' and 'Light-Ester P-2M' are phosphoric acid group-containing radical-polymerizable compounds of Kyoeisha Chemical Co., Ltd. 'Kayama PM-21' is a phosphoric acid group-containing radical-polymerizable compounds of Nippon Kayaku, Ltd.

The surface tension (25° C.) and viscosity (25° C.) of the undercoat solutions III-2 to III-21 are as suggested in the following Table 8.

<Image Recording and Evaluation>

As an image recording device, there was provided an experimental apparatus including a conveying mechanism which is a conveying units for roll conveying a recording medium by rotating a driving roller; a roll coater which is an undercoat solution applying units for coating an undercoat solution onto the recording medium; an undercoat solution partial-curing light source which is an undercoat solution curing units for partial curing the undercoat solution after the coating [a plurality of ultrahigh pressure mercury lamps are arranged in parallel to a direction perpendicular to the direction of conveyance of the recording medium (that is, the direction of fast scanning upon recording on the recording medium (width direction))]; an ink-jet printer unit mounted with a head unit [manufactured by Toshiba TEC Corporation; mounted with 4 pairs of head sets in which two variable heads each having the conditions: frequency of dropwise impacting: 6.2 KHz, number of nozzles: 636, nozzle density 300 npi (nozzles/inch, the same hereinbelow); drop size: 6 pl to 42 pl was divided into 7 stages, were arranged in full-line to result in 600 npi], which is an image recording units; and a metal halide lamp which is an active energy ray irradiating units for further curing the undercoat solution and recorded image on the recording medium.

Along the conveyance path for conveying the recording medium, a roll coater and an undercoat solution partial-curing light source are disposed in sequence from the upstream toward the downstream, as described in FIG. 6. On the downstream side of this light source, a head unit having the respective discharging heads for yellow, cyan, magenta and black, and ultrahigh pressure mercury lamps for ink partial curing, each disposed on the respective side of conveyance direction of the discharging heads for the respective colors, are installed in parallel, so that the recording medium can pass immediately underneath the head. The head is constituted such that the discharging heads for yellow, cyan, magenta and black are fixed in body in sequence from the upstream of the direction of conveyance along the conveyance path for the recording medium. Also, a metal halide lamp is disposed further downstream from the black discharging head in the direction of conveyance for the recording medium.

In the present Example 2, on the experimental apparatus, the undercoat solution III-1 was loaded, and at the same time, the ink-jet recording liquids I-1 to I-4 of four colors were loaded on the ink-jet printer unit. And, the following images were recorded on the recording medium as follows.

First, the undercoat solution was uniformly coated to a thickness of 5 μm using a roll coater in the experimental apparatus described above (coating speed: 400 mm/s). After coating, the undercoat solution was exposed by the undercoat solution partial-curing light source (light intensity: 500 mW/cm$^2$) to partially cure the coated undercoat solution.

A transcription test was performed using normal paper (copy paper C2 manufactured by Fuji Xerox Co., Ltd., product code: V436) as a non-penetrable medium. The normal paper was pressed against the undercoat solution in a partially cured state or the colored liquid in a partially cured state on the recording medium drawn out, with a uniform force (500 mN/cm$^2$), and was left still for about 1 minute. Thereafter, the normal paper was carefully peeled off, and the weight of the normal paper was measured to determine the amount of uncured liquid.

In the case of forming an image with 12 picoliters, the amount of uncured liquid was 0.10 mg/cm$^2$ to 0.12 mg/cm$^2$. In the Example 2, the maximum mass 'm' of the ink discharged per unit area was, in the case of 600 dpi×600 dpi and 12 picoliters, 0.74 mg/cm$^2$ to 0.87 mg/cm$^2$.

Therefore, the relationship between the weight per unit area of uncured undercoat solution, M (undercoat solution), and the maximum weight of ink discharged per unit area, m (recording liquid), is expressed by "m(recording liquid)/10<M(undercoat solution)<m(recording liquid)/5.

Thereafter, the ink-jet recording liquids I-1 to I-4 were each individually discharged onto the recording medium on which the undercoat solution had been applied, using heads loaded with the ink-jet recording liquids I-1 to I-4 (the ultrahigh pressure mercury lamps for ink partial curing that were installed in parallel were not irradiated), and the ink-jet recording liquids were irradiated (cured) with ultraviolet ray (wavelength: 365 nm) from a metal halide lamp, at a light intensity of 3000 mW/cm$^2$ to be fixed thereto.

Here, the monochromatic images drawn by discharging each of the ink-jet recording liquids I-1 to I-4 alone, were lines drawn at a fast scan direction of 600 dpi and a slow scan direction of 150 dpi (used 1 drop; 6 pl impacted dropwise).

After completing the coating and partial curing of the undercoat solution in the same manner as described above, on the recording medium onto which the undercoat solution was applied, a whole-area dropwise impacted image (2 drops used; 12 pl impacted dropwise) was drawn using the inkjet recording liquid I-3 at a fast scan direction of 600 dpi and a slow scan direction of 600 dpi, and pinning exposure (light intensity: 500 mW/cm$^2$) was performed using an ultrahigh pressure mercury lamp for ink partial curing. Thereafter, lattice images composed of lattice lines having a width of 3 pixels were formed on the whole-area dropwise impacted image drawn on the recording medium with the ink-jet recording liquid I-3, using the ink-jet recording liquids I-1, I-2 and I-4, respectively (the width of the area disposed between two lattice lines and having no lattice lines drawn thereon, was also 3 pixels wide). The image was irradiated with ultraviolet (wavelength: 365 nm) from a metal halide lamp at a light intensity of 3000 mW/cm$^2$, to fix the lattice image. This image formation was performed at a fast scan direction of 600 dpi and a slow scan direction of 600 dpi (2 drops used; 12 pl impacted dropwise).

After performing the coating and partial curing of the undercoat solution in the same manner as described above, the ink-jet recording liquids I-1 to I-4 were all discharged from the heads loaded with the ink-jet recording liquids I-1 to I-4, onto the recording medium to which the undercoat solution had been applied, to draw a full-color image (practical image) of a person (female) at a fast scan direction of 600 dpi and a slow scan direction of 600 dpi (conveying speed for the recording medium: 400 mm/s, three-stage gradient drawing at 6 to 12 pl, an anti-aliasing treatment performed). In this case, pinning exposure (light intensity: 500 mW/cm$^2$) was repeated for the respective colors (that is, each color) with an ultrahigh pressure mercury lamp for ink partial curing, to partially cure the inks. Thereafter, ultraviolet ray (wavelength: 365 nm) was irradiated from a metal halide lamp at a light intensity of 3000 mW/cm$^2$, to fix a full-color image.

The maximum mass 'm' of ink discharged per unit area was, in the case of 600 dpi×600 dpi and 12 picoliters, 0.74 mg/cm$^2$ to 0.87 mg/cm$^2$.

Furthermore, the amount of uncured liquid of the yellow liquid after exposing with the pinning light source, the amount of uncured liquid of the cyan liquid after exposing with the pinning light source, and the amount of uncured liquid of the magenta liquid after exposing with the pinning light source, were measured in a transcription test by extracting samples after each process. In all of the liquids, the amount of uncured liquid was 0.10 mg/cm$^2$ to 0.12 mg/cm$^2$, in the case of forming an image with 12 picoliters.

Therefore, when combining liquids having different colors, the relationship between the mass per unit area of the uncured part of liquid A applied onto the recording medium, M (liquid A), and the maximum mass per unit area of liquid B applied subsequently, m (liquid B), is expressed as "m(liquid B)/10<M(liquid A)<m(liquid B)/5."

In the above, the interval between the completion of partial curing of the undercoat solution and the dropwise impact (discharging) of the first yellow ink-jet recording liquid I-3 was set to 0.2 seconds.

Also, as the recording medium, Lintec Upo80 (manufactured by Lintec Corporation) was used.

After the image recording by using the undercoat solution III-1, the undercoat solution III-1 was replaced with the above-described undercoat solutions III-2 to III-21, and images were drawn under the same conditions as described above.

Here, the obtained monochromatic images were cut with a microtome and observed by using an optical microscope (manufactured by Nikon Corporation; optical microscope measuring microscope MM-40). In addition, a microtome (manufactured by Leica Microsystems, Inc., Microtome RM2255) was used to obtain sections.

In the obtained image, some parts of the cured product of the recording liquid of the image parts were, as described in FIG. 1, rose to the surface 22, while another parts thereof penetrated into an undercoat layer 20. The undercoat layer 20 was observed below the curing product of the recording liquid. Furthermore, the formation of a uniform cured layer of recording liquid could be confirmed.

Likewise, some parts of the cured product of the recording liquid 28 of the full-color image parts were, as described in FIG. 3, rose to the surface, while another parts thereof penetrated into the layer of the recording liquid 24. The layer of the recording liquid 24 was observed below the recording liquid 28. Furthermore, the formation of a uniform cured layer of the recording liquid 28 could be confirmed.

For each of the images obtained as described above, the measurement and evaluation described below were performed. The results of the measurement and evaluation are presented in the following Tables 9 to 13.

—1. Measurement of "A (After Polymerization)/A (Before Polymerization)"—

Infrared absorption spectra of the undercoat solution were measured after coating the undercoat solution and before and after exposing the undercoat solution by using the undercoat solution partial-curing light source, to determine the "A (after polymerization)/A (before polymerization)."

For the measurement of the infrared absorption spectra, an infrared spectrophotometer FTS-6000 manufactured by BIO-RAD Laboratories, Inc. was used. A (after polymerization) was the absorption intensity of the infrared absorption peak resulting from the polymerizable group after the polymerization reaction, while A (before polymerization) was the absorption intensity of the infrared absorption peak resulting from the polymerizable group before the polymerization reaction. In addition, the infrared absorption peak near 810 $cm^{-1}$ was used as the infrared absorption peak.

—2. Measurement of Line Width—

The line width of the image drawn in the form of lines was measured using a dot analyzer DA 6000 (manufactured by Oji Scientific Instruments Co., Ltd.).

An ideal line width is 42 to 43 µm at 600 dpi.

—3. Evaluation of Lattice Image Obtained Using Ink-Jet Recording Liquids I-1, 2 and 4 of Cyan, Magenta and Black, After Whole-Area Dropwise Impacting of Yellow Ink-Jet Recording Liquid I-3—

The respective lattice images of cyan, magenta and black drawn on the whole-area dropwise impacted image obtained using the yellow ink-jet recording liquid I-3 were respectively measured using a dot analyzer DA 6000 (manufactured by Oji Scientific Instruments Co., Ltd.).

Specifically, the width of an area disposed between two lattice lines and having no lattice lines drawn thereon, was measured, and the extent of narrowing of the 3-pixel width (setup value) was evaluated.

<Evaluation Criteria>
A: No narrowing (the extent of narrowing was less than 1%).
B: Narrowing at a ratio of 1% or more and less than 10% was observed.
C: Narrowing of 10% or more was observed.

—4. Evaluation of Practical Image—

A practical full-color image of a person (female) was observed by naked eyes, and was evaluated according to the following evaluation criteria.

<Evaluation Criteria>
A: A good, clearly printed image of high image density was obtained.
B: High density parts such as hair parts were perceived to be somewhat light.
C: The overall colors were perceived to be light
D: The image was blurry.
E: Color irregularities were observed.

TABLE 9

<Cyan Ink>

| Level of undercoat solution | Line width | Extent of narrowing in lattice | Remarks |
|---|---|---|---|
| III-1 | 60 µm | C | Comparative Example |
| III-2 | 42 µm | B | Comparative Example |
| III-3 | 38 µm | B | Comparative Example |
| III-4 | 36 µm | B | Comparative Example |
| III-5 | 42 µm | C | Comparative Example |
| III-6 | 42 µm | C | Comparative Example |
| III-7 | 42 µm | C | Comparative Example |
| III-8 | 38 µm | A | The present invention |
| III-9 | 38 µm | A | The present invention |
| III-10 | 38 µm | A | The present invention |
| III-11 | 38 µm | A | The present invention |
| III-12 | 38 µm | A | The present invention |
| III-13 | 38 µm | A | The present invention |
| III-14 | 38 µm | A | The present invention |
| III-15 | 38 µm | A | The present invention |
| III-16 | 38 µm | A | The present invention |
| III-17 | 38 µm | A | The present invention |
| III-18 | 38 µm | A | The present invention |
| III-19 | 40 µm | A | The present invention |
| III-20 | 39 µm | A | The present invention |
| III-21 | 41 µm | A | The present invention |

TABLE 10

<Magenta Ink>

| Level of undercoat solution | Line width | Extent of narrowing in lattice | Remarks |
|---|---|---|---|
| III-1 | 60 µm | C | Comparative Example |
| III-2 | 42 µm | B | Comparative Example |
| III-3 | 38 µm | B | Comparative Example |
| III-4 | 36 µm | B | Comparative Example |
| III-5 | 42 µm | C | Comparative Example |
| III-6 | 42 µm | C | Comparative Example |
| III-7 | 42 µm | C | Comparative Example |
| III-8 | 38 µm | A | The present invention |
| III-9 | 38 µm | A | The present invention |
| III-10 | 38 µm | A | The present invention |
| III-11 | 38 µm | A | The present invention |
| III-12 | 38 µm | A | The present invention |

TABLE 10-continued

<Magenta Ink>

| Level of undercoat solution | Line width | Extent of narrowing in lattice | Remarks |
|---|---|---|---|
| III-13 | 38 μm | A | The present invention |
| III-14 | 38 μm | A | The present invention |
| III-15 | 38 μm | A | The present invention |
| III-16 | 38 μm | A | The present invention |
| III-17 | 38 μm | A | The present invention |
| III-18 | 38 μm | A | The present invention |
| III-19 | 40 μm | A | The present invention |
| III-20 | 39 μm | A | The present invention |
| III-21 | 41 μm | A | The present invention |

TABLE 11

<Yellow Ink>

| Level of undercoat solution | Line width | Remarks |
|---|---|---|
| III-1 | 60 μm | Comparative Example |
| III-2 | 42 μm | Comparative Example |
| III-3 | 38 μm | Comparative Example |
| III-4 | 36 μm | Comparative Example |
| III-5 | 42 μm | Comparative Example |
| III-6 | 42 μm | Comparative Example |
| III-7 | 42 μm | Comparative Example |
| III-8 | 38 μm | The present invention |
| III-9 | 38 μm | The present invention |
| III-10 | 38 μm | The present invention |
| III-11 | 38 μm | The present invention |
| III-12 | 38 μm | The present invention |
| III-13 | 38 μm | The present invention |
| III-14 | 38 μm | The present invention |
| III-15 | 38 μm | The present invention |
| III-16 | 38 μm | The present invention |
| III-17 | 38 μm | The present invention |
| III-18 | 38 μm | The present invention |
| III-19 | 40 μm | The present invention |
| III-20 | 39 μm | The present invention |
| III-21 | 41 μm | The present invention |

TABLE 12

<Black Ink>

| Level of undercoat solution | Line width | Extent of narrowing in lattice | Remarks |
|---|---|---|---|
| III-1 | 60 μm | C | Comparative Example |
| III-2 | 42 μm | B | Comparative Example |
| III-3 | 38 μm | B | Comparative Example |
| III-4 | 36 μm | B | Comparative Example |
| III-5 | 42 μm | C | Comparative Example |
| III-6 | 42 μm | C | Comparative Example |
| III-7 | 42 μm | C | Comparative Example |
| III-8 | 38 μm | A | The present invention |
| III-9 | 38 μm | A | The present invention |
| III-10 | 38 μm | A | The present invention |
| III-11 | 38 μm | A | The present invention |
| III-12 | 38 μm | A | The present invention |
| III-13 | 38 μm | A | The present invention |
| III-14 | 38 μm | A | The present invention |
| III-15 | 38 μm | A | The present invention |
| III-16 | 38 μm | A | The present invention |
| III-17 | 38 μm | A | The present invention |
| III-18 | 38 μm | A | The present invention |
| III-19 | 40 μm | A | The present invention |
| III-20 | 39 μm | A | The present invention |
| III-21 | 41 μm | A | The present invention |

TABLE 13

<Practical Image>

| Level of undercoat solution | Practical image | Remarks |
|---|---|---|
| III-1 | B | Comparative Example |
| III-2 | A | Comparative Example |
| III-3 | A | Comparative Example |
| III-4 | A | Comparative Example |
| III-5 | A | Comparative Example |
| III-6 | A | Comparative Example |
| III-7 | A | Comparative Example |
| III-8 | A | The present invention |
| III-9 | A | The present invention |
| III-10 | A | The present invention |
| III-11 | A | The present invention |
| III-12 | A | The present invention |
| III-13 | A | The present invention |
| III-14 | A | The present invention |
| III-15 | A | The present invention |
| III-16 | A | The present invention |
| III-17 | A | The present invention |
| III-18 | A | The present invention |
| III-19 | A | The present invention |
| III-20 | A | The present invention |
| III-21 | A | The present invention |

As shown in the above Tables 9 to 13, with regard to the evaluation of line width, it was found that in the case of adding both the polymer and the phosphoric acid group-containing radical-polymerizable compound, a good fine line drawing property could be obtained.

On the other hand, with regard to the evaluation of lattice image, it was found that in the case of not adding any of the polymer and the phosphoric acid group-containing radical-polymerizable compound, in the case of adding the polymer only, and in the case of adding the phosphoric acid group-containing radical-polymerizable compound only, narrowing of the lattice was observed. However, in the case of adding both the polymer and the phosphoric acid group-containing radical-polymerizable compound, such narrowing of the lattice did not occur, and good images could be obtained.

Furthermore, with regard to the practical image of Table 13, it was found that similarly to the results for the extent of narrowing in the lattice, the invention exhibited an excellent effect in the case of adding both the polymer and the phosphoric acid group-containing radical-polymerizable compound.

Also, the values of "A (after polymerization)/A (before polymerization)" of the invention in the Tables 9 to 12 were respectively in the range of 0.3 to 0.7, and the partially cured state could be recognized (In addition, the quantitative degree of precision was estimated on the basis of the difference in the coating thickness, the light source stability and the like, to be approximately ±20%).

Example 3

In Example 2, ink-jet recording liquids and undercoat solutions were prepared such that the curing sensitivity ratio, Sc/Su, of the sensitivity of the respective ink-jet recording liquid, Sc, and the sensitivity of the undercoat solution, Su, was obtained as shown by the curing sensitivity ratio shown in the following Table 14, by changing the amount of addition of the initiator when preparing the cyan ink-jet recording liquid I-1, the magenta ink-jet recording liquid I-2, yellow ink-jet recording liquid I-3, and the undercoat solution III-4, respectively. Also, the preparation was performed so that the curing sensitivities of the respective ink-jet recording liquids were all the same. The increase and decrease in the amount of initiator was balanced by increasing or decreasing the amount of dipropylene glycol diacrylate, to supplement the increment.

In the same manner as in the image recording of Example 2, an undercoat solution was applied and exposure (light intensity: 500 mW/cm$^2$) was performed using an undercoat solution partial-curing light source, to partially cure the undercoat solution to the same cured state as in Example 2. Subsequently, images were formed by overlapping an image formed by alternately disposing parts not impacted, and 1-mm lines formed by dropwise impacting yellow, magenta and cyan inks in sequence in a cross-criss pattern, with 2 drops for each color, with a black dot image (150 dpi×150 dpi, 1 drop) thereon. After discharging each of the colors, exposure was performed to cure the respective inks to the same state as in Example 2.

The evaluation apparatus (dot analyzer, DA 6000) used in Example 2 was used again to measure the dot diameter of the black ink in the produced sample. The dot diameter, du, of black ink in the part where no color ink was impacted, and the dot diameter, dc, of black ink in the part where three colors were impacted dropwise, were respectively measured, and the ratio of dc to du was calculated. The relationship between the curing sensitivity ratio Sc/Su and dc/du is presented in the following Table 14.

TABLE 14

| Sc/Su | dc/du |
|---|---|
| 5 | 0.7 |
| 2 | 1.0 |
| 1 | 1.0 |
| 1/2 | 1.1 |
| 1/5 | 1.3 |

In Table 14, if the ratio Sc/Su of the curing sensitivity of the ink and the curing sensitivity of the undercoat solution is equal or less than 5 times, it was observed that changes in the dot diameter of the black ink impacted on the undercoat solution and the dot diameter of the black ink impacted on the previously impacted ink solution, were reduced.

According to the invention related to the first embodiment, there are provided an undercoat solution, an ink-jet recording method, and an ink-jet recording device, which have excellent image uniformity with various recording media, regardless of the recording medium; suppress the occurrences of ink spreading, non-uniformity in line width, color irregularities and the like; maintain the diameter of dots uniform, and have excellent precision drawing properties and binding properties of adjacent dots; and thus is capable of recording an image in detail at a high density with high reproducibility, without regard to the form of the image.

According to the invention related to the second embodiment, there are provided an undercoat solution, an ink-jet recording method, and an ink-jet recording device, which have excellent image uniformity with various recording media, regardless of the recording medium; suppress the occurrences of ink spreading, non-uniformity in line width, color irregularities and the like; maintain the diameter of dots uniform even when ink droplets are impacted one on top of another; and is capable of recording an image in detail at a high density with high reproducibility, without regard to the form of the image. Also, according to the invention related to the second embodiment, in the case of dropwise impacting a color ink onto a part where no color ink has been applied, and in the case of dropwise impacting a color ink again onto a part where a color ink has been applied, the dot diameter (and the dot shape) does not change, and thus high quality images can be obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

All publications, patent applications, and technical standards mentioned in this specification are herein incorporated by reference to the same extent as if each individual publication, patent application, or technical standard was specifically and individually indicated to be incorporated by reference.

What is claimed is:

1. An undercoat solution comprising an acrylamide polymer that is oil-soluble and water-insoluble and a radical-polymerizable compound having a phosphoric acid group that is applied in advance onto a recording medium prior to discharging an ink onto the recording medium to record an image, wherein the radical-polymerizable compound having a phosphoric acid group is selected from the group consisting of a phosphoric acid group-containing radical-polymerizable compound in which all of the hydroxyl groups of phosphoric acid have been esterified, and a bifunctional or higher functional phosphoric acid group-containing radical-polymerizable compound.

2. The undercoat solution according to claim 1, further comprising a radical polymerization initiator.

3. An ink-jet recording method, comprising:
applying, onto a recording medium, an undercoat solution;
partially curing the applied undercoat solution; and
discharging an ink, which is curable by irradiation with an active energy ray, onto the partially cured undercoat solution to record an image,
wherein the undercoat solution comprises an acrylamide polymer that is oil-soluble and water-insoluble and a radical-polymerizable compound having a phosphoric acid group that is applied in advance onto the recording medium prior to discharging the ink onto the recording medium to record the image, the radical-polymerizable compound having a phosphoric acid group selected from the group consisting of a phosphoric acid group-containing radical-polymerizable compound in which all of the hydroxyl groups of phosphoric acid have been esterified, and a bifunctional or higher functional phosphoric acid group-containing radical-polymerizable compound.

4. The ink-jet recording method according to claim 3, wherein the undercoat solution is partially cured by irradiating with an active energy ray.

5. The ink-jet recording method according to claim 3, wherein the undercoat solution further contains a radical polymerization initiator.

6. The ink-jet recording method according to claim 3, wherein in the discharging of the ink, an ink set containing multiple colored inks is used to perform the discharging, and at least one of the discharged colored inks is partially cured.

7. The ink-jet recording method according to claim 3, wherein curing of the undercoat solution and the discharged ink is carried out to fix the recorded image onto the recording medium.

8. The ink-jet recording method according to claim 3, wherein the curing sensitivity of the ink is equal to or greater than the curing sensitivity of the undercoat solution.

9. An ink-jet recording method, comprising:
applying, onto a recording medium, an undercoat solution;
partially curing the applied undercoat solution; and
discharging an ink, which can be cured by irradiation with an active energy ray, onto the partially cured undercoat solution to thereby record an image,
wherein the undercoat solution comprises an acrylamide polymer that is oil-soluble and water-insoluble and a radical-polymerizable compound having a phosphoric acid group that is applied in advance onto the recording medium prior to discharging the ink onto the recording medium to record the image, the radical-polymerizable compound having a phosphoric acid group selected from the group consisting of a phosphoric acid group-containing radical-polymerizable compound in which all of the hydroxyl groups of phosphoric acid have been esterified, and a bifunctional or higher functional phosphoric acid group-containing radical-polymerizable compound.

10. The ink-jet recording method according to claim 9, wherein the undercoat solution is partially cured by irradiation with an active energy ray.

11. The ink-jet recording method according to claim 9, wherein the undercoat solution further contains a radical polymerization initiator.

12. The ink-jet recording method according to claim 9, wherein in the discharging of the ink, an ink set containing multiple colored inks is used to perform the discharging, and at least one of the discharged colored inks is partially cured.

13. The ink-jet recording method according to claim 9, wherein curing of the undercoat solution and the discharged ink is carried out to fix the recorded image onto the recording medium.

14. The ink-jet recording method according to claim 9, wherein the curing sensitivity of the ink is equal to or greater than the curing sensitivity of the undercoat solution.

* * * * *